(12) United States Patent
Chandrashekhar et al.

(10) Patent No.: US 11,374,850 B2
(45) Date of Patent: Jun. 28, 2022

(54) TUNNEL ENDPOINT GROUP RECORDS

(71) Applicant: VMware, Inc., Palo Alto, CA (US)

(72) Inventors: Ganesan Chandrashekhar, Campbell, CA (US); Hongwei Zhu, Mountain View, CA (US); Jia Yu, Sunnyvale, CA (US); Abhishek Goliya, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/906,901

(22) Filed: Jun. 19, 2020

(65) Prior Publication Data
US 2021/0314289 A1 Oct. 7, 2021

(30) Foreign Application Priority Data
Apr. 6, 2020 (IN) .............................. 202041015115

(51) Int. Cl.
*H04L 45/021* (2022.01)
*H04L 45/028* (2022.01)
(Continued)

(52) U.S. Cl.
CPC ........ *H04L 45/021* (2013.01); *H04L 12/4633* (2013.01); *H04L 12/4645* (2013.01);
(Continued)

(58) Field of Classification Search
CPC .. H04L 61/2007; H04L 61/2592; H04L 12/66
(Continued)

(56) References Cited

U.S. PATENT DOCUMENTS 6,219,699 B1   4/2001   McCloghrie et al.
6,347,374 B1   2/2002   Drake et al.
(Continued)

FOREIGN PATENT DOCUMENTS

CN   101018159 A   8/2007
CN   101442442 A   5/2009
(Continued)

OTHER PUBLICATIONS

Peter Loshin, TECHTARGET, available at https://searchdatacenter.techtarget.com/definition/data-center, pp. 1-13, Oct. 2021 (Year: 2021).*
(Continued)

*Primary Examiner* — David P Zarka
(74) *Attorney, Agent, or Firm* — Adeli LLP

(57) ABSTRACT

Some embodiments provide a method for an MFE, in a first datacenter, to implement an LN spanning the first datacenter and a set of additional datacenters. The method stores records that each map one or more LN addresses for DCNs belonging to the LN and operating in the first datacenter to a different TEP address. The method stores an additional record that maps addresses for DCNs connected to a particular LFE of the LN and operating in the additional datacenters to a group of TEP addresses corresponding to LN gateways that handle data traffic for the particular LFE between the first datacenter and the additional datacenters. Upon receiving a data message with a destination address corresponding to a DCN connected to the particular LFE and operating in one of the additional datacenters, the method uses the additional record to identify a TEP address for encapsulating the data message.

22 Claims, 36 Drawing Sheets

(51) Int. Cl.

| | |
|---|---|
| *H04L 45/586* | (2022.01) |
| *H04L 45/00* | (2022.01) |
| *H04L 49/25* | (2022.01) |
| *H04L 49/65* | (2022.01) |
| *H04L 61/2592* | (2022.01) |
| *H04L 67/289* | (2022.01) |
| *H04L 41/0893* | (2022.01) |
| *H04L 45/42* | (2022.01) |
| *H04L 49/00* | (2022.01) |
| *H04L 12/46* | (2006.01) |
| *H04L 12/66* | (2006.01) |
| *H04L 45/74* | (2022.01) |
| *H04L 61/5007* | (2022.01) |
| *H04L 101/622* | (2022.01) |
| *H04L 45/64* | (2022.01) |
| *H04L 45/02* | (2022.01) |
| *H04L 45/24* | (2022.01) |
| *H04L 45/50* | (2022.01) |
| *H04L 41/0803* | (2022.01) |
| *H04L 45/44* | (2022.01) |

(52) U.S. Cl.
CPC .......... *H04L 12/66* (2013.01); *H04L 41/0803* (2013.01); *H04L 41/0893* (2013.01); *H04L 45/02* (2013.01); *H04L 45/028* (2013.01); *H04L 45/04* (2013.01); *H04L 45/24* (2013.01); *H04L 45/42* (2013.01); *H04L 45/44* (2013.01); *H04L 45/50* (2013.01); *H04L 45/54* (2013.01); *H04L 45/586* (2013.01); *H04L 45/64* (2013.01); *H04L 45/74* (2013.01); *H04L 49/252* (2013.01); *H04L 49/65* (2013.01); *H04L 49/70* (2013.01); *H04L 61/2007* (2013.01); *H04L 61/2592* (2013.01); *H04L 61/6022* (2013.01); *H04L 67/289* (2013.01); *H04L 2212/00* (2013.01)

(58) Field of Classification Search
USPC ........................................................ 709/245
See application file for complete search history.

(56) References Cited

U.S. PATENT DOCUMENTS

| | | | |
|---|---|---|---|
| 6,754,220 B1 | 6/2004 | Lamberton et al. | |
| 7,152,179 B1 | 12/2006 | Critchfield | |
| 7,502,884 B1 | 3/2009 | Shah et al. | |
| 7,539,745 B1 | 5/2009 | Wang et al. | |
| 7,647,426 B2 | 1/2010 | Patel et al. | |
| 7,802,000 B1 | 9/2010 | Huang et al. | |
| 8,014,278 B1 | 9/2011 | Subramanian et al. | |
| 8,218,454 B2 | 7/2012 | Hajiaghayi et al. | |
| 8,479,275 B1 | 7/2013 | Naseh | |
| 8,611,351 B2 | 12/2013 | Gooch et al. | |
| 8,625,616 B2 | 1/2014 | Vobbilisetty et al. | |
| 8,660,129 B1 | 2/2014 | Brendel et al. | |
| 8,707,417 B1 | 4/2014 | Liang et al. | |
| 8,762,507 B1 | 6/2014 | Ingram et al. | |
| 8,775,599 B2 | 7/2014 | Bansal et al. | |
| 8,902,743 B2 | 12/2014 | Greenberg et al. | |
| 8,904,028 B2 | 12/2014 | Iannaccone et al. | |
| 8,958,298 B2 | 2/2015 | Zhang et al. | |
| 8,997,094 B2 | 3/2015 | Bosch et al. | |
| 9,201,837 B2 | 12/2015 | Egi et al. | |
| 9,225,597 B2 | 12/2015 | Tubaltsev et al. | |
| 9,270,581 B2 | 2/2016 | Guellal et al. | |
| 9,311,122 B2 | 4/2016 | Guay et al. | |
| 9,330,161 B2 | 5/2016 | D'Amato et al. | |
| 9,432,215 B2 | 8/2016 | Stabile et al. | |
| 9,450,852 B1 | 9/2016 | Chen et al. | |
| 9,577,845 B2 | 2/2017 | Thakkar et al. | |
| 9,590,901 B2 | 3/2017 | Tubaltsev et al. | |
| 9,602,312 B2 | 3/2017 | Koponen et al. | |
| 9,672,054 B1 | 6/2017 | Gupta et al. | |
| 9,672,060 B2 | 6/2017 | Behere et al. | |
| 9,762,537 B1 | 9/2017 | Eyada | |
| 9,825,851 B2 | 11/2017 | Agarwal et al. | |
| 9,847,938 B2 * | 12/2017 | Chanda | H04L 12/4633 |
| 9,876,711 B2 * | 1/2018 | Chu | H04L 43/0852 |
| 9,900,224 B2 | 2/2018 | Dumitriu et al. | |
| 9,906,560 B2 | 2/2018 | Jain et al. | |
| 9,912,616 B2 * | 3/2018 | Shen | H04L 49/70 |
| 9,923,811 B2 | 3/2018 | Agarwal et al. | |
| 9,977,688 B2 | 5/2018 | Nipane et al. | |
| 10,038,628 B2 | 7/2018 | Ravinoothala et al. | |
| 10,091,028 B2 | 10/2018 | Koponen et al. | |
| 10,091,161 B2 | 10/2018 | Dubey et al. | |
| 10,110,417 B1 | 10/2018 | Hankins et al. | |
| 10,120,668 B2 | 11/2018 | Palavalli et al. | |
| 10,135,675 B2 | 11/2018 | Yu et al. | |
| 10,142,127 B2 * | 11/2018 | Cherian | G06F 9/45558 |
| 10,162,656 B2 | 12/2018 | Palavalli et al. | |
| 10,164,885 B2 | 12/2018 | Shen et al. | |
| 10,187,302 B2 * | 1/2019 | Chu | H04L 45/48 |
| 10,205,771 B2 | 2/2019 | Palavalli et al. | |
| 10,241,820 B2 | 3/2019 | Lambeth et al. | |
| 10,243,797 B2 | 3/2019 | Lambeth et al. | |
| 10,243,834 B1 | 3/2019 | Shekhar et al. | |
| 10,243,846 B2 | 3/2019 | Jiang et al. | |
| 10,243,848 B2 | 3/2019 | Agarwal et al. | |
| 10,257,049 B2 | 4/2019 | Fried et al. | |
| 10,305,757 B2 | 5/2019 | Yadav et al. | |
| 10,333,849 B2 | 6/2019 | Masurekar et al. | |
| 10,333,959 B2 | 6/2019 | Katrekar et al. | |
| 10,339,123 B2 | 7/2019 | Venkatesh et al. | |
| 10,560,343 B1 | 2/2020 | Cartsonis et al. | |
| 10,579,945 B2 | 3/2020 | Gaurav et al. | |
| 10,601,705 B2 | 3/2020 | Hira et al. | |
| 10,616,045 B2 | 4/2020 | Dubey et al. | |
| 10,637,800 B2 * | 4/2020 | Wang | H04L 61/2007 |
| 10,652,143 B2 | 5/2020 | Ravinoothala et al. | |
| 10,673,752 B2 | 6/2020 | Agarwal et al. | |
| 10,693,833 B2 * | 6/2020 | Mathew | H04L 61/103 |
| 10,832,224 B2 | 11/2020 | Palavalli et al. | |
| 10,862,753 B2 | 12/2020 | Hira et al. | |
| 10,880,158 B2 | 12/2020 | Lambeth et al. | |
| 10,880,170 B2 | 12/2020 | Wang et al. | |
| 10,897,420 B1 | 1/2021 | Pianigiani et al. | |
| 10,908,938 B2 | 2/2021 | Palavalli et al. | |
| 10,942,788 B2 | 3/2021 | Palavalli et al. | |
| 10,999,154 B1 | 5/2021 | Ahrenholz et al. | |
| 11,057,275 B1 | 7/2021 | Arunachalam et al. | |
| 11,088,902 B1 | 8/2021 | Palavalli et al. | |
| 11,088,916 B1 | 8/2021 | Chandrashekhar et al. | |
| 11,088,919 B1 | 8/2021 | Chandrashekhar et al. | |
| 11,115,301 B1 | 9/2021 | Margarian et al. | |
| 11,153,170 B1 | 10/2021 | Chandrashekhar et al. | |
| 2002/0029270 A1 | 3/2002 | Szczepanek | |
| 2002/0093952 A1 | 7/2002 | Gonda | |
| 2002/0131414 A1 | 9/2002 | Hadzic | |
| 2003/0167333 A1 | 9/2003 | Kumar et al. | |
| 2003/0185151 A1 | 10/2003 | Kurosawa et al. | |
| 2003/0185152 A1 | 10/2003 | Nederveen et al. | |
| 2003/0188114 A1 | 10/2003 | Lubbers et al. | |
| 2003/0188218 A1 | 10/2003 | Lubbers et al. | |
| 2004/0052257 A1 | 3/2004 | Abdo et al. | |
| 2005/0190757 A1 | 9/2005 | Sajassi | |
| 2005/0235352 A1 | 10/2005 | Staats et al. | |
| 2005/0288040 A1 | 12/2005 | Charpentier et al. | |
| 2006/0092976 A1 | 5/2006 | Lakshman et al. | |
| 2006/0179243 A1 | 8/2006 | Fields et al. | |
| 2006/0179245 A1 | 8/2006 | Fields et al. | |
| 2006/0193252 A1 | 8/2006 | Naseh et al. | |
| 2006/0198321 A1 | 9/2006 | Nadeau et al. | |
| 2006/0221720 A1 | 10/2006 | Reuter | |
| 2006/0239271 A1 | 10/2006 | Khasnabish et al. | |
| 2006/0251120 A1 | 11/2006 | Arimilli et al. | |
| 2007/0028244 A1 | 2/2007 | Landis et al. | |
| 2007/0058631 A1 | 3/2007 | Mortier et al. | |
| 2007/0130295 A1 | 6/2007 | Rastogi et al. | |
| 2007/0217419 A1 | 9/2007 | Vasseur | |

(56) References Cited

U.S. PATENT DOCUMENTS

| | | |
|---|---|---|
| 2007/0239987 A1 | 10/2007 | Hoole et al. |
| 2008/0013474 A1 | 1/2008 | Nagarajan et al. |
| 2008/0049646 A1 | 2/2008 | Lu |
| 2008/0104302 A1 | 5/2008 | Carpio |
| 2008/0133729 A1 | 6/2008 | Fridman et al. |
| 2008/0198858 A1 | 8/2008 | Townsley et al. |
| 2008/0268847 A1 | 10/2008 | Mukherjee et al. |
| 2008/0301379 A1 | 12/2008 | Pong |
| 2009/0016215 A1 | 1/2009 | Nadas et al. |
| 2009/0070337 A1 | 3/2009 | Romem et al. |
| 2009/0193297 A1 | 7/2009 | Williams et al. |
| 2009/0241192 A1 | 9/2009 | Thomas |
| 2009/0249472 A1 | 10/2009 | Litvin et al. |
| 2009/0257440 A1 | 10/2009 | Yan et al. |
| 2009/0279536 A1 | 11/2009 | Unbehagen et al. |
| 2009/0279545 A1 | 11/2009 | Moonen |
| 2009/0292858 A1 | 11/2009 | Lambeth et al. |
| 2009/0296726 A1 | 12/2009 | Snively et al. |
| 2010/0046532 A1 | 2/2010 | Okita |
| 2010/0149992 A1 | 6/2010 | Tan |
| 2010/0241767 A1 | 9/2010 | Corry et al. |
| 2010/0250784 A1 | 9/2010 | Henry et al. |
| 2010/0257263 A1 | 10/2010 | Casado et al. |
| 2010/0265956 A1 | 10/2010 | Li |
| 2010/0275199 A1 | 10/2010 | Smith et al. |
| 2010/0322255 A1 | 12/2010 | Hao et al. |
| 2010/0332664 A1 | 12/2010 | Yevmenkin et al. |
| 2011/0032898 A1 | 2/2011 | Kazmi et al. |
| 2011/0047218 A1 | 2/2011 | Nojima et al. |
| 2011/0051714 A1 | 3/2011 | Somes |
| 2011/0069634 A1 | 3/2011 | Hajiaghayi et al. |
| 2011/0085569 A1 | 4/2011 | Gnanasekaran et al. |
| 2011/0164752 A1 | 7/2011 | Wainner et al. |
| 2011/0188509 A1 | 8/2011 | Kern et al. |
| 2011/0231602 A1 | 9/2011 | Woods et al. |
| 2011/0299386 A1 | 12/2011 | Negoto et al. |
| 2011/0299413 A1 | 12/2011 | Chatwani et al. |
| 2012/0084406 A1 | 4/2012 | Kumbalimutt |
| 2012/0102009 A1 | 4/2012 | Peterson et al. |
| 2012/0120964 A1 | 5/2012 | Koponen et al. |
| 2012/0147898 A1 | 6/2012 | Koponen et al. |
| 2012/0182993 A1 | 7/2012 | Hadas et al. |
| 2012/0233331 A1 | 9/2012 | Voccio et al. |
| 2012/0275328 A1 | 11/2012 | Iwata et al. |
| 2013/0018947 A1 | 1/2013 | Archer et al. |
| 2013/0024579 A1 | 1/2013 | Zhang et al. |
| 2013/0042242 A1 | 2/2013 | Kagan |
| 2013/0044636 A1 | 2/2013 | Koponen et al. |
| 2013/0044641 A1 | 2/2013 | Koponen et al. |
| 2013/0044761 A1 | 2/2013 | Koponen et al. |
| 2013/0051399 A1 | 2/2013 | Zhang et al. |
| 2013/0058250 A1 | 3/2013 | Casado et al. |
| 2013/0058335 A1 | 3/2013 | Koponen et al. |
| 2013/0058350 A1 | 3/2013 | Fulton |
| 2013/0058354 A1 | 3/2013 | Casado et al. |
| 2013/0058358 A1 | 3/2013 | Fulton et al. |
| 2013/0060819 A1 | 3/2013 | Lambeth et al. |
| 2013/0060940 A1 | 3/2013 | Koponen et al. |
| 2013/0074065 A1 | 3/2013 | McNeeney et al. |
| 2013/0083693 A1 | 4/2013 | Himura et al. |
| 2013/0103817 A1 | 4/2013 | Koponen et al. |
| 2013/0132533 A1 | 5/2013 | Padmanabhan et al. |
| 2013/0132536 A1 | 5/2013 | Zhang et al. |
| 2013/0144992 A1 | 6/2013 | Barabash et al. |
| 2013/0148541 A1 | 6/2013 | Zhang et al. |
| 2013/0159637 A1 | 6/2013 | Forgette et al. |
| 2013/0212212 A1 | 8/2013 | Addepalli et al. |
| 2013/0212246 A1 | 8/2013 | Koponen et al. |
| 2013/0215769 A1 | 8/2013 | Beheshti-Zavareh et al. |
| 2013/0219078 A1 | 8/2013 | Padmanabhan et al. |
| 2013/0250951 A1 | 9/2013 | Koganti |
| 2013/0254328 A1 | 9/2013 | Inoue et al. |
| 2013/0254599 A1 | 9/2013 | Katkar et al. |
| 2013/0266019 A1 | 10/2013 | Qu et al. |
| 2013/0287026 A1 | 10/2013 | Davie |
| 2013/0301425 A1 | 11/2013 | Udutha et al. |
| 2013/0301501 A1 | 11/2013 | Olvera-Hernandez et al. |
| 2013/0305344 A1 | 11/2013 | Alicherry et al. |
| 2013/0308641 A1 | 11/2013 | Ackley |
| 2014/0050218 A1 | 2/2014 | Kamble et al. |
| 2014/0056125 A1 | 2/2014 | Guellal et al. |
| 2014/0064104 A1 | 3/2014 | Nataraja et al. |
| 2014/0136908 A1 | 5/2014 | Maggiari et al. |
| 2014/0146817 A1 | 5/2014 | Zhang |
| 2014/0156818 A1 | 6/2014 | Hunt |
| 2014/0201733 A1 | 7/2014 | Benny et al. |
| 2014/0211661 A1 | 7/2014 | Gorkemli et al. |
| 2014/0229945 A1 | 8/2014 | Barkai et al. |
| 2014/0241356 A1 | 8/2014 | Zhang et al. |
| 2014/0250220 A1 | 9/2014 | Kapadia et al. |
| 2014/0301391 A1 | 10/2014 | Krishnan et al. |
| 2014/0307744 A1 | 10/2014 | Dunbar et al. |
| 2014/0313892 A1 | 10/2014 | Kamble et al. |
| 2014/0337500 A1 | 11/2014 | Lee |
| 2014/0337515 A1 | 11/2014 | Naseh et al. |
| 2014/0341226 A1 | 11/2014 | Okita |
| 2014/0359343 A1 | 12/2014 | Fu |
| 2014/0372582 A1 | 12/2014 | Ghanwani et al. |
| 2015/0009797 A1 | 1/2015 | Koponen et al. |
| 2015/0010009 A1 | 1/2015 | Takahashi et al. |
| 2015/0016276 A1 | 1/2015 | Decusatis et al. |
| 2015/0063360 A1 | 3/2015 | Thakkar et al. |
| 2015/0063364 A1 | 3/2015 | Thakkar et al. |
| 2015/0085862 A1 | 3/2015 | Song |
| 2015/0100704 A1 | 4/2015 | Davie et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0117256 A1 | 4/2015 | Sabaa et al. |
| 2015/0229641 A1 | 8/2015 | Sun et al. |
| 2015/0237014 A1 | 8/2015 | Bansal et al. |
| 2015/0244628 A1 | 8/2015 | Gredler et al. |
| 2015/0263946 A1 | 9/2015 | Tubaltsev et al. |
| 2015/0271011 A1 | 9/2015 | Neginhal et al. |
| 2015/0309901 A1 | 10/2015 | Pershin et al. |
| 2015/0312326 A1 | 10/2015 | Archer et al. |
| 2015/0326467 A1 | 11/2015 | Fullbright et al. |
| 2015/0372943 A1 | 12/2015 | Hasan et al. |
| 2016/0057014 A1 | 2/2016 | Thakkar et al. |
| 2016/0080483 A1 | 3/2016 | Li et al. |
| 2016/0094396 A1 | 3/2016 | Chandrashekhar et al. |
| 2016/0094661 A1 | 3/2016 | Jain et al. |
| 2016/0134528 A1 | 5/2016 | Lin et al. |
| 2016/0173415 A1 | 6/2016 | Wang et al. |
| 2016/0205196 A1 | 7/2016 | Hasan et al. |
| 2016/0210209 A1 | 7/2016 | Verkaik et al. |
| 2016/0226959 A1 | 8/2016 | Zhang et al. |
| 2016/0248703 A1 | 8/2016 | Gopalakrishnan et al. |
| 2016/0294612 A1 | 10/2016 | Ravinoothala et al. |
| 2016/0301603 A1 | 10/2016 | Park et al. |
| 2016/0352588 A1 | 12/2016 | Subbarayan et al. |
| 2016/0373530 A1 | 12/2016 | Duda |
| 2016/0380815 A1 | 12/2016 | Agarwal et al. |
| 2016/0380891 A1 | 12/2016 | Agarwal et al. |
| 2016/0380925 A1 | 12/2016 | Agarwal et al. |
| 2016/0380973 A1 | 12/2016 | Sullenberger et al. |
| 2017/0005915 A1 | 1/2017 | Mirsky et al. |
| 2017/0034129 A1 | 2/2017 | Sawant et al. |
| 2017/0041347 A1 | 2/2017 | Nagaratnam et al. |
| 2017/0048110 A1 | 2/2017 | Wu et al. |
| 2017/0048130 A1 | 2/2017 | Goliya et al. |
| 2017/0063794 A1 | 3/2017 | Jain et al. |
| 2017/0063822 A1 | 3/2017 | Jain et al. |
| 2017/0104720 A1 | 4/2017 | Bansal et al. |
| 2017/0118067 A1 | 4/2017 | Vedula |
| 2017/0126431 A1* | 5/2017 | Han .................. H04L 67/1097 |
| 2017/0126493 A1 | 5/2017 | Zhang et al. |
| 2017/0126551 A1 | 5/2017 | Pfaff et al. |
| 2017/0139789 A1 | 5/2017 | Fries et al. |
| 2017/0142012 A1 | 5/2017 | Thakkar et al. |
| 2017/0163442 A1 | 6/2017 | Shen et al. |
| 2017/0163532 A1 | 6/2017 | Tubaltsev et al. |
| 2017/0163598 A1 | 6/2017 | Shen et al. |
| 2017/0163599 A1 | 6/2017 | Shen et al. |

(56) References Cited

U.S. PATENT DOCUMENTS

| | | | |
|---|---|---|---|
| 2017/0171055 A1 | 6/2017 | Wang et al. | |
| 2017/0249195 A1 | 8/2017 | Sadana et al. | |
| 2017/0250912 A1* | 8/2017 | Chu | H04L 12/4645 |
| 2017/0264483 A1 | 9/2017 | Lambeth et al. | |
| 2017/0289033 A1 | 10/2017 | Singh et al. | |
| 2017/0310641 A1 | 10/2017 | Jiang et al. | |
| 2017/0317954 A1 | 11/2017 | Masurekar et al. | |
| 2017/0317969 A1 | 11/2017 | Masurekar et al. | |
| 2017/0324645 A1 | 11/2017 | Johnsen et al. | |
| 2017/0331711 A1 | 11/2017 | Duda | |
| 2017/0344444 A1 | 11/2017 | Costa-Roberts et al. | |
| 2018/0006880 A1 | 1/2018 | Shakimov et al. | |
| 2018/0062881 A1 | 3/2018 | Chandrashekhar et al. | |
| 2018/0062923 A1 | 3/2018 | Katrekar et al. | |
| 2018/0063195 A1 | 3/2018 | Nimmagadda et al. | |
| 2018/0123877 A1 | 5/2018 | Saxena et al. | |
| 2018/0123903 A1 | 5/2018 | Holla et al. | |
| 2018/0157537 A1 | 6/2018 | Chen et al. | |
| 2018/0176073 A1 | 6/2018 | Dubey et al. | |
| 2018/0234337 A1 | 8/2018 | Goliya et al. | |
| 2018/0234459 A1 | 8/2018 | Kung et al. | |
| 2018/0302326 A1 | 10/2018 | Thakkar et al. | |
| 2018/0309718 A1 | 10/2018 | Zuo | |
| 2019/0014040 A1 | 1/2019 | Yerrapureddy et al. | |
| 2019/0075050 A1 | 3/2019 | Tubaltsev et al. | |
| 2019/0158397 A1 | 5/2019 | Liu | |
| 2019/0173982 A1 | 6/2019 | Dubey et al. | |
| 2019/0190780 A1 | 6/2019 | Wang et al. | |
| 2019/0207847 A1 | 7/2019 | Agarwal et al. | |
| 2019/0245888 A1 | 8/2019 | Martinez et al. | |
| 2019/0260610 A1* | 8/2019 | Dubey | H04L 12/66 |
| 2019/0260630 A1 | 8/2019 | Stabile et al. | |
| 2019/0303326 A1 | 10/2019 | Desai et al. | |
| 2019/0306064 A1 | 10/2019 | Masurekar et al. | |
| 2019/0342175 A1 | 11/2019 | Wan et al. | |
| 2019/0363975 A1 | 11/2019 | Djernaes | |
| 2019/0379731 A1 | 12/2019 | Johnsen et al. | |
| 2020/0021541 A1* | 1/2020 | Chanda | H04L 49/35 |
| 2020/0092161 A1 | 3/2020 | Dubey et al. | |
| 2020/0106744 A1 | 4/2020 | Miriyala et al. | |
| 2020/0169503 A1 | 5/2020 | Tubaltsev et al. | |
| 2020/0296035 A1 | 9/2020 | Agarwal et al. | |
| 2020/0358693 A1 | 11/2020 | Rawlins | |
| 2020/0366741 A1 | 11/2020 | Kancherla et al. | |
| 2021/0067556 A1 | 3/2021 | Tahan | |
| 2021/0194729 A1* | 6/2021 | Semwal | H04L 12/4641 |
| 2021/0314227 A1 | 10/2021 | Chandrashekhar et al. | |
| 2021/0367834 A1 | 11/2021 | Palavalli et al. | |

FOREIGN PATENT DOCUMENTS

| | | |
|---|---|---|
| CN | 101981560 A | 2/2011 |
| CN | 102124456 A | 7/2011 |
| CN | 102215158 A | 10/2011 |
| CN | 102986172 A | 3/2013 |
| CN | 103650433 A | 3/2014 |
| CN | 103890751 A | 6/2014 |
| CN | 106576075 A | 4/2017 |
| CN | 110061899 A | 7/2019 |
| EP | 1154601 A1 | 11/2001 |
| EP | 1290856 A2 | 3/2003 |
| EP | 1635506 A1 | 3/2006 |
| EP | 1868318 A1 | 12/2007 |
| EP | 3016331 A1 | 5/2016 |
| EP | 3314831 A1 | 5/2018 |
| EP | 3485610 A1 | 5/2019 |
| GB | 2419703 A | 5/2006 |
| WO | 2008129527 A2 | 10/2008 |
| WO | 2010028364 A1 | 3/2010 |
| WO | 2011140028 A1 | 11/2011 |
| WO | 2012113444 A1 | 8/2012 |
| WO | 2013026049 A1 | 2/2013 |
| WO | 2013113265 A1 | 8/2013 |
| WO | 2013152716 A1 | 10/2013 |
| WO | 2015054671 A2 | 4/2015 |
| WO | 2015142404 A1 | 9/2015 |
| WO | 2017003881 A1 | 1/2017 |
| WO | 2018044341 A1 | 3/2018 |
| WO | 2021206785 A1 | 10/2021 |

OTHER PUBLICATIONS

Paloalto Networks, available at https://www.paloaltonetworks.com/cyberpedia/what-is-a-data-center, pp. 1-5, 2022 (Year: 2022).*

Non-Published Commonly Owned Related International Patent Application PCT/US2021/016118 with similar specification, filed Feb. 1, 2021, 125 pages, VMware, Inc.

PCT International Search Report and Written Opinion of Commonly Owned International Patent Application PCT/US2021/015967, dated May 18, 2021, 13 pages, International Searching Authority (EP).

PCT International Search Report and Written Opinion of commonly owned International Patent Application PCT/US2021/015968, dated Apr. 23, 2021, 14 pages, International Searching Authority (EP).

PCT International Search Report and Written Opinion of Commonly Owned International Patent Application PCT/US2021/016118, dated Apr. 15, 2021, 11 pages, International Searching Authority (EP).

Author Unknown, "Apache Cassandra™ 1.2 Documentation," Jan. 13, 2013, 201 pages, DataStax.

Author Unknown, "OpenFlow Switch Specification, Version 1.1.0 Implemented (Wire Protocol 0x02)," Feb. 28, 2011, 56 pages, Open Networking Foundation.

Berde, Pankaj, et al., "ONOS Open Network Operating System an Open-Source Distributed SDN OS," Dec. 19, 2013, 34 pages.

Hanna, Jeremy, "How ZooKeeper Handles Failure Scenarios," http://.apache.org/hadoop/Zookeeper/Failurescenarios. Dec. 9, 2010, 1 page.

Heller, Brandon, et al., "The Controller Placement Problem," Hot Topics in Software Defined Networks, Aug. 13, 2012, 6 pages, Helsinki, Finland.

Krishnaswamy, Umesh, et al., "ONOS Open Network Operating System—An Experimental Open-Source Distributed SDN OS," Apr. 16, 2013, 24 pages.

Lebresne, Sylvain, "[Release] Apache Cassandra 1.2 released," Jan. 2, 2013, 1 page.

Lin, Pingping, et al., "Seamless Interworking of SDN and IP," SIGCOMM '13, Aug. 12-16, 2013, 2 pages, ACM, New York, USA.

Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.

Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.

Mechtri, Marouen, et al., "Inter and Intra Cloud Networking Gateway as a Service," 2013 IEEE 2nd International Conference on Cloud Networking (ClouNet), Nov. 11, 2013, 8 pages, IEEE.

Non-Published Commonly Owned U.S. Appl. No. 16/888,851, filed Jun. 1, 2020, 72 pages, Nicira, Inc.

Non-Published Commonly Owned U.S. Appl. No. 16/906,889, filed Jun. 19, 2020, 125 pages, VMware, Inc.

Non-Published Commonly Owned U.S. Appl. No. 16/906,891, filed Jun. 19, 2020, 125 pages, VMware, Inc.

Non-Published Commonly Owned U.S. Appl. No. 16/906,893, filed Jun. 19, 2020, 126 pages, VMware, Inc.

Non-Published Commonly Owned Related U.S. Appl. No. 16/906,902 with similar specification, filed Jun. 19, 2020, 126 pages, VMware, Inc.

Non-Published Commonly Owned U.S. Appl. No. 16/906,905, filed Jun. 19, 2020, 126 pages, VMware, Inc.

Non-Published Commonly Owned U.S. Appl. No. 16/906,908, filed Jun. 19, 2020, 125 pages, VMware, Inc.

Non-Published Commonly Owned U.S. Appl. No. 16/906,913, filed Jun. 19, 2020, 124 pages, VMware, Inc.

(56) References Cited

OTHER PUBLICATIONS

Non-Published Commonly Owned U.S. Appl. No. 16/906,921, filed Jun. 19, 2020, 43 pages, VMware, Inc.
Non-Published Commonly Owned U.S. Appl. No. 16/906,925, filed Jun. 19, 2020, 111 pages, VMware, Inc.
Non-Published Commonly Owned U.S. Appl. No. 16/906,929, filed Jun. 19, 2020, 113 pages, VMware, Inc.
Non-Published Commonly Owned U.S. Appl. No. 16/906,934, filed Jun. 19, 2020, 112 pages, VMware, Inc.
Non-Published Commonly Owned U.S. Appl. No. 16/906,935, filed Jun. 19, 2020, 114 pages, VMware, Inc.
Non-Published Commonly Owned U.S. Appl. No. 16/906,942, filed Jun. 19, 2020, 127 pages, VMware, Inc.
Non-Published Commonly Owned U.S. Appl. No. 16/906,944, filed Jun. 19, 2020, 128 pages, VMware, Inc.
Non-Published Commonly Owned U.S. Appl. No. 16/906,950, filed Jun. 19, 2020, 128 pages, VMware, Inc.
Non-Published Commonly Owned U.S. Appl. No. 16/906,955, filed Jun. 19, 2020, 127 pages, VMware, Inc.
Non-Published Commonly Owned U.S. Appl. No. 16/906,960, filed Jun. 19, 2020, 128 pages, VMware, Inc.
Non-Published Commonly Owned U.S. Appl. No. 16/906,964, filed Jun. 19, 2020, 126 pages, VMware, Inc.
Non-Published Commonly Owned U.S. Appl. No. 16/906,966, filed Jun. 19, 2020, 128 pages, VMware, Inc.
Non-Published Commonly Owned U.S. Appl. No. 17/391,917, filed Aug. 2, 2021, 51 pages, VMware, Inc.

\* cited by examiner

TUNNEL ENDPOINT GROUP RECORDS

BACKGROUND

As more networks move to the cloud, it is more common for one corporation or other entity to have networks spanning multiple sites. While logical networks that operate within a single site are well established, there are various challenges in having logical networks span multiple physical sites (e.g., datacenters). The sites should be self-contained, while also allowing for data to be sent from one site to another easily. Various solutions are required to solve these issues.

BRIEF SUMMARY

Some embodiments provide a system for implementing a logical network that spans across multiple datacenters (e.g., in multiple different geographic regions). In some embodiments, a user (or multiple users) defines the logical network as a set of logical network elements (e.g., logical switches, logical routers, logical middleboxes) and policies (e.g., forwarding policies, firewall policies, NAT rules, etc.). The logical forwarding elements (LFEs) may be implemented across some or all of the multiple datacenters, such that data traffic is transmitted (i) between logical network data compute nodes (DCNs) within a datacenter, (ii) between logical network DCNs in two different datacenters, and (iii) between logical network DCNs in a datacenter and endpoints external to the logical network (e.g., external to the datacenters).

The logical network, in some embodiments, is a conceptual network structure that a network administrator (or multiple network administrators) define through a set of network managers. Specifically, some embodiments include a global manager as well as local managers for each datacenter. In some embodiments, any LFEs that span multiple datacenters are defined through the global manager while LFEs that are entirely implemented within a specific datacenter may be defined through either global manager or the local manager for that specific datacenter.

The logical network may include both logical switches (to which logical network DCNs attach) and logical routers. Each LFE (e.g., logical switch or logical router) is implemented across one or more datacenters, depending on how the LFE is defined by the network administrator. In some embodiments, the LFEs are implemented within the datacenter by managed forwarding elements (MFEs) executing on host computers that also host DCNs of the logical network (e.g., in virtualization software of the host computers) and/or on edge devices within the datacenters. The edge devices, in some embodiments, are computing devices that may be bare metal machines executing a datapath and/or computers on which DCNs execute a datapath. These datapaths, in some embodiments, perform various gateway operations (e.g., gateways for stretching logical switches across datacenters, gateways for executing centralized features of logical routers such as performing stateful services and/or connecting to external networks).

Logical routers, in some embodiments, may include tier-0 logical routers (which connect directly to external networks, such as the Internet) and tier-1 logical routers (which may be interposed between logical switches and tier-0 logical routers). Logical routers, in some embodiments, are defined by the network managers (e.g., the global manager, for logical routers spanning more than one datacenter) to have one or more routing components, depending on how the logical router has been configured by the network administrator. Tier-1 logical routers, in some embodiments, may have only a distributed routing component (DR), or may have both distributed routing components as well as centralized routing components (also referred to as service routers, or SRs). SRs, for tier-1 routers, allow for centralized (e.g., stateful) services to be performed on data messages sent to or from DCNs connected to logical switches that connect to the tier-1 logical router (i.e., from DCNs connected to other logical switches that do not connect to the tier-1 logical router, or from external network endpoints). Tier-1 logical routers may be connected to tier-0 logical routers in some embodiments which, as mentioned, handle data messages exchanged between the logical network DCNs and external network endpoints. These tier-0 logical routers may also have a DR as well as one or more SRs (e.g., SRs at each datacenter spanned by the T0 logical router). The details of the SR implementation for both tier-1 and tier-0 logical routers are discussed further below.

As mentioned, the LFEs of a logical network may be implemented by MFEs executing on source host computers as well as by edge devices. When a logical network DCN sends a data message to another logical network DCN, the MFE (or set of MFEs) executing on the host computer at which the source DCN resides performs logical network processing. In some embodiments, the source host computer MFE set (collectively referred to herein as the source MFE) performs processing for as much of the logical network as possible (referred to as first-hop logical processing). That is, the source MFE processes the data message through the logical network until either (i) the destination logical port for the data message is determined or (ii) the data message is logically forwarded to an LFE for which the source MFE cannot perform processing (e.g., an SR of a logical router). For instance, if the source DCN sends a data message to another DCN on the same logical switch, then the source MFE will only need to perform logical processing for the logical switch to determine the destination of the data message. If a source DCN attached to a first logical switch sends a data message to a DCN on a second logical switch that is connected to the same tier-1 logical router as the first logical switch, then the source MFE performs logical processing for the first logical switch, the DR of the logical router, and the second logical switch to determine the destination of the data message. On the other hand, if a source DCN attached to a first logical switch sends a data message to a DCN on a second logical switch that is connected to a different tier-1 logical router than the first logical switch, then the source MFE may only perform logical processing for the first logical switch, the tier-1 DR (which routes the data message to the tier-1 SR), and a transit logical switch connecting the tier-1 DR to the tier-1 SR within the datacenter. Additional processing may be performed on one or more edge devices in one or more datacenters, depending on the configuration of the logical network (as described further below).

Once the source MFE identifies the destination (e.g., a destination logical port on a particular logical switch), this source MFE transmits the data message to the destination. In some embodiments, the source MFE maps the combination of (i) the destination layer 2 (L2) address (e.g., MAC address) of the data message and (ii) the logical switch being processed to which that L2 address attaches to a tunnel endpoint or group of tunnel endpoints, allowing the source MFE to encapsulate the data message and transmit the data message to the destination tunnel endpoint. Specifically, if the destination DCN operates on a host computer located within the same datacenter, the source MFE can transmit the data message directly to that host computer by encapsulating the data message using a destination tunnel endpoint address corresponding to the host computer.

On the other hand, if the source MFE executes on a first host computer in a first datacenter and the destination DCN operates on a second host computer in a second, different datacenter, in some embodiments the data message is transmitted (i) from the source MFE to a first logical network gateway in the first datacenter, (ii) from the first logical network gateway to a second logical network gateway in the second datacenter, and (iii) from the second logical network gateway to a destination MFE executing on the second host computer. The destination MFE can then deliver the data message to the destination DCN.

Some embodiments implement logical network gateways on edge devices in the datacenters to handle logical switch forwarding between datacenters. As with the SRs, logical network gateways are implemented in the edge device datapaths in some embodiments. In some embodiments, separate logical network gateways are assigned for each logical switch. That is, for a given logical switch, one or more logical network gateways are assigned to edge devices in each datacenter within the span of the logical switch (e.g., by the local manager in the datacenter). The logical switches for which logical network gateways are implemented may include administrator-defined logical switches to which logical network DCNs connect as well as other types of logical switches (e.g., backplane logical switches that connect the SRs for one logical router).

In some embodiments, for a given logical switch, the logical network gateways are implemented in active-standby configuration. That is, in each datacenter spanned by the logical switch, an active logical network gateway is assigned to one edge device and one or more standby logical network gateways are assigned to additional edge devices. The active logical network gateways handle all of the inter-site data traffic for the logical switch, except in the case of failover. In other embodiments, the logical network gateways for the logical switch are implemented in active-active configuration. In this configuration, all of the logical network gateways in a particular datacenter are capable of handling inter-site data traffic for the logical switch.

For each logical switch, the logical network gateways form a mesh in some embodiments (i.e., the logical network gateways for the logical switch in each datacenter can directly transmit data messages to the logical network gateways for the logical switch in each other datacenter). In some embodiments, irrespective of whether the logical network gateways are implemented in active-standby or active-active mode, the logical network gateways for a logical switch in a first datacenter establish communication with all of the other logical network gateways in the other datacenters (both active and standby logical network gateways). In other embodiments, the logical network gateways use a hub-and-spoke model of communication, in which case traffic may be forwarded through a central (hub) logical network gateway in a particular datacenter, even if neither the source nor destination of a specific data message resides in that particular datacenter.

Thus, for a data message between DCNs in two datacenters, the source MFE identifies the logical switch to which the destination DCN attaches (which may not be the same as the logical switch to which the source DCN attaches) and transmits the data message to the logical network gateway for that logical switch in its datacenter. That logical network gateway transmits the data message to the logical network gateway for the logical switch in the destination datacenter, which transmits the data message to the destination MFE. In some embodiments, each of these three transmitters (source MFE, first logical network gateway, second logical network gateway) encapsulates the data message with a different tunnel header (e.g., using VXLAN, Geneve, NGVRE, STT, etc.). Specifically, each tunnel header includes (i) a source tunnel endpoint address, (ii) a destination tunnel endpoint address, and (iii) a virtual network identifier (VNI).

In some embodiments, the VNIs used in each of the tunnel headers maps to a logical switch to which the data message belongs. That is, when the source MFE performs processing for a particular logical switch and identifies that the destination for the data message connects to the particular logical switch, the source MFE uses the VNI for that particular logical switch in the encapsulation header. In some embodiments, the local manager at each datacenter manages a separate pool of VNIs for its datacenter, and the global manager manages a separate pool of VNIs for the network between logical network gateways. These pools may be exclusive or overlapping, as they are separately managed without any need for reconciliation. This enables a datacenter to be added to a federated group of datacenters without a need to modify the VNIs used within the newly added datacenter.

Accordingly, the logical network gateways perform VNI translation in some embodiments. At the source host computer in a first datacenter, after determining the destination for a data message and the logical switch to which that destination connects, the source MFE encapsulates the data message using a first VNI corresponding to the logical switch within the first datacenter, and transmits the packet to the edge device at which the logical network gateway for the logical switch is implemented within the first datacenter. The edge device receives the data message and executes a datapath processing pipeline stage for the logical network gateway based on the receipt of the data message at a particular interface and the first VNI in the tunnel header of the encapsulated data message.

The logical network gateway in the first datacenter uses the destination address of the data message (the underlying logical network data message, not the destination address in the tunnel header) to determine a second datacenter to which the data message should be sent, and re-encapsulates the data message with a new tunnel header that includes a second, different VNI. This second VNI is the VNI for the logical switch used within the inter-site network, as managed by the global network manager. This re-encapsulated data message is sent through the intervening network between the logical network gateways (e.g., a VPN, WAN, public network, etc.) to the logical network gateway for the logical switch within the second datacenter.

The edge device implementing the logical network gateway for the logical switch in the second datacenter receives the encapsulated data message and executes a datapath processing pipeline stage (similar to that executed by the first edge device) for the logical network gateway based on the receipt of the data message at a particular interface and the second VNI in the tunnel header of the encapsulated data message). The logical network gateway in the second datacenter uses the destination address of the underlying logical network data message to determine the destination host computer for the data message within the second datacenter, and re-encapsulates the data message with a third tunnel header that includes a third VNI. This third VNI is the VNI for the logical switch used within the second datacenter, as managed by the local network manager for the second datacenter. This re-encapsulated data message is sent through the physical network of the second datacenter to the destination host computer, and the MFE at this destination host computer uses the VNI and destination address of the underlying data message to deliver the data message to the correct DCN.

As noted, in addition to the VNI, the tunnel headers used to transmit logical network data messages also include source and destination tunnel endpoint addresses. In some embodiments, the host computers (e.g., the MFEs executing on the host computers) as well as the edge devices store records that map (for a given logical switch context) MAC addresses (or other L2 addresses) to tunnel endpoints used to reach those MAC addresses. This enables the source MFE or logical network gateway to determine the destination tunnel endpoint address with which to encapsulate a data message for a particular logical switch.

For data messages sent within a single datacenter, the source MFE uses records that map a single tunnel endpoint (referred to as a virtual tunnel endpoint, or VTEP) network address to one or more MAC addresses (of logical network DCNs) that are reachable via that VTEP. Thus, if a VM or other DCN having a particular MAC address resides on a particular host computer, the record for the VTEP associated with that particular host computer maps to the particular MAC address.

In addition, for each logical switch for which an MFE processes data messages and that is stretched to multiple datacenters, in some embodiments the MFE stores an additional VTEP group record for the logical switch that enables the MFE to encapsulate data messages to be sent to the logical network gateway(s) for the logical switch in the datacenter. The VTEP group record, in some embodiments, maps a set of two or more VTEPs (of the logical network gateways) to all MAC addresses connected to the logical switch that are located in any other datacenter. When a source MFE for a data message identifies the logical switch and destination MAC address for a data message, the source MFE identifies the VTEP record or VTEP group record to which the MAC address maps in the context of the identified logical switch (different logical networks within a datacenter may use overlapping MAC addresses, but these will be in the context of different, isolated logical switches). When the destination MAC address corresponds to a DCN in a different datacenter, the source MFE will identify the VTEP group record and use one of the VTEP network addresses in the VTEP group as the destination tunnel endpoint address for encapsulating the data message, such that the encapsulated data message is transmitted through the datacenter to one of the logical network gateways for the logical switch.

When the logical network gateways are configured in active-standby mode, the VTEP group record identifies the current active VTEP, and the source MFE will always select this network address from the VTEP group record. On the other hand, when the logical network gateways are in active-active mode, the source MFE may use any one of the network addresses in the VTEP group record. Some embodiments use a load balancing operation (e.g., a round-robin algorithm, a deterministic hash-based algorithm, etc.) to select one of the network addresses from the VTEP group record.

The use of logical network gateways and VTEP groups allows for many logical switches to be stretched across multiple datacenters without the number of tunnels (and therefore VTEP records stored at each MFE) exploding. Rather than needing to store a record for every host computer in every datacenter on which at least one DCN resides for a logical switch, all of the MAC addresses residing outside of the datacenter are aggregated into a single record that maps to a group of logical network gateway VTEPs.

In addition, the use of VTEP groups allows for failover of the logical network gateways in a particular datacenter without the need for every host in the datacenter to relearn all of the MAC addresses in all of the other datacenters that map to the logical network gateway VTEP. In some embodiments, the MAC:VTEP mappings may be learned via Address Resolution Protocol (ARP) or via receipt of data messages from the VTEP. In addition, in some embodiments, many of the mappings are shared via network controller clusters that operate in each of the datacenters. In some such embodiments, the majority of the mappings are shared via the network controller clusters, while learning via ARP and data message receipt is used more occasionally. With the use of VTEP groups, when an active logical network gateway fails, one of the standby logical network gateways for the same logical switch becomes the new active logical network gateway. This newly active logical network gateway notifies the MFEs in its datacenter that require the information (i.e., the MFEs that process data messages for the logical switch) that it is the new active member for its VTEP group (e.g., via a specialized encapsulated data message). This allows these MFEs to simply modify the list of VTEPs in the VTEP group record, without the need to create a new record and relearn all of the MAC addresses for the record.

In some embodiments, the edge devices hosting logical network gateways have both VTEPs that face the host computers of their datacenter as well as separate tunnel endpoints (e.g., corresponding to different interfaces) that face the inter-datacenter network, for communication with other edge devices. These tunnel endpoints are referred to herein as remote tunnel endpoints (RTEPs). In some embodiments, each logical network gateway implemented within a particular datacenter stores (i) VTEP records for determining destination tunnel endpoints within the particular datacenter when processing data messages received from other logical network gateways (i.e., via the RTEPs) as well as (ii) RTEP group records for determining destination tunnel endpoints for data messages received from within the particular datacenter.

When the edge device receives a data message for a particular logical switch from another logical network gateway, in some embodiments the edge device executes a datapath pipeline processing stage for the logical network gateway, based on the inter-site VNI and the receipt of the data message via its RTEP. The logical network gateway for the logical switch maps the destination MAC address to one of its stored VTEP records for the logical switch context and uses this VTEP as the destination network address in the tunnel header when transmitting the data message to the datacenter.

Conversely, when the edge device receives a data message for the particular logical switch from a host computer within the datacenter, in some embodiments the edge device executes the datapath pipeline processing stage for the logical network gateway based on the datacenter-specific VNI for the logical switch and the receipt of the data message via its VTEP. The logical network gateway stores RTEP group records for each other datacenter spanned by the logical switch and uses these to determine the destination network address for the tunnel header. Each RTEP group record, in some embodiments, maps a set of two or more RTEPs for a given datacenter (i.e., the RTEPs for the logical network gateways at that datacenter for the particular logical switch) to all MAC addresses connected to the particular logical switch that are located at that datacenter. The logical network gateway maps the destination MAC address of the underlying data message to one of the RTEP group records (using ARP on the inter-site network if no record can be found), and selects one of the RTEP network addresses in the identified RTEP group to use as the destination tunnel endpoint address for encapsulating the data message, such that the encapsulated data message is transmitted through the inter-site network to one of the logical network gateways for the particular logical switch at the datacenter where the destination DCN resides.

When the logical network gateways are configured in active-standby mode, the RTEP group record identifies the current active RTEP, and the logical network gateway will always select this network address from the RTEP group record. On the other hand, when the logical network gateways are in active-active mode, the logical network gateway may use any one of the network addresses in the identified RTEP group record. Some embodiments use a load balancing operation (e.g., a round-robin algorithm, a deterministic hash-based algorithm, etc.) to select one of the network addresses from the RTEP group record.

Similar to VTEP groups, the use of RTEP groups allows for failover of the logical network gateways in a particular datacenter without the need for every logical network gateway in the other datacenters to relearn all of the MAC addresses that map to the logical network in the particular datacenter. As with the MAC: VTEP mappings, the MAC: RTEP mappings are preferably learned via the network controller clusters, with learning via ARP and data message receipt also available. When an active logical network gateway in a particular datacenter fails, one of the standby logical network gateways for the same logical switch in the particular datacenter becomes the new active logical network gateway. This newly-active logical network gateway notifies the logical network gateways for the logical switch at the other datacenters that require the information (i.e., the other datacenters spanned by the logical switch) that it is the new active member for its VTEP group (e.g., via a routing protocol message). This allows these other logical network gateways to simply modify the list of RTEPs in their RTEP group record, without the need to create a new record and relearn all of the MAC addresses for the record.

As noted above, the logical networks of some embodiments are defined to include tier-1 and/or tier-0 logical routers, in addition to the logical switches. In some embodiments, logical switches (i.e., the logical switches to which DCNs connect) connect directly to tier-1 (T1) logical routers, which can link different logical switches together as well as provide services to the logical switches connected to them. In some embodiments, the T1 logical routers may be entirely distributed (e.g., if just providing a connection between logical switches that avoids the use of a T0 logical router), or include centralized SR components implemented on edge devices (e.g., to perform stateful services for data messages sent to and from the logical switches connected to the T1 logical router.

In addition, in some embodiments, T1 logical routers and the logical switches connected to them may be defined entirely within a single datacenter of a federated set of datacenters. In some embodiments, constructs of the logical network that span multiple datacenters (e.g., T0 logical routers, T1 logical routers, logical switches, security groups, etc.) are defined by a network administrator through the global manager. However, a network administrator (e.g., the same admin or a different, local admin) can also define networks that are local to a specific datacenter through the global manager. These T1 logical routers can be connected to a datacenter-specific T0 logical router for handling data traffic with external networks or can instead be connected to a T0 logical router of the datacenter-spanning logical network in some embodiments. As described below, when datacenter-specific T1 logical routers are connected to a T0 logical router that spans multiple datacenters, in some embodiments the SRs of the T0 logical router share routes advertised by the datacenter-specific T1 logical router.

When a globally-defined T1 logical router is defined to provide stateful services at SRs, the network administrator can define the datacenters to which the T1 spans in some embodiments (a globally-defined T1 logical router without SRs will automatically span to all of the datacenters spanned by the T0 logical router to which it connects). For a T1 logical router with stateful services, the network administrator can define the T1 logical router to span to any of the datacenters spanned by the T0 logical router to which it connects; that is, the T1 logical router cannot be defined to span to datacenters not spanned by the T0 logical router.

Some embodiments allow the T1 SRs to be deployed in active-active mode or active-standby mode, while other embodiments only allow active-standby mode (e.g., if the SR is providing stateful services such as a stateful firewall, stateful load balancing, etc.). The T1 SRs, in some embodiments, provide stateful services for traffic between (i) DCNs connected to logical switches that connect to the T1 logical router and (ii) endpoints outside of that T1 logical router, which could include endpoints external to the logical network and datacenter as well as logical network endpoints connected to other logical switches.

In addition, for T1 logical routers that have SRs located in multiple datacenters, some embodiments allow (or require) the network administrator to select one of the datacenters as a primary site for the T1 logical router. In this case, all traffic requiring stateful services is routed to the primary site active SR. When a DCN that is located at a secondary datacenter sends a data message to an endpoint external to the T1 logical routers, the source MFE for the data message performs first-hop logical processing, such that the DR routes the data message to the active SR within that secondary datacenter, and transmits the data message through the datacenter according to the transit logical switch (e.g., using the transit logical switch VNI) for the datacenter between the T1 DR and T1 SR. As mentioned, in some embodiments the network managers define a transit logical switch within each datacenter to connect the DR for the logical router to the SRs within the datacenter for the logical router. As this transit logical switch only spans a single datacenter, there is no need to define logical network gateways for the transit logical switch.

The active SR within the secondary datacenter routes the data message to the active SR in the primary datacenter according to its routing table which, as described below, is configured by a combination of the network managers and routing protocol synchronization between the SRs. The edge device implementing the active T1 SR in the secondary datacenter transmits the data message (according to the logical network gateway for the backplane logical switch connecting the SRs, using the backplane logical switch VNI) to the edge device implementing the active T1 SR in the primary datacenter.

As described above, in some embodiments a backplane logical switch is automatically configured by the network managers to connect the SRs of a logical router. This backplane logical switch is stretched across all of the datacenters at which SRs are implemented for the logical router, and therefore logical network gateways are implemented at each of these datacenters for the backplane logical switch. In some embodiments, the network managers link the SRs of a logical router with the logical network gateways for the backplane logical switch connecting those SRs, so that they are always implemented on the same edge devices. That is, the active SR within a datacenter and the active logical network gateway for the corresponding backplane logical switch within that datacenter are assigned to the same edge device, as are the standby SR and standby logical network gateway. If either the SR or the logical network gateway need to failover (even if for a reason that would otherwise affect only one of the two), then both will failover together. Keeping the SR with the logical network gateway for the corresponding backplane logical switch avoids the need for extra physical hops when transmitting data messages between datacenters.

Thus, the T1 SR at the primary datacenter may receive outbound data messages from either the other T1 SRs at secondary datacenters or MFEs at host computers within the primary datacenter. The primary T1 SR performs stateful services (e.g., stateful firewall, load balancing, etc.) on these data messages in addition to routing the data messages. In some embodiments, the primary T1 SR includes a default route to route data messages to the DR of the T0 logical router to which the T1 logical router is linked. Depending on whether the data message is directed to a logical network endpoint (e.g., connected to a logical switch behind a different T1 logical router) or an external endpoint (e.g., a remote machine connected to the Internet), the T0 DR will route the message to the different T1 logical router or to the T0 SR.

For traffic from remote external machines directed to logical network DCNs behind a T1 logical router, in some embodiments these data messages are always received initially at the primary datacenter T1 SR (after T0 processing). This is because, irrespective of in which datacenter the T0 SR receives an incoming data message for processing by the T1 SR, the T0 routing components are configured to route the data message to the primary datacenter T1 SR to have the stateful services applied. The primary datacenter T1 SR applies these services and then routes the data message to the T1 DR. The edge device in the primary datacenter that implements the T1 SR can then perform logical processing for the T1 DR and the logical switch to which the destination DCN connects. If the DCN is located in a remote datacenter, the data message is sent through the logical network gateways for this logical switch (i.e., not the backplane logical switch). Thus, the physical paths for ingress and egress traffic could be different, if the logical network gateways for the logical switch to which the DCN connects are implemented on different edge devices than the T1 SRs and backplane logical switch logical network gateways.

T0 logical routers, as mentioned, handle the connection of the logical network to external networks. In some embodiments, the T0 SRs exchange routing data (e.g., using a routing protocol such as Border Gateway Protocol (BGP) or Open Shortest Path First (OSPF)) with physical routers of the external network, in order to manage this connection and correctly route data messages to the external routers. This route exchange is described in further detail below.

In some embodiments, the network administrator defines a T0 logical router as well as the datacenters to which the T0 logical router spans through the global network manager. One or more T1 logical routers and/or logical switches may be connected to this T0 logical router, and the maximum span of those logical forwarding elements underneath the T0 logical router is defined by the span of the T0 logical router. That is, in some embodiments, the global manager will not allow the span of a T1 logical router or logical switch to include any datacenters not spanned by the T0 logical router to which they connect (assuming they do connect to a T0 logical router).

Network administrators are able to connect the T1 logical routers to T0 logical routers in some embodiments. For a T1 logical router with a primary site, some embodiments define a link between the routers (e.g., with a transit logical switch in each datacenter between the T1 SRs in the datacenter and the T0 DR), but mark this link as down at all of the secondary datacenters (i.e., the link is only available at the primary datacenter). This results in the T0 logical router routing incoming data messages only to the T1 SR at the primary datacenter.

The T0 SRs can be configured in active-active or active-standby configurations. In either configuration, some embodiments automatically define (i) a backplane logical switch that stretches across all of the datacenters spanned by the T0 logical router to connect the SRs and (ii) separate transit logical switches in each of the datacenters connecting the T0 DR to the T0 SRs that are implemented in that datacenter.

When a T0 logical router is configured as active-standby, some embodiments automatically assign one active and one (or more) standby SRs for each datacenter spanned by the T0 logical router (e.g., as defined by the network administrator). As with the T1 logical router, one of the datacenters can be designated as the primary datacenter for the T0 logical router, in which case all logical network ingress/egress traffic (referred to as north-south traffic) is routed through the SR at that site. In this case, only the primary datacenter SR advertises itself to the external physical network as a next hop for logical network addresses. In addition, the secondary T0 SRs route northbound traffic to the primary T0 SR.

So long as there are no stateful services configured for the T0 SR, some embodiments also allow for there to be no designation of a primary datacenter. In this case, north-south traffic may flow through the active SR in any of the datacenters. In some embodiments, different northbound traffic may flow through the SRs at different datacenters, depending either on dynamic routes learned via routing protocol (e.g., by exchanging BGP messages with external routers) or on static routes configured by the network administrator to direct certain traffic through certain T0 SRs. Thus, for example, a northbound data message originating from a DCN located at a first datacenter might be transmitted (i) from the host computer to a first edge device implementing a secondary T1 SR at the first datacenter, (ii) from the first edge device to a second edge device implementing the primary T1 SR at a second datacenter, (iii) from the second edge device to a third edge device implementing the T0 SR at the second datacenter, and (iv) from the third edge device to a fourth edge device implementing the T0 SR at a third datacenter, from which the data message egresses to the physical network.

Some embodiments, as mentioned, also allow for active-active configuration of the T0 SRs. In some such embodiments, the network administrator can define one or more active SRs (e.g., up to a threshold number) for each datacenter spanned by the T0 logical router. Different embodiments either allow or disallow the configuration of a primary datacenter for the active-active configuration. If there is a primary datacenter configured, in some embodiments the T0

SRs at secondary datacenters use equal-cost multi-path (ECMP) routing to route northbound data messages to the primary T0 SRs. ECMP is similarly used when routing data traffic from a T0 SR at one datacenter to a T0 SR at another datacenter for any other reason (e.g., due to an egress route learned via BGP). In addition, when an edge device implementing a T1 logical router processes a northbound data message, after routing the data message to the T0 DR, the processing pipeline stage for the T0 DR uses ECMP to route the data message to one of the T0 SRs in the same datacenter.

As with T1 logical router processing, southbound data messages do not necessarily follow the exact reverse path as did the corresponding northbound data message. If there is a primary datacenter defined for a T0 SR, then this SR will typically receive the southbound data messages from the external network (by virtue of advertising itself as the next hop for the relevant logical network addresses). If no T0 SR is designated as primary, then any active T0 SR at any of the datacenters may receive a southbound data message from the external network (though typically the T0 SR that transmitted corresponding northbound data messages will receive the southbound data messages).

The T0 SR in some embodiments, is configured to route the data message to the datacenter with the primary T1 SR, as this is the only datacenter for which a link between the T0 logical router and the T1 logical router is defined. Thus, the T0 SR routes the data message to the T0 SR at the primary datacenter for the T1 SR with which the data message is associated. In some embodiments, the routing table is merged for the T0 SR and T0 DR for southbound data messages, so that no additional stages need to be executed for the transit logical switch and T0 DR. In this case, at the primary datacenter for the T1 logical router, in some embodiments the merged T0 SR/DR stage routes the data message to the primary T1 SR, which may be implemented on a different edge device. The primary T1 SR performs any required stateful services on the data message, and proceeds with routing as described above.

In some embodiments, the local managers define the routing configurations for the SRs and DRs (of both T1 and T0 logical routers) and push this routing configuration to the edge devices and host computers that implement these logical routing components. For logical networks in which all of the LFEs are defined at the global manager, the global manager pushes to the local managers the configuration information regarding all of the LFEs that span to their respective datacenters. These local managers use this information to generate the routing tables for the various logical routing components implemented within their datacenters.

For instance, for a T1 logical router, each secondary SR is configured with a default route to the primary T1 SR by the local manager at the T1 SR. Similarly, the primary SR is configured with a default route to the T0 DR in some embodiments. In addition, the primary SR is configured with routes for routing data traffic to the T1 DR. In some embodiments, a merged routing table for the primary SR and DR of the T1 logical router is configured to handle routing southbound data messages to the appropriate stretched logical switch at the primary T1 SR.

For a T0 logical router, the majority of the routes for routing logical network traffic (e.g., southbound traffic) are also configured for the T0 SRs by the local managers. To handle traffic to stretched T1 logical routers, the T0 SRs are configured with routes for logical network addresses handled by these T1 logical routers (e.g., network address translation (NAT) IP addresses, load balancer virtual IP addresses (LB VIPs), logical switch subnets, etc.). In some embodiments, the T0 SR routing table (merged with the T0 DR routing table) in the same datacenter as the primary SR for a T1 logical router is configured with routes to the primary T1 SR for these logical network addresses. In other datacenters, the T0 SR is configured to route data messages for these logical network addresses to the T0 SR in the primary datacenter for the T1 logical router.

In some embodiments, a network administrator can also define LFEs that are specific to a datacenter and link those LFEs to the larger logical network through the local manager for the specific datacenter (e.g., by defining a T1 logical router and linking the T1 logical router to a T0 logical router of the larger logical network). In some such embodiments, configuration data regarding the T1 logical router will not be distributed to the other datacenters implementing the T0 logical router. In this case, in some embodiments, the local manager at the specific datacenter configures the T0 SR implemented in this datacenter with routes for the logical network addresses related to the T1 logical router. This T0 SR exchanges these routes with the T0 SRs at the other datacenters via a routing protocol application, thereby attracting southbound traffic directed to these network addresses.

In addition, one or more of the T0 SRs will generally be connected to external networks (e.g., directly to an external router, or a top-of-rack (TOR) forwarding element that in turn connects to external networks) and exchange routes with these external networks. In some embodiments, the local manager configures the edge devices hosting the T0 SRs to advertise certain routes to the external network and to not advertise others, as described further below. If there is only a single egress datacenter for the T0 SR, then the T0 SR(s) in that datacenter will learn routes from the external network via a routing protocol and can then share these routes with the peer T0 SRs in the other datacenters.

When there are multiple datacenters available for egress, typically all of the T0 SRs will be configured with default routes that direct traffic to their respective external network connections. In addition, the T0 SRs will learn routes for different network addresses from their respective external connections, and can share these routes with their peer T0 SRs in other datacenters so as to attract northbound traffic for which they are the optimal egress point.

In some embodiments, in order to handle this route exchange (between T0 SR peers, between T1 SR peers (in certain cases), and between T0 SRs and their external network routers), the edge devices on which SRs are implemented execute a routing protocol application (e.g., a BGP or OSPF application). The routing protocol application establishes routing protocol sessions with the routing protocol applications on other edge devices implementing peer SRs as well as with any external network router(s). In some embodiments, each routing protocol session uses a different routing table (e.g., a virtual routing and forwarding table (VRF)) for each routing protocol session. For T1 SRs, some embodiments use the routing protocol session primarily to notify the other peer T1 SRs that a given T1 SR is the primary SR for the T1 logical router. For example, when the primary datacenter is changed or failover occurs such that the (previous) standby T1 SR in the primary datacenter becomes the active primary T1 SR, the new primary T1 SR sends out a routing protocol message indicating that it is the new T1 SR and default routes for the other T1 SR peers should be directed to it.

In some embodiments, the routing protocol application uses two different VRFs for route exchange for a given T0

SR. First, each T0 SR has a datapath VRF that is used by the datapath on the edge device for processing data messages sent to the T0 SR. In some embodiments, the routing protocol application uses this datapath VRF for route exchange with the external network router(s). Routes for any prefixes identified for advertisement to the external networks are used by the datapath to implement the T0 SR, and the routing protocol application advertises these routes to the external networks. In addition, routes received from the external network via routing protocol messages are automatically added to the datapath VRF for use implementing the T0 SR.

In addition, in some embodiments, the routing protocol application is configured to import routes from the datapath VRF to a second VRF (referred to as the control VRF). The control VRF is used by the routing protocol application for the routing protocol sessions with other SRs for the same T0 logical router. Thus, any routes learned from the session with an external network router at a first T0 SR can be shared via the control VRF to all of the other T0 SRs. When the routing protocol application receives a route from a peer T0 SR, in some embodiments the application adds this route to the datapath VRF for the T0 SR on that edge device only so long as there is not already a better route in the datapath VRF for the same prefix (i.e., a route with a shorter administrative distance). On the other hand, when primary/secondary T0 SRs are configured, the routing protocol application at the secondary T0 SR adds routes learned from the primary peer T0 SR to the datapath VRF in place of routes learned locally from an external network router in some embodiments.

It should be noted that while the above description regarding use of both a datapath VRF and a control VRF refers to a T0 SR that is stretched across multiple federated datacenters, in some embodiments the concepts also apply to logical routers generically (i.e., any logical router that has centralized routing components which share routes with each other as well as with an external network or other logical routers). In addition, the use of both a datapath VRF and a control VRF applies to logical routers (e.g., T0 logical routers) of logical networks that are confined to a single datacenter. SRs of such logical routers may still have asymmetric connections to external networks and therefore need to exchange routes with each other.

For edge devices on which multiple SRs are implemented (e.g., multiple T0 SRs), different embodiments may use a single control VRF or multiple control VRFs. Using multiple control VRFs allows for the routes for each SR to be kept separate, and only provided to other peer SRs via an exclusive routing protocol session. However, in a network with numerous SRs implemented on the same edge device and each SR peering with other SRs in multiple other datacenters, this solution may not scale well because numerous VRFs and numerous routing protocol sessions are required on each edge device.

Thus, some embodiments use a single control VRF on each edge device, with different datapath VRFs for each SR. When routes are imported from a datapath VRF to the control VRF, these embodiments add a tag or set of tags to the routes that identifies the T0 SR. For instance, some embodiments use multiprotocol BGP (MP-BGP) for the routing protocol and use the associated route distinguishers and route targets as tags. Specifically, the tags both (i) ensure that all network addresses are unique (as different logical networks could have overlapping network address spaces) and (ii) ensure that each route is exported to the correct edge devices and imported into the correct datapath VRFs.

In addition, some embodiments use additional tags on the routes to convey user intent and determine whether or not to advertise routes in the datapath VRF to external networks. For instance, some embodiments use BGP communities to tag routes. As described above, routes in the datapath VRF for a given SR may be configured by the local manager, learned via route exchange with the external network router(s), and added from the control VRF after route exchange with other SR peers.

Routes that a first T0 SR learns from route exchange will be imported into the control VRF and thus shared with a second T0 SR in a different datacenter (and third T0 SR, etc.). However, while these routes may be added to the datapath VRF for the second T0 SR, they should not necessarily be advertised out to external networks by the second T0 SR, because the T0 SRs should not become a conduit for routing traffic between the external network at one datacenter and the external network at another datacenter (i.e., traffic unrelated to the logical network). Accordingly, some embodiments apply a tag to these routes when exchanging the routes with other T0 peers, so that these routes are not further advertised. Different tags are applied to routes that should be advertised, to identify LB VIPs, NAT IPs, logical networks with public network address subnets, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a system for implementing a logical network that spans across multiple datacenters (e.g., in multiple different geographic regions). In some embodiments, a user (or multiple users) defines the logical network as a set of logical network elements (e.g., logical switches, logical routers, logical middleboxes) and policies (e.g., forwarding policies, firewall policies, NAT rules, etc.). The logical forwarding elements (LFEs) may be implemented across some or all of the multiple datacenters, such that data traffic is transmitted (i) between logical network endpoints (e.g., data compute nodes (DCNs)) within a datacenter, (ii) between logical network endpoints in two different datacenters, and (iii) between logical network endpoints in a datacenter and endpoints external to the logical network (e.g., external to the datacenters).

Figure 1:
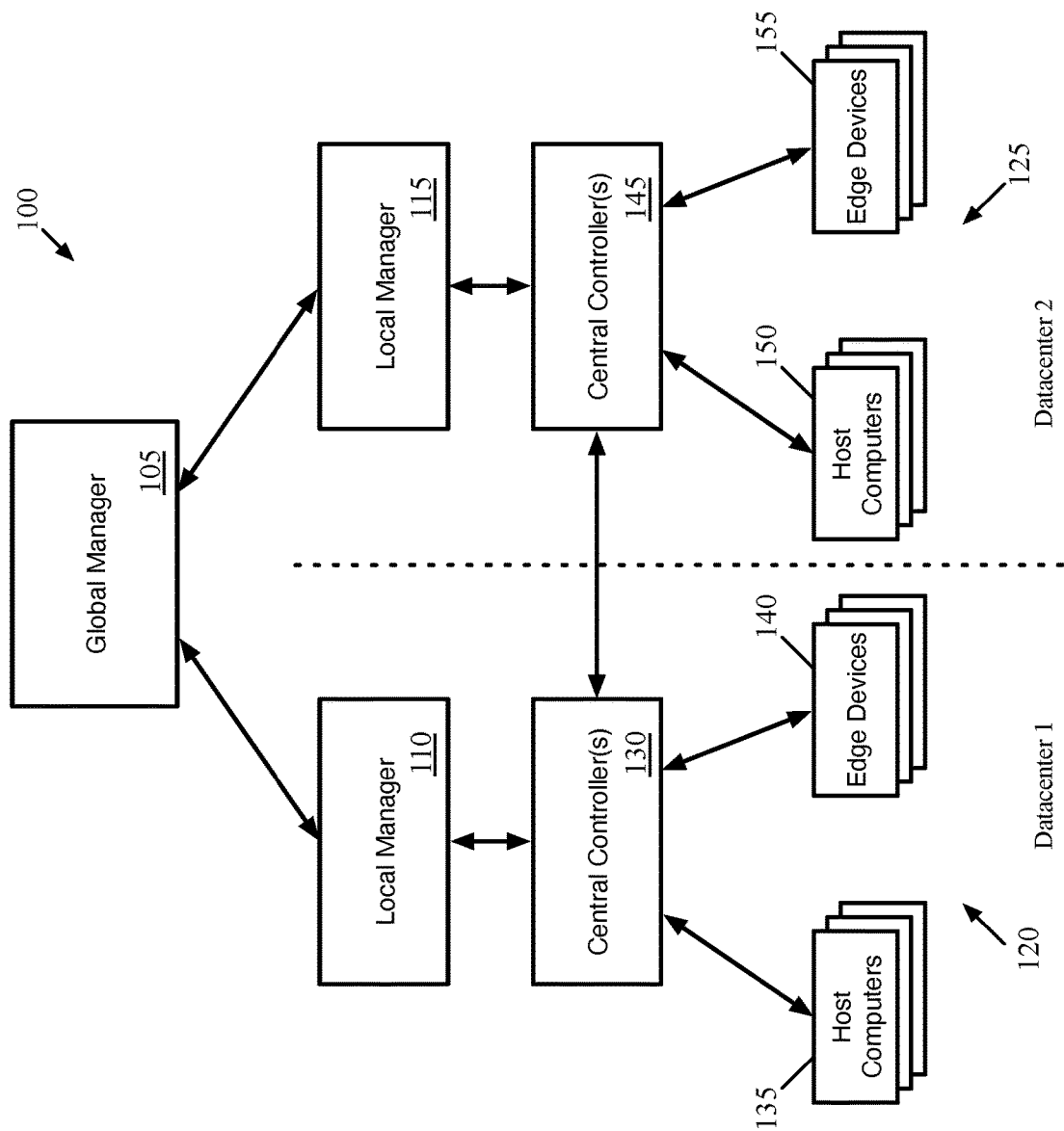
FIG. 1 conceptually illustrates a network management system of some embodiments.

The logical network, in some embodiments, is a conceptual network structure that a network administrator (or multiple network administrators) define through a set of network managers. Specifically, some embodiments include a global manager as well as local managers for each datacenter. FIG. 1 conceptually illustrates such a network management system 100 of some embodiments. This network management system 100 includes a global manager 105 as well as local managers 110 and 115 at each of two datacenters 120 and 125 that are spanned by the logical network. The first datacenter 120 includes central controllers 130 as well as host computers 135 and edge devices 140 in addition to the local manager 110, while the second datacenter 125 includes central controllers 145 as well as host computers 150 and edge devices 155 in addition to the local manager 115.

In some embodiments, the network administrator(s) define the logical network to span a set of physical sites (in this case the two illustrated datacenters 120 and 125) through the global manager 105. In addition, any logical network constructs (such as LFEs) that span multiple datacenters are defined through the global manager 105. This global manager, in different embodiments, may operate at one of the datacenters (e.g., on the same machine or machines as the local manager at that site or on different machines than the local manager) or at a different site.

The global manager 105 provides data to the local managers at each of the sites spanned by the logical network (in this case, local managers 110 and 115). In some embodiments, the global manager identifies, for each logical network construct, the sites spanned by that construct, and only provides information regarding the construct to the identified sites. Thus, security groups, logical routers, etc. that only span the first datacenter 120 will be provided to the local manager 110 and not to the local manager 115. In addition, LFEs (and other logical network constructs) that are exclusive to a site may be defined by a network administrator directly through the local manager at that site. The logical network configuration and the global and local network managers are described in greater detail in U.S. patent application Ser. No. 16/906,944, filed Jun. 19, 2020, entitled "Parsing Logical Network Definition for Different Sites", now issued as U.S. Pat. No. 11,088,916, which is incorporated herein by reference.

The local manager 110 or 115 at a given site (or a management plane application, which may be separate from the local manager) uses the logical network configuration data received either from the global manager 105 or directly from a network administrator to generate configuration data for the host computers 135 and 150 and the edge devices 140 and 155 (referred to collectively in the following as computing devices), which implement the logical network. The local managers provide this data to the central controllers 130 and 145, which determine to which computing devices configuration data about each logical network construct should be provided. In some embodiments, different LFEs (and other constructs) span different computing devices, depending on which logical network endpoints operate on the host computers 135 and 150 as well as to which edge devices various LFE constructs are assigned (as described in greater detail below).

The central controllers 130 and 145, in addition to distributing configuration data to the computing devices, receive physical network to logical network mapping data from the computing devices in some embodiments and share this information across datacenters. For instance, in some embodiments, the central controllers 130 retrieve tunnel endpoint to logical network address mapping data from the host computers 135, and share this information (i) with the other host computers 135 and the edge devices 140 in the first datacenter 120 and (ii) with the central controllers 145 in the second datacenter 125 (so that the central controllers 145 can share this data with the host computers 150 and/or the edge devices 155). Further information regarding these mappings, their use, and distribution is described below.

The logical network of some embodiments may include both logical switches (to which logical network DCNs attach) and logical routers. Each LFE (e.g., logical switch or logical router) is implemented across one or more datacenters, depending on how the LFE is defined by the network administrator. In some embodiments, the LFEs are implemented within the datacenters by managed forwarding elements (MFEs) executing on host computers that also host DCNs of the logical network (e.g., with the MFEs executing in virtualization software of the host computers) and/or on edge devices within the datacenters. The edge devices, in some embodiments, are computing devices that may be bare metal machines executing a datapath and/or computers on which DCNs execute to a datapath. These datapaths, in some embodiments, perform various gateway operations (e.g., gateways for stretching logical switches across datacenters, gateways for executing centralized features of logical routers such as performing stateful services and/or connecting to external networks).

Figure 2:
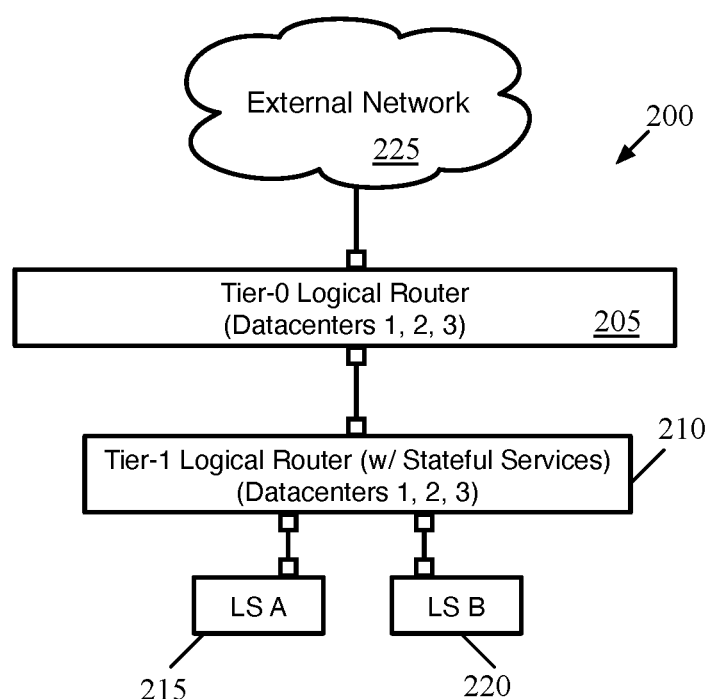
FIG. 2 conceptually illustrates a simple example of a logical network 200 of some embodiments.

FIG. 2 conceptually illustrates a simple example of a logical network 200 of some embodiments. This logical network 200 includes a tier-0 (T0) logical router 205, a tier-1 (T1) logical router 210, and two logical switches 215 and 220. Though not shown, various logical network endpoints (e.g., VMs, containers, or other DCNs) attach to logical ports of the logical switches 215 and 220. These logical network endpoints execute on host computers in the datacenters spanned by the logical switches to which they attach. In this example, both the T0 logical router and the T1 logical router are defined to have a span including three datacenters. In some embodiments, the logical switches 215 and 220 inherit the span of the logical router 205 to which they connect.

As in this example, logical routers, in some embodiments, may include T0 logical routers (e.g., router 205) that connect directly to external networks and T1 logical routers (e.g., router 210) that segregate a set of logical switches from the rest of the logical network and may perform stateful services for endpoints connected to those logical switches. These logical routers, in some embodiments, are defined by the network managers to have one or more routing components, depending on how the logical router has been configured by the network administrator.

Figure 3:
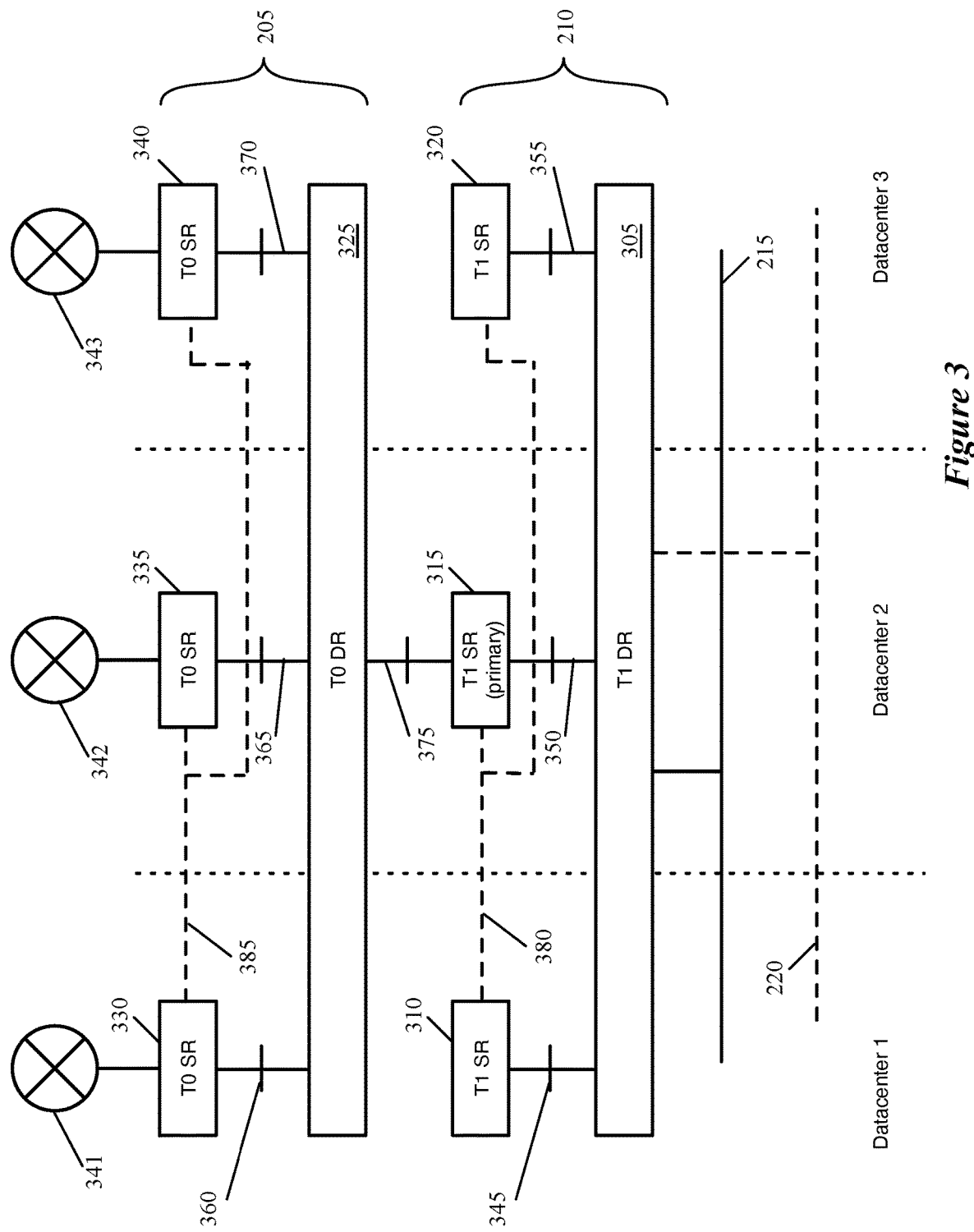
FIG. 3 conceptually illustrates the logical network of FIG. 2 showing the logical routing components of the logical routers as well as the various logical switches that connect to these logical components and that connect the logical components to each other.

FIG. 3 conceptually illustrates the logical network 200 showing the logical routing components of the logical routers 205 and 210 as well as the various logical switches that connect to these logical components and that connect the logical components to each other. As shown, the T1 logical router 210 includes a distributed routing component (DR) 305 as well as a set of centralized routing components (also referred to as service routers, or SRs) 310-320. T1 logical routers, in some embodiments, may have only a DR, or may have both a DR as well as SRs. For T1 logical routers, SRs allow for centralized (e.g., stateful) services to be performed on data messages sent between (i) DCNs connected to logical switches that connect to the T1 logical router and (ii) DCNs connected to other logical switches that do not connect to the tier-1 logical router or from external network endpoints. In this example, data messages sent to or from DCNs connected to logical switches 215 and 220 will have stateful services applied by one of the SRs 310-320 of the T1 logical router 210 (specifically, by the primary SR 315).

T1 logical routers may be connected to T0 logical routers in some embodiments (e.g., T1 logical router 210 connecting to T0 logical router 205). These T0 logical routers, as mentioned, handle data messages exchanged between the logical network DCNs and external network endpoints. As shown, the T0 logical router 205 includes a DR 325 as well as a set of SRs 330-340. In some embodiments, T0 logical routers include an SR (or multiple SRs) operating in each datacenter spanned by the logical router. In some or all of these datacenters, the T0 SRs connect to external routers 341-343 (or to top of rack (TOR) switches that provide connections to external networks).

In addition to the logical switches 215 and 220 (which span all of the datacenters spanned by the T1 DR 305), FIG. 3 also illustrates various automatically-defined logical switches. Within each datacenter, the T1 DR 305 connects to its respective local T1 SR 310-320 via a respective transit logical switch 345-355. Similarly, within each datacenter, the T0 DR 325 connects to its respective local T0 SR 330-340 via a respective transit logical switch 360-370. In addition, a router link logical switch 375 connects the primary T1 SR 315 (that performs the stateful services for the T1 logical router) to the T0 DR 325. In some embodiments, similar router link logical switches are defined for each of the other datacenters but are marked as down.

Lastly, the network management system also defines backplane logical switches that connect each set of SRs. In this case, there is a backplane logical switch 380 connecting the three T1 SRs 310-320 and a backplane logical switch 385 connecting the three T0 SRs 330-340. These backplane logical switches, unlike the transit logical switches, are stretched across the datacenters spanned by their respective logical routers. When one SR for a particular logical router routes a data message to another SR for the same logical router, the data message is sent according to the appropriate backplane logical switch.

Figure 4:
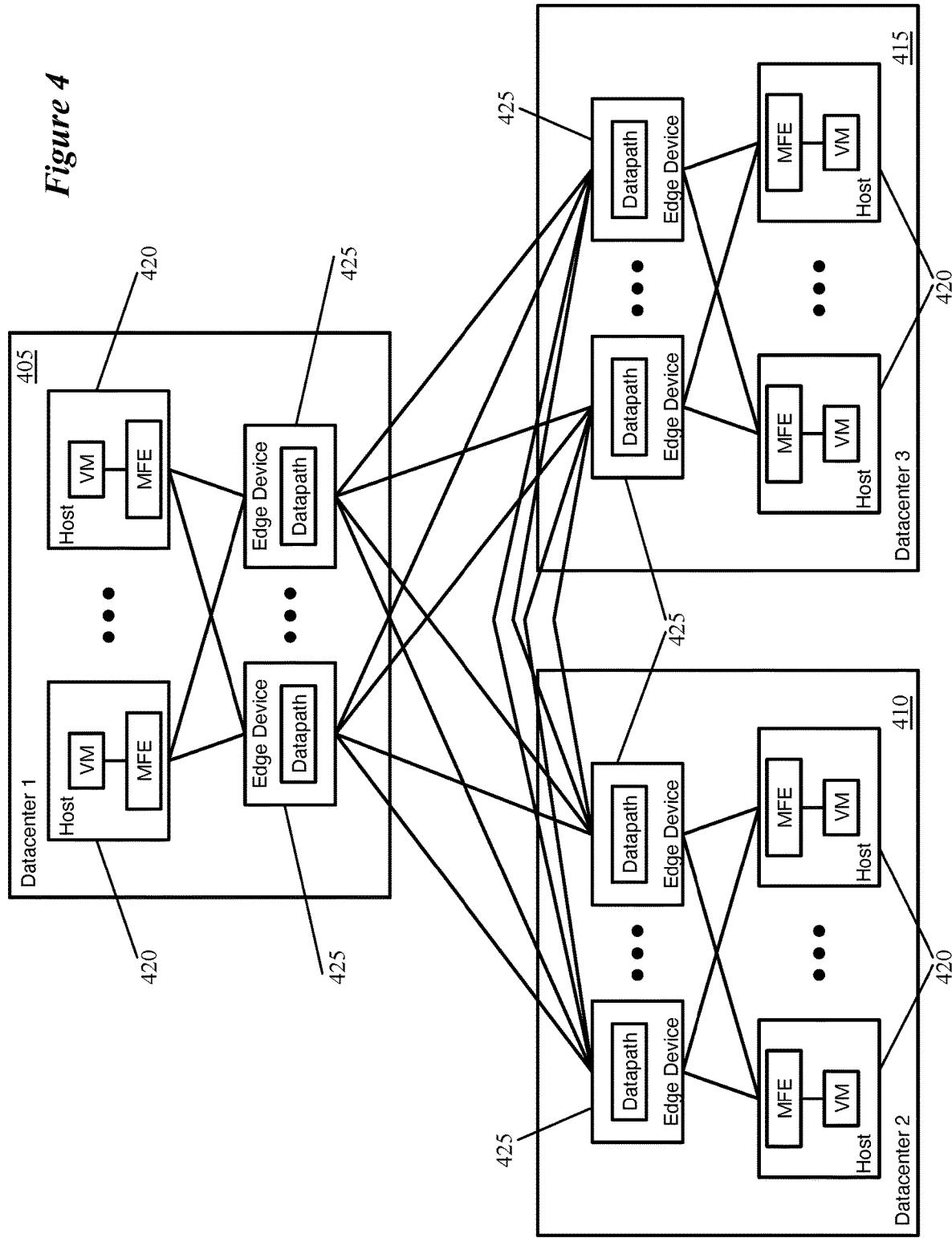
FIG. 4 conceptually illustrates three datacenters spanned by the logical network of FIG. 2 with the host computers and edge devices that implement the logical network.

As mentioned, the LFEs of a logical network may be implemented by MFEs executing on source host computers as well as by the edge devices. FIG. 4 conceptually illustrates the three datacenters 405-415 spanned by the logical network 200 with the host computers 420 and edge devices 425 that implement the logical network. VMs (in this example) or other logical network endpoint DCNs operate on the host computers 420, which execute virtualization software for hosting these VMs. The virtualization software, in some embodiments, includes the MFEs such as virtual switches and/or virtual routers. In some embodiments, one MFE (e.g., a flow-based MFE) executes on each host computer 420 to implement multiple LFEs, while in other embodiments multiple MFEs execute on each host computer 420 (e.g., one or more virtual switches and/or virtual routers). In still other embodiments, different host computers execute different virtualization software with different types of MFEs. Within this application, "MFE" is used to represent the set of one or more MFEs that execute on a host computer to implement LFEs of one or more logical networks.

The edge devices 425, in some embodiments, execute datapaths (e.g., data plane development kit (DPDK) datapaths) that implement one or more LFEs. In some embodiments, SRs of logical routers are assigned to edge devices and implemented by these edge devices (the SRs are centralized, and thus not distributed in the same manner as the DRs or logical switches). The datapaths of the edge devices 425 may execute in the primary operating system of a bare metal computing device and/or execute within a VM or other DCN (that is not a logical network endpoint DCN) operating on the edge device, in different embodiments.

In some embodiments, as shown, the edge devices 425 connect the datacenters to each other (and to external networks). In such embodiments, the host computers 420 within a datacenter can send data messages directly to each other, but send data messages to host computers 420 in other datacenters via the edge devices 425. When a source DCN (e.g., a VM) in the first datacenter 405 sends a data message to a destination DCN in the second datacenter 410, this data message is first processed by the MFE executing on the same host computer 420 as the source VM, then by an edge device 425 in the first datacenter 405, then an edge device 425 in the second datacenter 410, and then by the MFE in the same host computer 420 as the destination DCN.

More specifically, when a logical network DCN sends a data message to another logical network DCN, the MFE executing on the host computer at which the source DCN resides performs logical network processing. In some embodiments, the source host computer MFE set (collectively referred to herein as the source MFE) performs processing for as much of the logical network as possible (referred to as first-hop logical processing). That is, the source MFE processes the data message through the logical network until either (i) the destination logical port for the data message is determined or (ii) the data message is logically forwarded to an LFE for which the source MFE cannot perform processing (e.g., an SR of a logical router).

Figure 5:
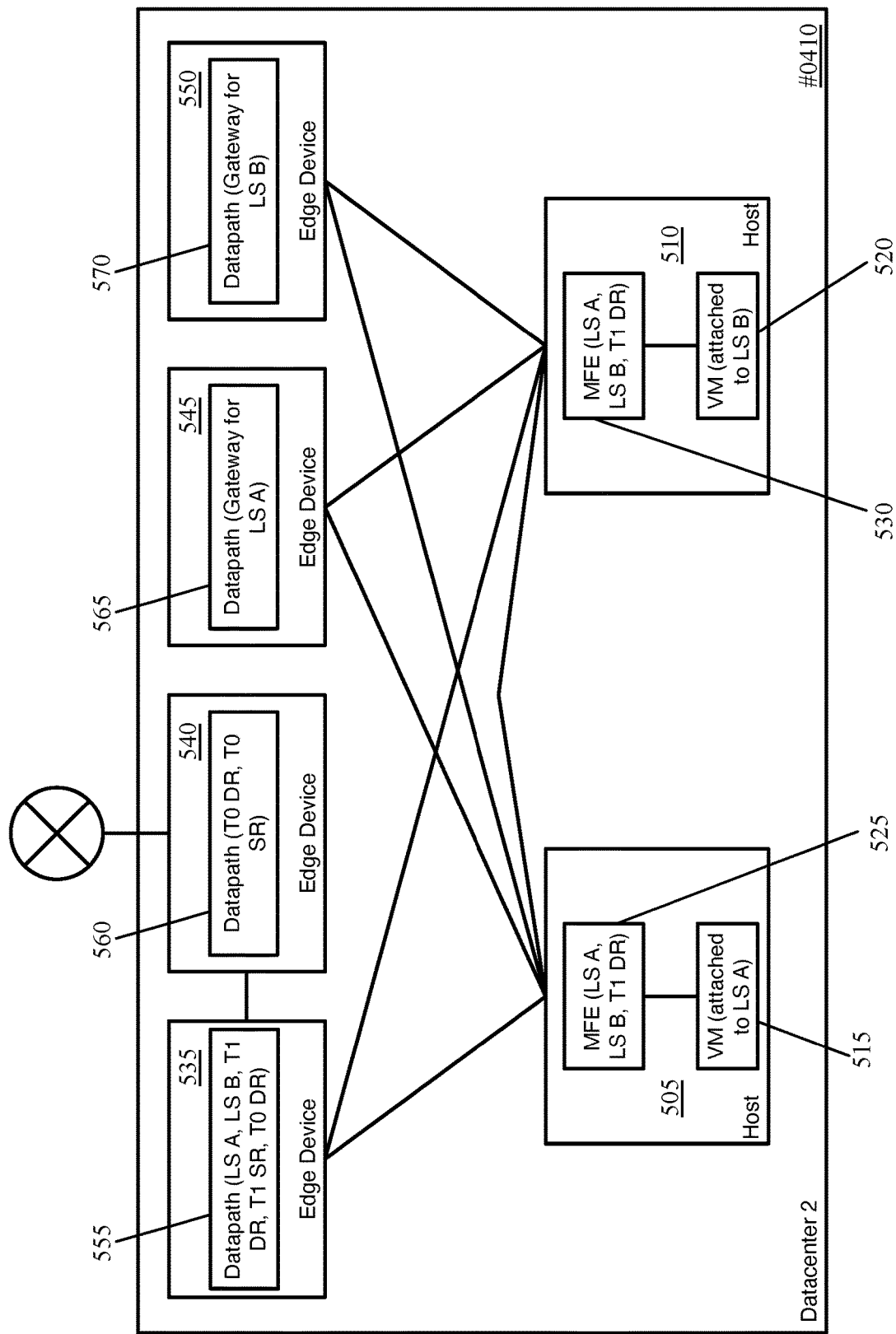
FIG. 5 conceptually illustrates several of the computing devices in one of the datacenters of FIG. 4 in greater detail.

FIG. 5 conceptually illustrates several of the computing devices in one of the datacenters 410 in greater detail and will be used to explain data message processing between logical network endpoint DCNs in greater detail. As shown, the datacenter 410 includes a first host computer 505 that hosts a VM 515 attached to the first logical switch 215 as well as a second host computer 510 that hosts a VM 520 attached to the second logical switch 220. In addition, an MFE (e.g., a set of virtual switches and/or virtual routers) executes on each of the host computers 505 and 510 (e.g., in virtualization software of the host computers). Both the MFE 525 as well as the MFE 530 are configured to implement each of the logical switches 215 and 220, as well as the DR 305 of the T1 logical router 210. Any further processing that is required (e.g., by the T1 SR 315 or any component of the T0 logical router 205) requires sending a data message to at least the edge device 535.

This figure shows four edge devices 535-550, which execute datapaths 555-570, respectively. The datapath 555 executing on the edge device 535 is configured to implement the T1 SR 315, in addition to the logical switches 215 and 220, the T1 DR 305, and the T0 DR 325. The datapath 560 executing on the edge device 540 is configured to implement the T0 SR 335 in addition to the T0 DR 325. While not shown, each of these datapaths 555 and 560 is also configured to implement the relevant router link logical switches connecting to the logical routing components that they implement, as well as the relevant backplane logical switches 380 (for datapath 555) and 385 (for datapath 560).

It should also be noted that, in some embodiments, the SRs are implemented in either active-standby mode (in which case one edge device in each datacenter implements an active SR and one edge device in each datacenter implements a standby SR) or in active-active mode (in which one or more edge devices in each datacenter implement active SRs). For the sake of simplicity in this figure, only one edge device implementing each SR is illustrated.

The datapath 565 of the third edge device 545 implements a logical network gateway for the first logical switch 215 and the datapath 570 of the fourth edge device 550 implements a logical network gateway for the second logical switch 220. These logical network gateways, as further described below, handle data messages sent between logical network endpoint DCNs in different datacenters. In some embodiments, for each logical switch that stretches across multiple datacenters in a federated network, one or more logical network gateways (e.g., a pair of active-standby logical network gateways) are assigned for each datacenter spanned by the logical switch (e.g., by the local managers of those datacenters). The logical switches for which logical network gateways are implemented may include administrator-defined logical switches to which logical network DCNs connect (e.g., logical switches 215 and 220) as well as other types of logical switches (e.g., backplane logical switches 380 and 385).

As an example of data message processing, if a VM 515 sends a data message to another VM attached to the same logical switch 215, then the MFE 525 (referred to for this data message as the source MFE) will only need to perform logical processing for the logical switch to determine the destination of the data message. If the VM 515 sends a data message to another VM attached to the other logical switch 220 (e.g., the VM 5250) that is connected to the same T1 logical router 210 as the logical switch 215, then the source MFE 525 performs logical processing for the first logical switch 215, the DR 305 of the logical router 210, and the second logical switch 220 to determine the destination of the data message.

On the other hand, if the VM 515 sends a data message to a logical network endpoint DCN on a second logical switch that is connected to a different T1 logical router (not shown in FIGS. 2 and 3), then the source MFE 525 only performs logical processing for the first logical switch, the T1 DR 305 (which routes the data message to the T1 SR 315 in that datacenter), and the transit logical switch 350 connecting the T1 DR to the T1 SR within the datacenter. The MFE 525 transmits the data message to the edge device 535, and this datapath performs additional logical processing, depending on the destination and the logical network configuration. This processing is described in greater detail below.

For data messages that are not sent to the SRs, once the source MFE identifies the destination (e.g., a destination logical port on a particular logical switch), this source MFE transmits the data message to the physical location for that destination. In some embodiments, the source MFE maps the combination of (i) the destination layer 2 (L2) address (e.g., MAC address) of the data message and (ii) the logical switch being processed to which that L2 address attaches to a tunnel endpoint or group of tunnel endpoints. This allows the source MFE to encapsulate the data message and transmit the data message to the destination tunnel endpoint. Specifically, if the destination DCN operates on a host computer located within the same datacenter, the source MFE can transmit the data message directly to that host computer by encapsulating the data message using a destination tunnel endpoint address corresponding to the host computer. For example, if the VM 515 sends a data message to the VM 520, the source MFE 525 would perform logical processing for the logical switch 215, the T1 DR 305, and the logical switch 220. Based on this logical switch and the destination MAC address of VM 520, the source MFE 525 would tunnel the data message to the MFE 530 on host computer 510. This MFE 530 would then perform any additional processing for the logical switch 220 to deliver the data message to the destination VM 520.

On the other hand, if the source MFE executes on a first host computer in a first datacenter and the destination DCN operates on a second host computer in a second, different datacenter, in some embodiments the data message is transmitted (i) from the source MFE to a first logical network gateway in the first datacenter, (ii) from the first logical network gateway to a second logical network gateway in the second datacenter, and (iii) from the second logical network gateway to a destination MFE executing on the second host computer. The destination MFE can then deliver the data message to the destination DCN.

In the example of FIG. 5, if the VM 515 sent a data message to a VM attached to the same logical switch 215 in a different datacenter, then the source MFE 525 would tunnel this data message to the edge device 545 for processing according to the logical network gateway for logical switch 215 implemented by the datapath 565. On the other hand, if the VM 515 sent a data message to a VM attached to the logical switch 220 in a different datacenter, then the source MFE 525 would tunnel this data message to the edge device 550 for processing according to the logical network gateway for logical switch 220 implemented by the datapath 570.

Figure 6:
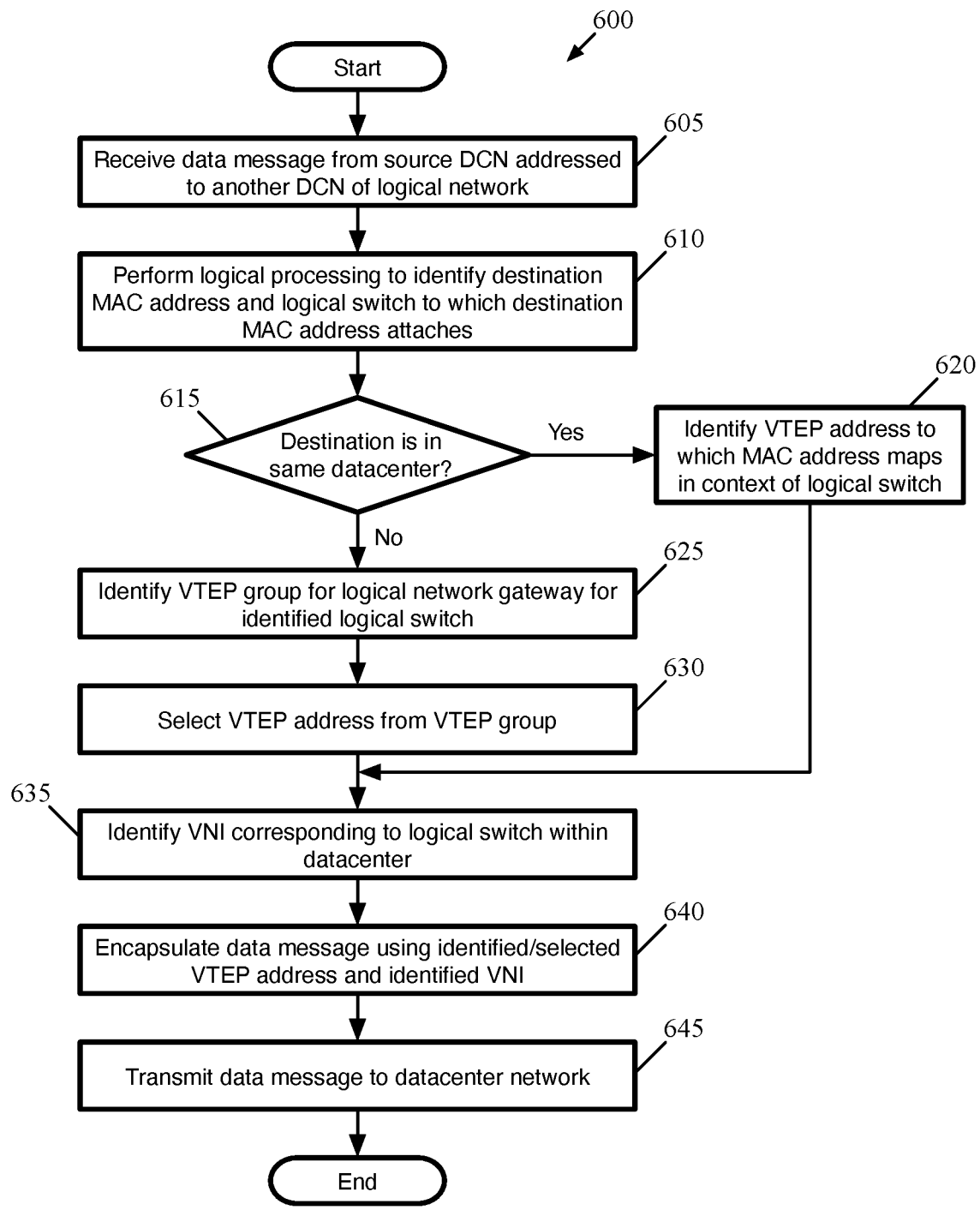
FIG. 6 conceptually illustrates a process of some embodiments performed by an MFE upon receiving a data message from a source logical network endpoint.
Figure 7:
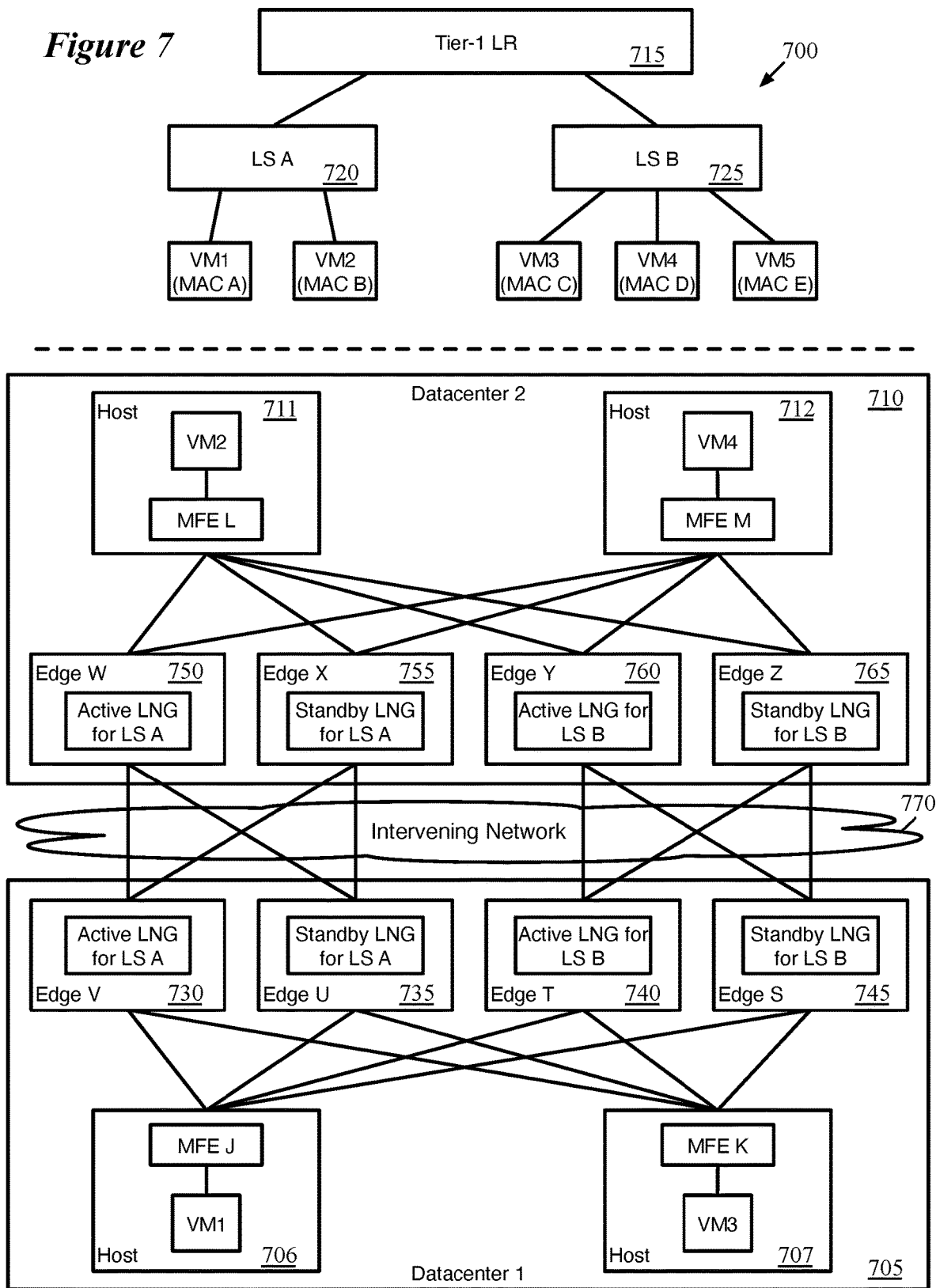
FIG. 7 conceptually illustrates a logical network and two datacenters in which that logical network is implemented.
Figure 8:
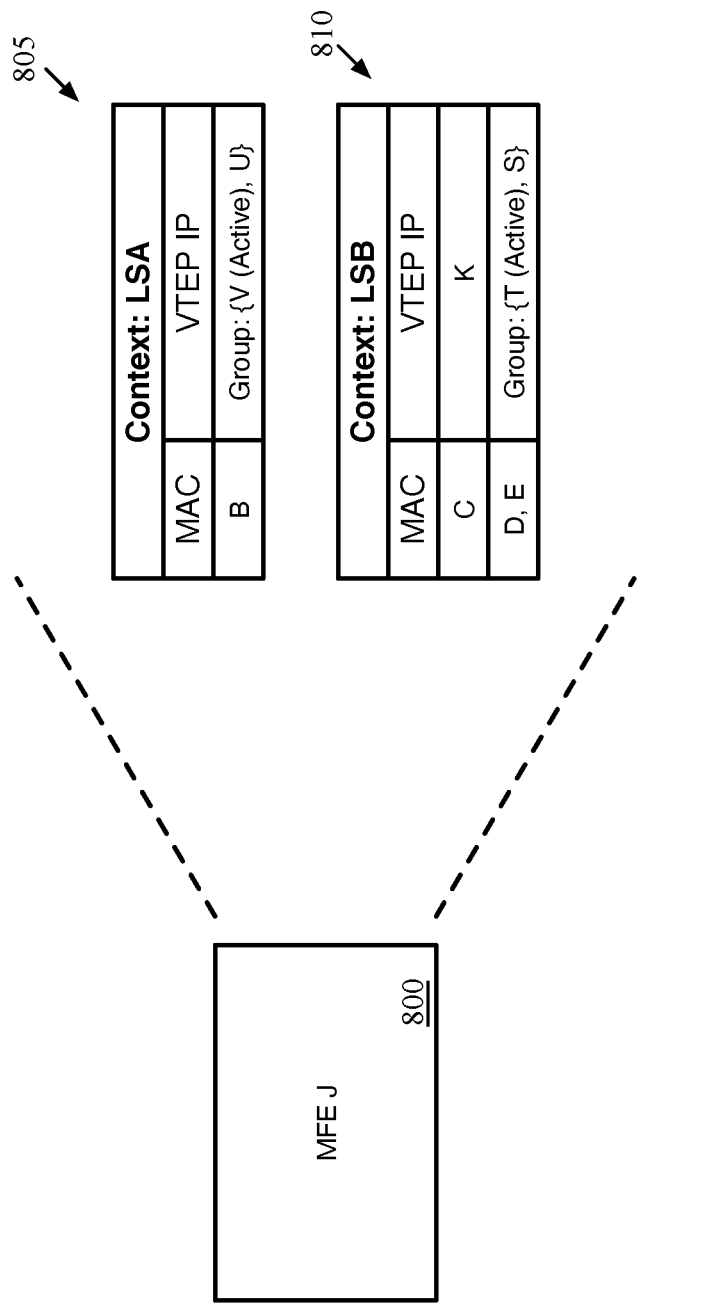
FIG. 8 conceptually illustrates a VTEP:MAC mapping table stored by an MFE.

FIG. 6 conceptually illustrates a process 600 of some embodiments performed by an MFE upon receiving a data message from a source logical network endpoint (a "source MFE"). The process 600 will be described in part by reference to FIGS. 7-11. FIG. 7 conceptually illustrates a logical network 700 and two datacenters 705 and 710 in which that logical network is implemented. FIG. 8 conceptually illustrates a VTEP:MAC mapping table stored by one of the MFEs shown in FIG. 7, while FIGS. 9-11 conceptually illustrate the processing of different data messages between logical network endpoints through the datacenters 705 and 710.

As shown, the process 600 begins by receiving (at 605) a data message from a source DCN (i.e., a logical network endpoint) that is addressed to another DCN of the logical network. This description specifically relates to data messages sent between logical network endpoints that are behind the same T1 logical router (i.e., that do not require any processing by SRs). Data message transmission that includes SRs is described in greater detail below. In addition, it should be noted that this assumes that no Address Resolution Protocol (ARP) messages are required, either by the VM or by any logical router processing.

Next, the process 600 performs (at 610) logical processing to identify (i) the destination MAC address and (ii) the logical switch to which the destination MAC address attaches. As described above, the source MFE will first perform processing according to the logical switch to which the source VM connects. If the destination MAC address corresponds to another DCN connected to same logical switch, then this is the only logical processing required. On the other hand, if the destination MAC address corresponds to a T1 logical router interface, then the logical switch processing will logically forward the data message to the T1 DR (e.g., to a distributed virtual router executing on the same host computer), which routes the data message based on its destination network address (e.g., destination IP address). The T1 DR processing also modifies the MAC addresses of the data message so that the destination address corresponds to the destination IP address (only using ARP if this mapping is not already known). Based on this routing, the next logical switch is also identified, and logical switch processing is also performed by the MFE of the host computer. This logical switch processing identifies the destination logical port for the data message, in some embodiments.

The process 600 then determines (at 615) whether the destination of the data message is located in the same datacenter as the source DCN. It should be noted that the process 600 is a conceptual process, and that in some embodiments the source MFE does not make an explicit determination. Rather, the source MFE, using the context of the logical switch to which the destination MAC address attaches, maps that MAC address to either a specific VTEP (when the destination is in the same datacenter) or a group of VTEPs (when the destination is in a different datacenter). Thus, if the destination is in the same datacenter as the source DCN, the process 600 identifies (at 620) a VTEP address to which the destination MAC address of the data message maps, in the context of the logical switch.

On the other hand, if the destination is in a different datacenter than the source DCN, the process 600 identifies (at 625) a VTEP group for the logical network gateways for the identified logical switch (to which the destination MAC address attaches) within the current datacenter. In addition, as this VTEP group may be a list of multiple VTEPs, the process 600 selects (at 630) one of the VTEP addresses from the identified VTEP group. In some embodiments, the logical network gateways for a given logical switch are implemented in active-standby configuration, in which case this selection is based on identification of the VTEP for the active logical network gateway (e.g., in the VTEP group record). In other embodiments, the logical network gateways for a given logical switch are implemented in active-active configuration, in which case the selection may be based on a load-balancing algorithm (e.g., using a hash-based selection, round-robin load balancing, etc.).

As mentioned, FIG. 7 conceptually illustrates a logical network 700 and two datacenters 705 and 710 in which that logical network is implemented. The logical network 700 includes a T1 logical router 715 that links two logical switches 720 and 725. Two VMs (w/ MAC addresses A and B) connect to the first logical switch 720 and three VMs (w/ MAC addresses C, D, and E) connect to the second logical switch 725. As shown, VM1 and VM3 operate in the first datacenter 705, on host computers 706 and 707, respectively; VM2 and VM4 operate in the second datacenter 710, on host computers 711 and 712, respectively. VM5 operates in a third datacenter, which is not shown in this figure.

As mentioned, for a given logical switch, some embodiments implement the logical network gateways in active-standby configuration. That is, in each datacenter spanned by the logical switch, an active logical network gateway is assigned to one edge device and one or more standby logical network gateways are assigned to additional edge devices. The active logical network gateways handle all of the inter-site data traffic for the logical switch, except in the case of failover. In other embodiments, the logical network gateways for the logical switch are implemented in active-active configuration. In this configuration, all of the logical network gateways in a particular datacenter are capable of handling inter-site data traffic for the logical switch.

In the example of FIG. 7, the logical network gateways are implemented in active-standby configuration. As shown, the figure illustrates four edge devices 730-745 in the first datacenter 705 and four edge devices 750-765 in the second datacenter 710. In the first datacenter 705, the edge device 730 implements the active logical network gateway for the first logical switch 720 while the edge device 735 implements the standby logical network gateway for the first logical switch 720; the edge device 740 implements the active logical network gateway for the second logical switch 725 while the edge device 745 implements the standby logical network gateway for the second logical switch 725. In the second datacenter 710, the edge device 750 implements the active logical network gateway for the first logical switch 720 while the edge device 755 implements the standby logical network gateway for the first logical switch 720; the edge device 760 implements the active logical network gateway for the second logical switch 725 while the edge device 765 implements the standby logical network gateway for the second logical switch 725.

For each logical switch, the logical network gateways form a mesh in some embodiments (i.e., the logical network gateways for the logical switch in each datacenter can directly transmit data messages to the logical network gateways for the logical switch in each other datacenter). In some embodiments, irrespective of whether the logical network gateways are implemented in active-standby or active-active mode, the logical network gateways for a logical switch in a first datacenter establish communication with all of the other logical network gateways in the other datacenters (both active and standby logical network gateways). As shown, the edge devices 730 and 735 implementing the logical network gateways for the first logical switch 720 in the first datacenter 705 each connect to both of the edge devices 750 and 755 implementing the logical network gateways for the first logical switch 720 in the second datacenter 710. Similarly, the edge devices 740 and 745 implementing the logical network gateways for the second logical switch 725 in the first datacenter 705 each connect to both of the edge devices 760 and 765 implementing the logical network gateways for the second logical switch 725 in the second datacenter 710. Though the third datacenter (where VM5 operates) is not shown in the figure, each of these sets of edge devices would also have connections to the edge devices in the third datacenter that implement the logical network gateways for the corresponding logical switches. As shown, in some embodiments the edge devices connect through an intervening network 770. This intervening network through which data messages are transmitted between the edge devices may be a virtual private network (VPN), wide area network (WAN), or public network, in different embodiments.

In other embodiments, rather than a full mesh, the logical network gateways use a hub-and-spoke model of communication. In such embodiments, traffic is forwarded through a central (hub) logical network gateway in a particular datacenter, even if neither the source nor destination of a specific data message resides in that particular datacenter. In this case, traffic from a first datacenter to a second datacenter (neither of which is the central logical network gateway for the relevant logical switch) is sent from the source MFE, to the logical network gateway for the logical switch in the first datacenter, to the central logical network gateway for the logical switch, to the logical network gateway for the logical switch in the second datacenter, to the destination MFE.

Regarding the operations of the source MFE for a data message described in the process 600 (e.g., the operations to identify a VTEP address or group), FIG. 8 conceptually illustrates a set of mapping tables 805 and 810 for an MFE 800 executing on the host computer 706 and to which VM1 connects. These mapping tables map each of the MAC addresses connected to the logical switches 720 and 725 (other than that of VM1, which operates on the host 706) to VTEP IP addresses. It should be noted that the MFE 800 stores mapping tables for the context of any logical switch that might be required, not just those to which DCNs on the host computer 706 attach. Because VM1 can transmit data messages to DCNs connected to the second logical switch 725 that do not require processing by any SRs, the central controllers of some embodiments push the MAC: VTEP records for the second logical switch 725 to the MFE 800. In some embodiments, because different logical networks within a datacenter may use overlapping MAC addresses, separate tables are stored for each logical switch (as the MAC address is only necessarily unique in the context of the logical switch).

For data messages sent within a single datacenter, the source MFE uses records that map a single VTEP network address to one or more MAC addresses (of logical network DCNs) that are reachable via that VTEP. Thus, if a VM or other DCN having a particular MAC address resides on a particular host computer, the record for the VTEP associated with that particular host computer maps to the particular MAC address. For example, in the mapping table 810 for logical switch 725, MAC address C (for VM3) is mapped to the VTEP IP address K, corresponding to the MFE operating on host computer 707. If multiple VMs attached to the logical switch 725 operated on the host computer 707, then some embodiments would use this one record to map multiple MAC addresses to the VTEP IP address K.

In addition, for each logical switch for which an MFE processes data messages and that is stretched to multiple datacenters, in some embodiments the MFE stores an additional VTEP group record for the logical switch that enables the MFE to encapsulate data messages to be sent to the logical network gateway(s) for the logical switch in the datacenter. The VTEP group record, in some embodiments, maps a set of two or more VTEPs (of the logical network gateways) to all MAC addresses connected to the logical switch that are located in any other datacenter. Thus, for example, in the mapping table 805, the MAC address B (for VM2, which operates in the second datacenter 710) maps to the VTEP group with IP addresses V and U for the edge devices 730 and 735 that implement the logical network gateways for the first logical switch 720. Similarly, in the mapping table 810, the MAC addresses D and E (for VM4 operating in the second datacenter 710 and VM5 operating in the third datacenter) map to the VTEP group with IP addresses T and S for the edge devices 740 and 745 that implement the logical network gateways for the second logical switch 725.

The VTEP group records also indicate which of the VTEP IPs in the record corresponds to the active logical network gateway, so that the MFE 800 can select this IP address for data messages to be sent to any of the VMs in the second and third datacenters. In the active-active case, all of the VTEP IP addresses are marked as active and the MFE uses a selection mechanism to select between them. Some embodiments use a load balancing operation (e.g., a round-robin algorithm, a deterministic hash-based algorithm, etc.) to select one of the IP addresses from the VTEP group record.

The use of logical network gateways and VTEP groups allows for many logical switches to be stretched across multiple datacenters without the number of tunnels (and therefore VTEP records stored at each MFE) exploding. Rather than needing to store a record for every host computer in every datacenter on which at least one DCN resides for a logical switch, all of the MAC addresses residing outside of the datacenter are aggregated into a single record that maps to a group of logical network gateway VTEPs.

Returning to FIG. 6, after identifying the VTEP address, the process 600 identifies (at 635) the virtual network identifier (VNI) corresponding to the logical switch to which the destination MAC address attaches that is used within the datacenter. In some embodiments, the local manager at each datacenter manages a separate pool of VNIs for its datacenter, and the global manager manages a separate pool of VNIs for the network between logical network gateways. These pools may be exclusive or overlapping, as they are separately managed without any need for reconciliation. This enables a datacenter to be added to a federated group of datacenters without a need to modify the VNIs used within the newly added datacenter. In some embodiments, the MFEs store data indicating the VNIs within their respective datacenters for each logical switch they process.

Next, the process 600 encapsulates (at 640) the data message using the VTEP address identified at 620 or selected at 630, as well as the identified VNI. In some embodiments, the source MFE encapsulates the data message with a tunnel header (e.g., using VXLAN, Geneve, NGVRE, STT, etc.). Specifically, the tunnel header includes (i) a source VTEP IP address (that of the source MFE), (ii) a destination VTEP IP address, and (iii) the VNI (in addition to other fields, such as source and destination MAC address, encapsulation format specific fields, etc.).

Finally, the process 600 transmits (at 645) the encapsulated data message to the datacenter network, so that it can be delivered to the destination tunnel endpoint (e.g., the destination host computer for the data message or the logical network gateway, depending on whether the destination is located in the same datacenter as the source. The process 600 then ends.

Figure 9:
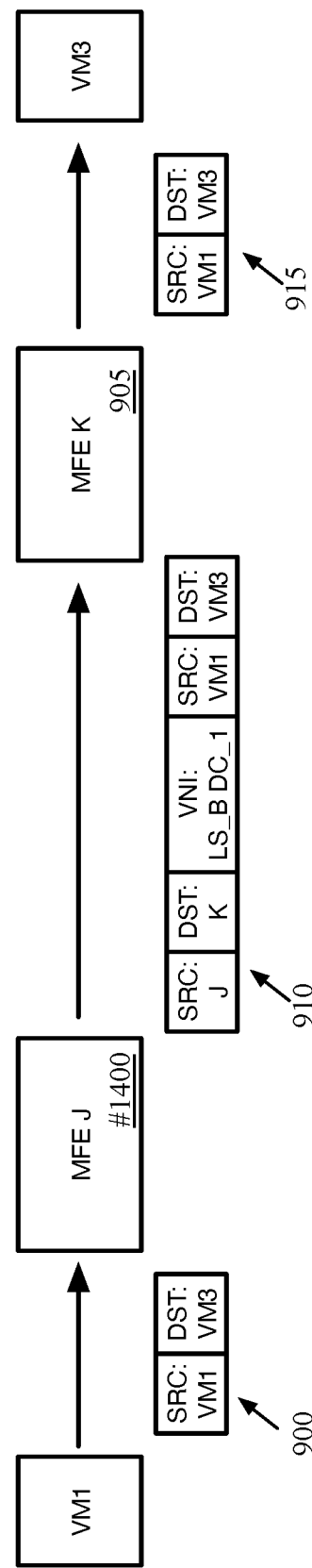
FIGS. 9-11 conceptually illustrate the processing of different data messages between logical network endpoints through the datacenters of FIG. 7.
Figure 10:
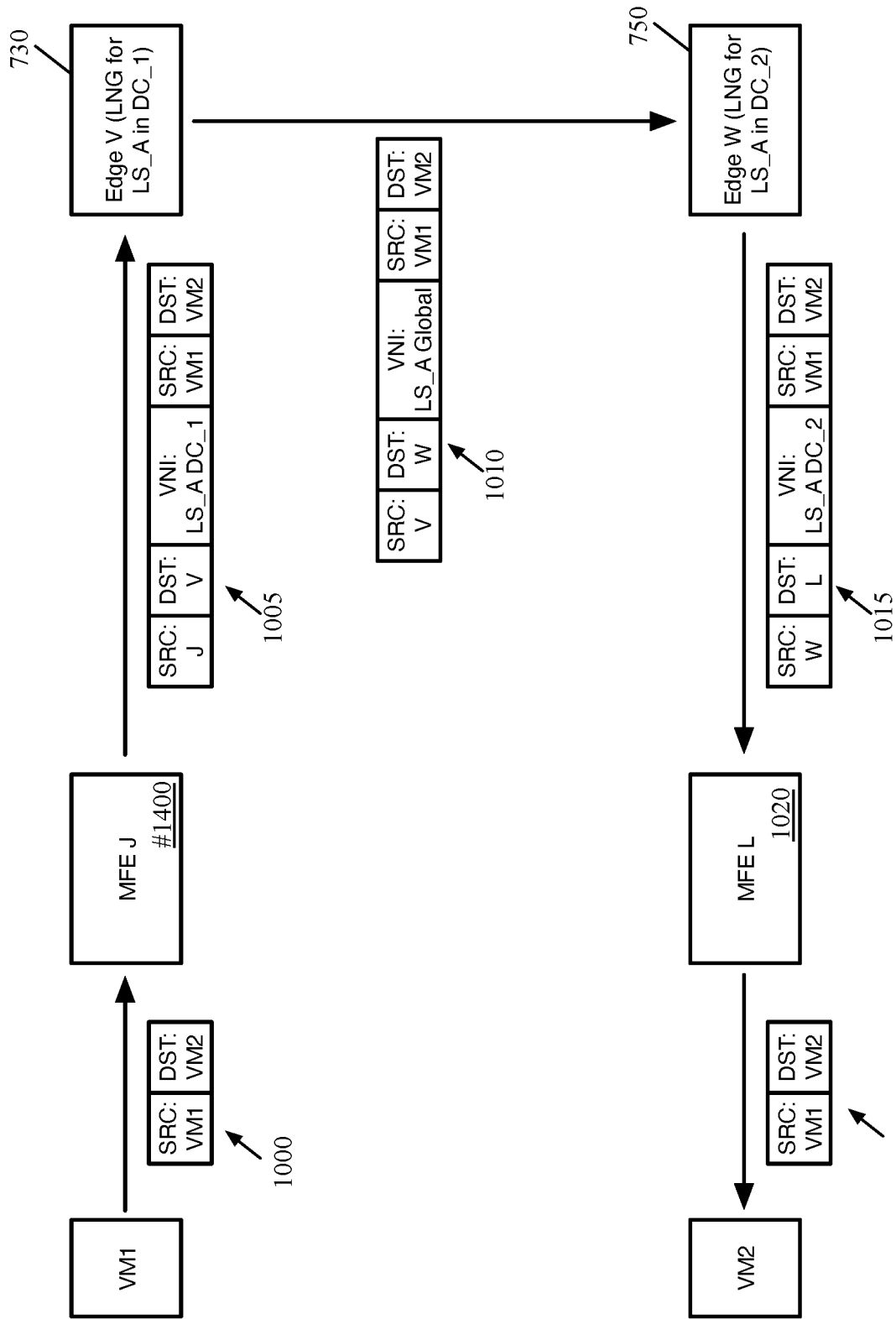
Figure 11:
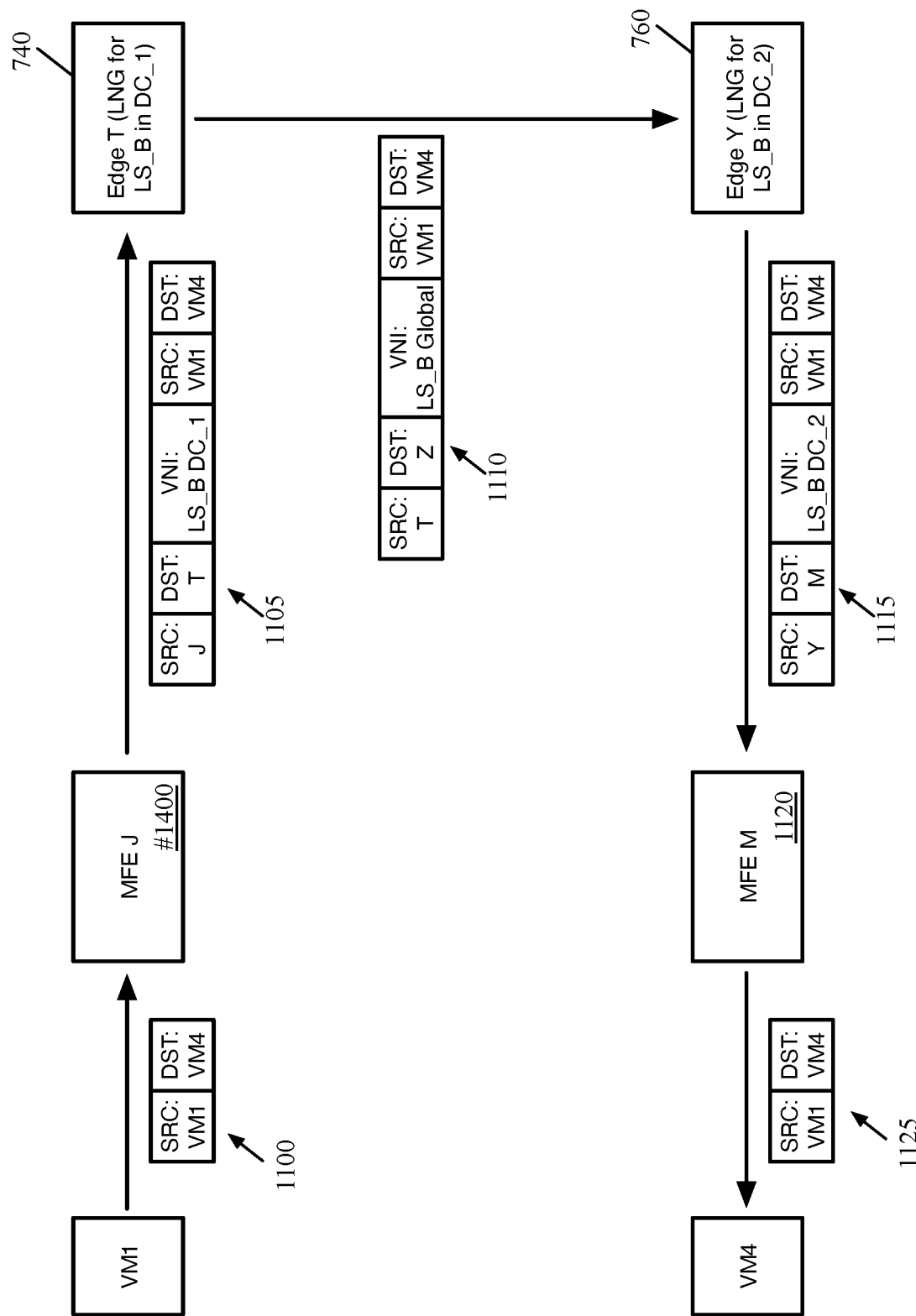

FIGS. 9-11 conceptually illustrate examples of data messages between the VMs shown in FIG. 7, which show (i) the use of different VNIs in different datacenters for the same logical switch, and (ii) the use of logical network gateways. Specifically, FIG. 9 illustrates a data message 900 sent from VM1 to VM3. As shown, VM1 initially sends the data message 900 to the MFE 800. This initial data message would have the source MAC and IP address for VM1, as well as the destination IP address for VM3. Assuming ARP is not required, the destination MAC is that of the logical port of the logical switch 720 that connects to the logical router 715. As the IP address should not be changed during transmission, the data message is throughout the figure as having a source of VM1 and destination of VM3. In addition, the data message 900 would include other header information as well as a payload, which are not shown in the figure.

The MFE 800 processes the data message according to the first logical switch 720, the logical router 715, and the second logical switch 725. At this point, the destination MAC address is that of VM3, which maps to the VTEP IP address K for the MFE 905. Thus, as shown, the MFE transmits through the first datacenter 705 an encapsulated data message 910. This encapsulated data message 910, as shown, includes the VNI for the logical switch 725 (LS_B) in the first datacenter 705 (DC_1), as well as source and destination VTEP IP addresses for the MFEs 800 and 905. The MFE 905 decapsulates this data message 910, using the VNI to identify the logical switch context for the underlying data message 915 (modified at least from the original data message 900 in that the MAC addresses are different), and delivers this underlying data message 915 to the destination VM3.

For a data message between DCNs in two datacenters, as described, the source MFE identifies the logical switch to which the destination DCN attaches (which may not be the same as the logical switch to which the source DCN attaches) and transmits the data message to the logical network gateway for that logical switch in its datacenter. That logical network gateway transmits the data message to the logical network gateway for the logical switch in the destination datacenter, which transmits the data message to the destination MFE. In some embodiments, each of these three transmitters (source MFE, first logical network gateway, second logical network gateway) encapsulates the data message with a different tunnel header (e.g., using VXLAN, Geneve, NGVRE, STT, etc.). Specifically, each tunnel header includes (i) a source tunnel endpoint address, (ii) a destination tunnel endpoint address, and (iii) a virtual network identifier (VNI).

FIGS. 10 and 11 conceptually illustrate examples of data messages between VMs in two different datacenters. FIG. 10 specifically illustrates a data message 1000 sent from VM1 to VM2, both of which connect to the same logical switch 720. As shown, VM1 initially sends the data message 1000 to the MFE 800. This initial data message would have the source MAC and IP address for VM1, as well as for VM3. In addition, the data message 1000 would include other header information as well as a payload, which are not shown in the figure. The MFE 800 processes the data message according to the first logical switch 720, identifies that the destination MAC address B corresponds to a logical port on that logical switch, and maps the MAC address B to the VTEP group {V, U} for the logical network gateways for logical switch 720 in the first datacenter 705 (selecting the VTEP V for the active logical network gateway), encapsulates the data message 1000, and transmits the encapsulated data message 1005 through the physical network of the first datacenter 705 to the edge device 730.

This encapsulated data message 1005, as shown, includes the VNI for the logical switch 720 (LS_A) in the first datacenter 705 (DC_1), as well as source and destination VTEP IP addresses for the MFE 800 and edge device 730. The logical network gateways perform VNI translation in some embodiments. The edge device 730 receives the encapsulated data message 1005 and executes a datapath processing pipeline stage for the logical network gateway based on the receipt of the encapsulated data message at a particular interface and the VNI (LS_A DC_1) in the tunnel header of the encapsulated data message 1005.

The logical network gateway in the first datacenter 705 uses the destination address of the data message (the underlying logical network data message 1000, not the destination address in the tunnel header) to determine that the data message should be sent to the second datacenter 710, and re-encapsulates the data message with a new tunnel header that includes a second, different VNI (LS_A Global) for the logical switch 720 used within the inter-site network 770, as managed by the global network manager. As shown, the edge device 730 transmits a second encapsulated data message 1010 to the logical network gateway for the logical switch 720 within the second datacenter 710, based on data mapping MAC addresses to different tunnel endpoint IP addresses for logical network gateways in different datacenters. These remote tunnel endpoints (RTEPs) and RTEP groups will be described in greater detail below. This second encapsulated data message 1010 is sent through the intervening network 770 between the datacenter edge devices to the edge device 750 implementing the logical network gateway for the logical switch 720 within the second datacenter 710. It should be noted that while the first encapsulated data message 1005 shows a destination IP address V and the second encapsulated data message 1010 shows a source IP address V, these may actually be different IP addresses. That is, the VTEP IP addresses will typically be different than the RTEP IP addresses for a particular edge device (as they are different interfaces). In some embodiments, the VTEP IP addresses can be private IP addresses that need not be routable, whereas the RTEP IP addresses must be routable (though not necessarily public IP addresses).

The edge device 750 receives the encapsulated data message 1010 and executes a datapath processing pipeline stage (similar to that executed by the first edge device) for the logical network gateway based on the receipt of the data message at a particular interface and the VNI (LS_A Global) in the tunnel header of the encapsulated data message 1010. The logical network gateway in the second datacenter 710 uses the destination address of the underlying logical network data message 1000 to determine the destination host computer for the data message within the second datacenter 710 and re-encapsulates the data message with a third tunnel header that includes a third VNI. This third VNI (LS_A DC_2) is the VNI for the logical switch 720 used within the second datacenter 710, as managed by the local network manager for the second datacenter. The re-encapsulated data message 1015 is sent through the physical network of the second datacenter 710 to the MFE 1020 at the destination host computer 711. Finally, this MFE 1020 uses the VNI (LS_A DC_2) and destination address of the underlying data message 1000 to deliver the data message to VM2.

FIG. 11 illustrates a data message 1100 sent from VM1 to VM4. As shown, VM1 initially sends the data message 1100 to the MFE 800. This initial data message would have the source MAC and IP address for VM1, as well as for VM3. This initial data message would have the source MAC and IP address for VM1, as well as the destination IP address for VM3 and the destination MAC address for the logical port of the logical switch 720 that connects to the logical router 715. In addition, the data message 1100 would include other header information as well as a payload, which are not shown in the figure.

The MFE 800 processes the data message according to the first logical switch 720, the logical router 715, and the second logical switch 725. At this point, the destination MAC address is that of VM4, which maps to the VTEP group {T, S} for the logical network gateways for logical switch 725 in the first datacenter 705. The MFE 800 selects the VTEP T for the active logical network gateway, encapsulates the data message 1100, and transmits the encapsulated data message 1105 through the physical network of the first datacenter 705 to the edge device 740.

This encapsulated data message 1105, as shown, includes the VNI for the logical switch 725 (LS_B) in the first datacenter 705 (DC_1), as well as source and destination VTEP IP addresses for the MFE 800 and edge device 740. The logical network gateways perform VNI translation in some embodiments. The edge device 740 receives the encapsulated data message 1105 and executes a datapath processing pipeline stage for the logical network gateway based on the receipt of the encapsulated data message at a particular interface and the VNI (LS_B DC_1) in the tunnel header of the encapsulated data message 1105.

The logical network gateway in the first datacenter 705 uses the destination address of the data message (the underlying logical network data message with destination MAC address D, not the destination address in the tunnel header) to determine that the data message should be sent to the second datacenter 710, and re-encapsulates the data message with a new tunnel header that includes a second, different VNI (LS_B Global) for the logical switch 725 used within the inter-site network 770, as managed by the global network manager. This VNI is required to be different from LS_A Global, but may overlap with the VNIs used for either of the logical switches within any of the datacenters. As shown, the edge device 740 transmits a second encapsulated data message 1110 to the logical network gateway for the logical switch 725 within the second datacenter 710, based on data mapping MAC addresses to different tunnel endpoint IP addresses for logical network gateways in different datacenters. This second encapsulated data message 1110 is sent through the intervening network 770 between the datacenter edge devices to the edge device 760 implementing the logical network gateway for the logical switch 725 within the second datacenter 710.

The edge device 760 receives the encapsulated data message 1110 and executes a datapath processing pipeline stage (similar to that executed by the first edge device) for the logical network gateway based on the receipt of the data message at a particular interface and the VNI (LS_B Global) in the tunnel header of the encapsulated data message 1110. The logical network gateway in the second datacenter 710 uses the destination address of the underlying logical network data message to determine the destination host computer for the data message within the second datacenter 710 and re-encapsulates the data message with a third tunnel header that includes a third VNI. This third VNI (LS_B DC_2) is the VNI for the logical switch 725 used within the second datacenter 710, as managed by the local network manager for the second datacenter. This VNI is required to be different from LS_A DC_2, but may overlap with the VNIs used for either of the logical switches within the intervening network or any of the other datacenters. The re-encapsulated data message 1115 is sent through the physical network of the second datacenter 710 to the MFE 1120 at the destination host computer 712. Finally, this MFE 1120 uses the VNI (LS_B DC_2) and destination MAC address D of the underlying data message 1125 (as modified by the source MFE 800) to deliver the data message to VM2.

As indicated in the figures above, the edge devices hosting logical network gateways have VTEPs that face the host computers of their datacenter (which are used in the VTEP groups stored by the host computers). In addition, the edge devices of some embodiments also have separate tunnel endpoints (e.g., corresponding to different interfaces) that face the inter-datacenter network for communication with other edge devices at other datacenters. These tunnel endpoints are referred to herein as remote tunnel endpoints (RTEPs). In some embodiments, each logical network gateway implemented within a particular datacenter stores (i) VTEP records for determining destination tunnel endpoints within the particular datacenter when processing data messages received from other logical network gateways (i.e., via the RTEPs) as well as (ii) RTEP group records for determining destination tunnel endpoints for data messages received from within the particular datacenter.

Figure 12:
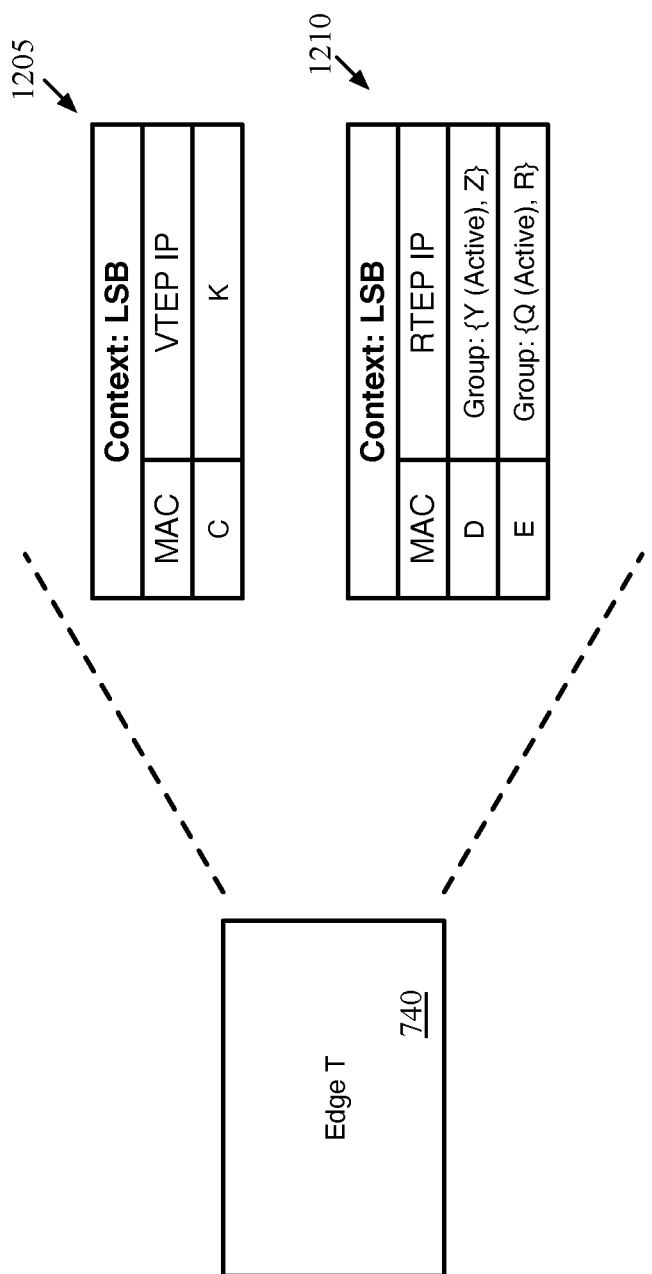
FIG. 12 conceptually illustrates a set of mapping tables of an edge device that implements the active logical network gateway for a logical switch.

FIG. 12 conceptually illustrates a set of mapping tables 1205 and 1210 of the edge device 740 shown in FIG. 7, which implements the active logical network gateway for the logical switch 725. Both mapping tables 1205 and 1210 map MAC addresses associated with the second logical switch 725 to tunnel endpoint IP addresses. In some embodiments, the datapath on the edge device uses the first table 1205 for data messages received via its RTEP and associated with the second logical switch 725 (i.e., data messages associated with the VNI LS_B Global). In some embodiments, the edge device might host logical network gateways for other logical switches, and the VNI indicates which logical network gateway stage the datapath executes for a data message. This first table 1205 maps MAC addresses for logical network endpoint DCNs operating in the datacenter of the logical network gateway to VTEP IPs (i.e., for the MFE on the same host computer as the DCN).

The datapath on the edge device 740 uses the second table 1210 for data messages received via its VTEP (i.e., from host computers within the datacenter 705) and associated with the second logical switch 725 (i.e., data messages associated with the VNI LS_B DC_1). This second table maps MAC addresses for logical network endpoint DCNs operating in other datacenters to groups of RTEP IP addresses for logical network gateways in each of those other datacenters. In this case, VM4 is located in the second datacenter 710, so its MAC address D maps to RTEP IP addresses Y and Z for edge devices 760 and 765. Similarly, because VM5 operates in a third datacenter, so its MAC address E maps to RTEP IP addresses Q and R for the edge devices implementing logical network gateways in that datacenter for the logical switch 725. As with the VTEP group shown in FIG. 8, one of these RTEP IP addresses in each group is marked as active in the active-standby case. When the logical network gateways operate in active-active configuration, all of the RTEP IP addresses in the group are marked as active and the datapath uses load balancing or another selection mechanism to choose among the multiple RTEP IP addresses.

To populate the tables shown in FIGS. 8 and 12, in some embodiments the central control plane (CCP) cluster in a datacenter receives mappings from the host computers and pushes these to the mappings to the relevant other host computers. For instance, the MFE on host computer 706 pushes to the CCP a mapping between MAC address A (for VM1) and its VTEP IP address J. Within the first datacenter 705, the CCP pushes this MAC to VTEP IP mapping to (i) the MFE executing on host computer 707, as well as to the edge devices 730 and 735 implementing logical network gateways for the logical switch 720 to which the MAC address attaches.

In addition, the CCP cluster in the first datacenter 705 shares this information with the CCP clusters in the second and third datacenters. In some embodiments, the CCP cluster shares this mapping information as mapping all of the MAC addresses in the datacenter attached to the logical switch 720 to the RTEP IP addresses for the edge devices 730 and 735 that face the inter-datacenter network 770. The CCP cluster in a given datacenter pushes (i) to the logical network gateways in the datacenter, records mapping MAC addresses attached to a particular logical switch and located in particular other datacenters to the respective RTEP IP addresses (i.e., to the RTEP group) for the logical network gateways for the particular logical switch located in those particular other datacenters, and (ii) to the host computers in the datacenter on which logical network endpoint DCNs operate that may send data messages to DCNs attached to the particular logical switch without requiring processing by any SRs, a record mapping MAC addresses attached to the particular logical switch and located in any of the other datacenters to the VTEP IP addresses (i.e., to the VTEP group) for the logical network gateways for the particular logical switch located in the datacenter. Thus, the CCP cluster in the second datacenter 710 pushes (i) the data shown in the table 1205 based on information received from the host computers in the datacenter 710 and (ii) the data shown in the table 1210 based on information received from the CCP clusters in the other datacenters.

In some embodiments, in addition to learning this MAC address to tunnel endpoint mapping data through the CCP clusters, the MFEs and edge devices can also learn the mapping data through ARP. When no mapping record is available for a forwarding element that needs to transmit an encapsulated data message, that forwarding element will send an ARP request. Typically, a source DCN (e.g., a VM) will send an ARP request if that DCN does not have a MAC address for a destination IP address (e.g., of another logical network endpoint DCN). If the MFE on the source host has this information, it proxies the ARP request and provides the MAC address to the source DCN. If the source MFE does not have the data, then it broadcasts the ARP request to (i) all MFEs in the datacenter that participate in the logical switch to which the IP address belongs (e.g., that participate in a multicast group defined within the datacenter for the logical switch) and (ii) the logical network gateways for the logical switch within the datacenter.

If the destination DCN is located in the datacenter, then the source MFE will receive an ARP reply with the MAC address of the destination DCN. This ARP reply will be encapsulated (as with the ARP request), and therefore the source MFE can learn the MAC to VTEP mapping if this record is not already in its mapping table.

If the destination DCN is located in another datacenter, then the logical network gateway processes the ARP request. If the logical network gateway stores the ARP record, it proxies the request and sends a reply, which allows the source MFE to learn that the MAC address is behind the VTEP group of the logical network gateway if this information is not already in the VTEP group record. If the logical network gateway does not store the ARP record, it broadcasts the ARP request to the logical network gateways at all of the other datacenters spanned by the logical switch. These logical network gateways proxy the request and reply (if they have the information) or broadcast the request within their respective datacenters to the MFEs that participate in the logical switch (if they do not have the information). If a logical network gateway replies, this reply is encapsulated and allows the logical network gateway that sent the inter-datacenter request to learn that the MAC address is behind that particular logical network gateway and add the information to its RTEP group record (if that data is not already).

If an MFE receives an ARP request from a logical network gateway, that MFE sends an encapsulated reply to the logical network gateway, thereby allowing the logical network gateway to learn the MAC address to RTEP group mapping. This reply is then sent back each stage of the transmission chain, allowing the other logical network gateway and the source MFE to learn the mapping. That is, each stage that forwarded the ARP request learns (i) the ARP record mapping the DCN IP address to the DCN MAC address (so that future ARP requests for that IP address can be proxied), as well as (ii) the record mapping the DCN MAC address to a relevant tunnel endpoint.

Figure 13:
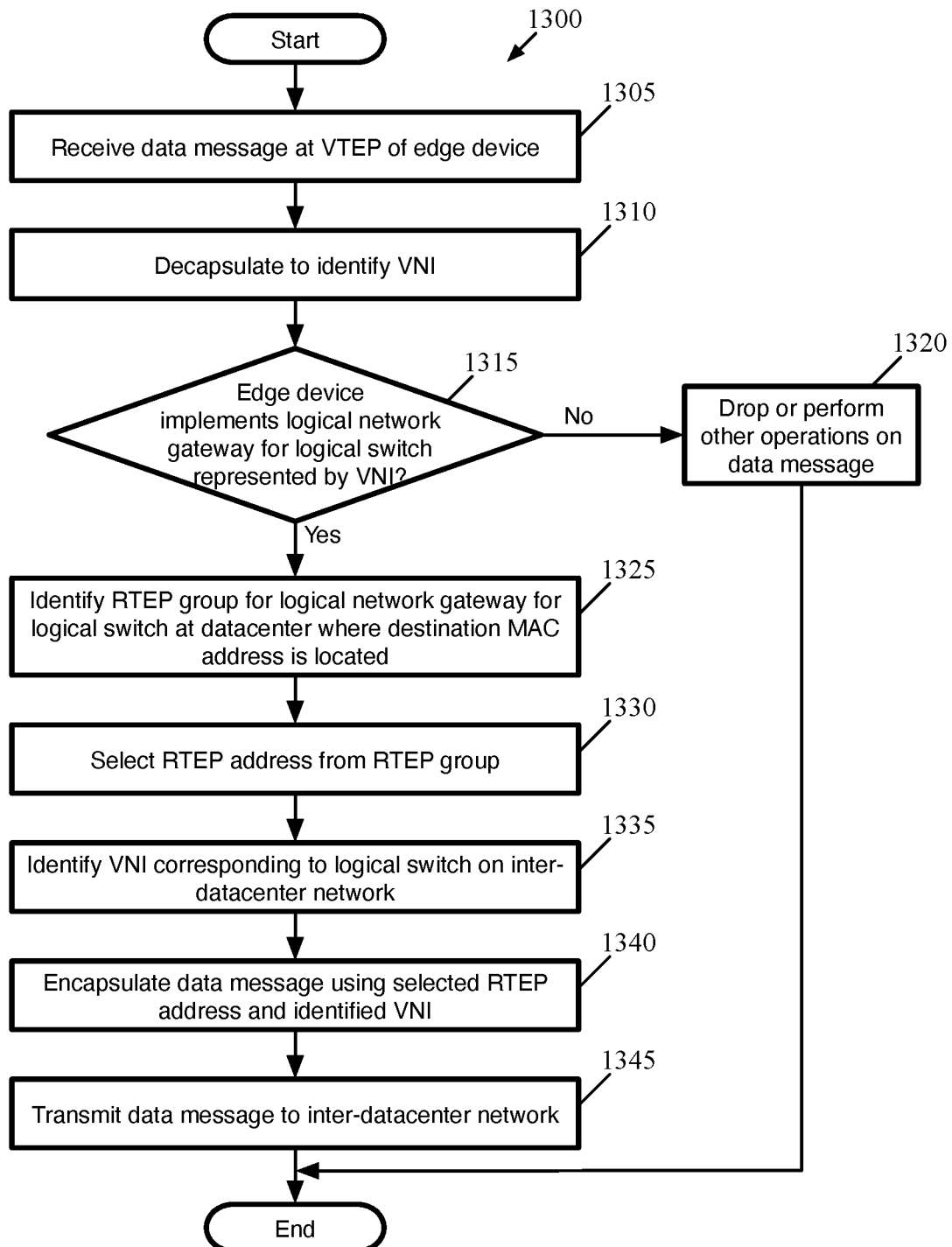
FIG. 13 conceptually illustrates a process of some embodiments for processing a data message received by a logical network gateway from a host computer within the same datacenter.

FIG. 13 conceptually illustrates a process 1300 of some embodiments for processing a data message received by a logical network gateway from a host computer within the same datacenter. The process 1300 is performed, in some embodiments, by an edge device that implements the logical network gateway. As shown, the process 1300 begins by receiving (at 1305) a data message at a VTEP of the edge device. In some embodiments, this causes the edge device datapath to execute a specific stage for processing data messages received at the VTEP.

The process 1300 decapsulates (at 1310) the received data message to identify the VNI stored in the encapsulation header. In some embodiments, the datapath stage executed for data messages received at the VTEP stores a table that maps VNIs used within the datacenter to logical switches for which the edge device implements a logical network gateway. As described above, the local manager for the datacenter manages these VNIs and ensures that all of the VNIs are unique within the datacenter.

The process 1300 then determines (at 1315) whether the edge device implements a logical network gateway for the logical switch represented by the VNI of the received data message. As described, edge devices may implement logical network gateways for multiple logical switches, and clusters of edge devices may include numerous computing devices (e.g., 8, 32, etc.) so that the logical network gateways can be load balanced across the cluster. When the edge device does not implement the logical network gateway for the logical switch represented by the VNI, the process drops (at 1320) the data message or performs other operations on the data message. For instance, if the VNI does not match any of the VNIs stored by the edge device for mapping to logical switches, or if the datapath identifies that the VNI maps to a logical switch for which the datapath implements a standby logical network gateway, the datapath drops the data message. If the VNI maps to a transit logical switch connecting to an SR implemented on the edge device, then some embodiments perform the SR operations, described further below. The process then ends.

On the other hand, when the edge device does implement the logical network gateway for the logical switch represented by the VNI, the process identifies (at 1325) the RTEP group for the logical network gateways for that logical switch at the datacenter where the destination MAC address of the underlying data message is located. As described above by reference to the mapping table 1210 of FIG. 12, the logical network gateway of some embodiments stores RTEP group records for each other datacenter spanned by the logical switch. Each RTEP group record, in some embodiments, maps a set of two or more RTEPs for a given datacenter (i.e., the RTEPs for the logical network gateways at that datacenter for the particular logical switch) to all MAC addresses connected to the particular logical switch that are located at that datacenter. The logical network gateway maps the destination MAC address of the underlying data message to one of the RTEP group records (using ARP on the inter-site network if no record can be found).

The process 1300 then selects (at 1330) one of the RTEP addresses from the RTEP group. In some embodiments, the logical network gateways for a given logical switch are implemented in active-standby configuration, in which case this selection is based on identification of the RTEP for the active logical network gateway (e.g., in the RTEP group record). In other embodiments, the logical network gateways for a given logical switch are implemented in active-active configuration, in which case the selection may be based on a load-balancing algorithm (e.g., using a hash-based selection, round-robin load balancing, etc.).

The process 1300 also identifies (at 1335) the VNI corresponding to the logical switch on the inter-datacenter network. In some embodiments, the datapath uses a table that maps logical switches to the VNIs managed by the global manager for the inter-datacenter network. In other embodiments, the stage executed by the datapath for the logical switch includes this VNI as part of its configuration information, so that no additional lookup is required.

Next, the process 1300 encapsulates (at 1340) the data message using the selected RTEP address as well as the identified VNI. In some embodiments, the datapath encapsulates the data message with a tunnel header (e.g., using VXLAN, Geneve, NGVRE, STT, etc.). Specifically, the tunnel header includes (i) a source RTEP IP address (that of the edge device performing the process 1300), (ii) a destination RTEP IP address (that of the edge device in another datacenter), and (iii) the VNI (in addition to other fields, such as source and destination MAC address, encapsulation format specific fields, etc.). Finally, the process 1300 transmits (at 1345) the encapsulated data message to the inter-datacenter network, so that it can be delivered to the destination edge device. The process 1300 then ends. In some embodiments, the encapsulated data message is sent via a secure VPN, which may involve additional encapsulation and/or encryption (performed either by the edge device or another computing device).

Figure 14:
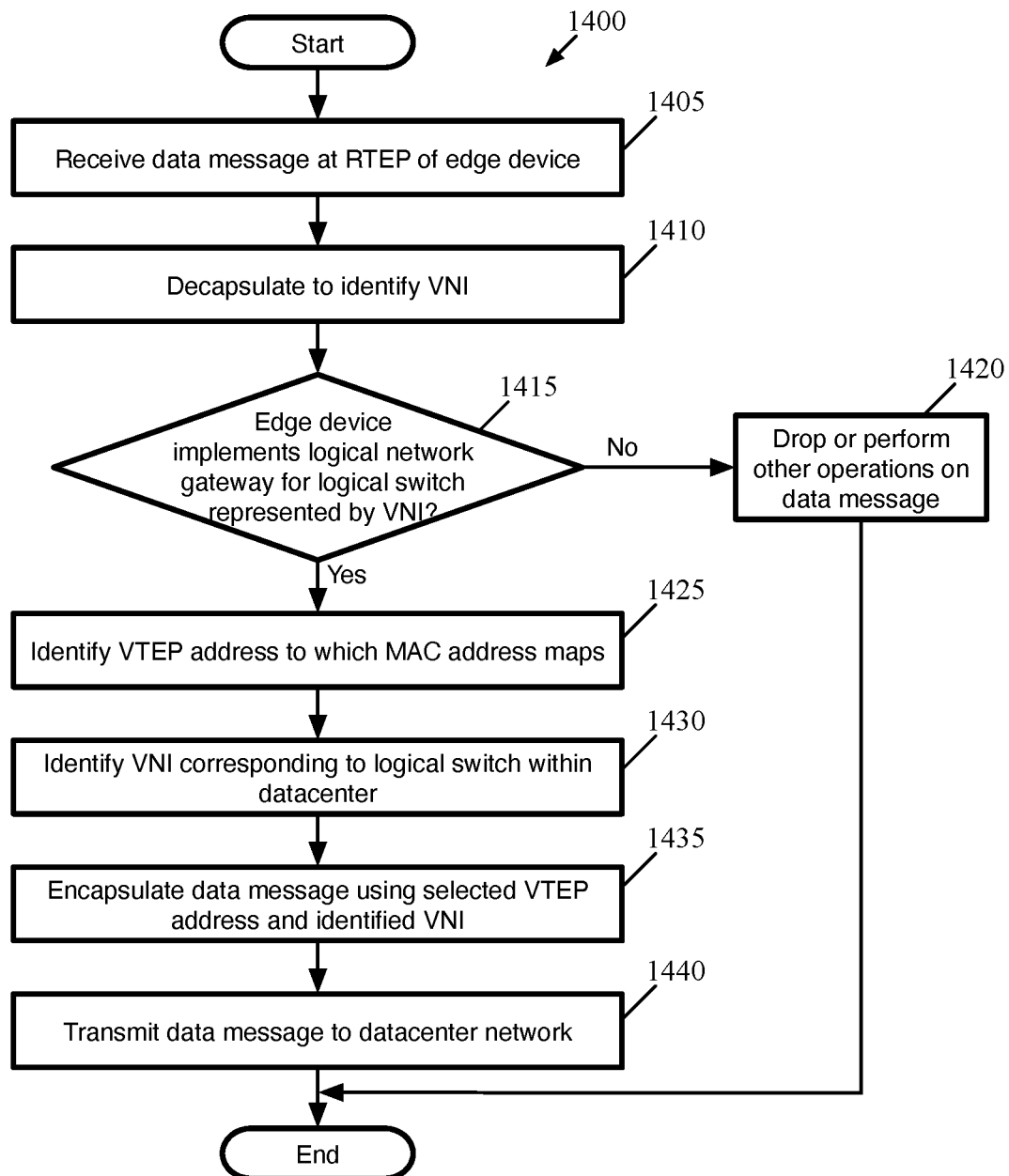
FIG. 14 conceptually illustrates a process of some embodiments for processing a data message received by a logical network gateway in one datacenter from a logical network gateway in another datacenter.

FIG. 14 conceptually illustrates a process 1400 of some embodiments for processing a data message received by a logical network gateway in one datacenter from a logical network gateway in another datacenter. The process 1400 is performed, in some embodiments, by an edge device that implements the logical network gateway. As shown, the process 1400 begins by receiving (at 1405) a data message at an RTEP of the edge device. In some embodiments, this causes the edge device datapath to execute a specific stage for processing data messages received at the RTEP.

The process 1400 decapsulates (at 1410) the received data message to identify the VNI stored in the encapsulation header. In some embodiments, the datapath stage executed for data messages received at the RTEP stores a table that maps VNIs used within the inter-datacenter network to logical switches for which the edge device implements a logical network gateway. As described above, the global manager for the federated set of datacenters (or other physical sites) manages these VNIs and ensures that all of the VNIs are unique within the inter-datacenter network.

The process 1400 then determines (at 1415) whether the edge device implements a logical network gateway for the logical switch represented by the VNI of the received data message. As described, edge devices may implement logical network gateways for multiple logical switches, and clusters of edge devices may include numerous computing devices so that the logical network gateways can be load balanced across the cluster. When the edge device does not implement the logical network gateway for the logical switch represented by the VNI, the process drops (at 1420) the data message or performs other operations on the data message. For instance, if the VNI does not match any of the VNIs stored by the edge device for mapping to logical switches, or if the datapath identifies that the VNI maps to a logical switch for which the datapath implements a standby logical network gateway, the datapath drops the data message. It should also be noted that in some embodiments the logical network gateway for a backplane logical switch connecting groups of peer SRs is implemented on the same edge devices as the SRs. In this case, the datapath stage for the logical network gateway is executed, followed by the stage for the SR.

On the other hand, when the edge device does implement the logical network gateway for the logical switch represented by the VNI, the process identifies (at 1425) the VTEP to which the destination MAC address of the underlying data message maps. As described above by reference to the mapping table 1205 of FIG. 12, the logical network gateway of some embodiments stores MAC address to VTEP mapping records for the DCNs located in the datacenter that attach to the logical switch. The logical network gateway maps the destination MAC address of the underlying data message to one of the VTEP records (using ARP on the datacenter network if no record can be found).

The process 1400 also identifies (at 1430) the VNI corresponding to the logical switch within the datacenter. In some embodiments, the datapath uses a table that maps logical switches to the VNIs managed by the local manager for the datacenter. In other embodiments, the stage executed by the datapath for the logical switch includes this VNI as part of its configuration information, so that no additional lookup is required.

Next, the process 1400 encapsulates (at 1435) the data message using the identified VTEP address and VNI. In some embodiments, the datapath encapsulates the data message with a tunnel header (e.g., using VXLAN, Geneve, NGVRE, STT, etc.). Specifically, the tunnel header includes (i) a source VTEP IP address (that of the edge device performing the process 1300), (ii) a destination VTEP IP address (that of the host computer hosting the destination logical network endpoint DCN), and (iii) the VNI (in addition to other fields, such as source and destination MAC address, encapsulation format specific fields, etc.). Finally, the process 1400 transmits (at 1440) the encapsulated data message to the physical network of the datacenter, so that it can be delivered to the host computer hosting the destination DCN. The process 1400 then ends.

The use of VTEP and RTEP groups allows for failover of the logical network gateways in a particular datacenter without the need for every host in the datacenter to relearn all of the MAC addresses in all of the other datacenters that map to the logical network gateway VTEP or for all of the other logical network gateways for the logical switch in the other datacenters to relearn all of the MAC addresses in the particular datacenter that map to the logical network gateway RTEP. As described above, the MAC to tunnel endpoint mappings may be shared by the CCP clusters and/or learned via ARP (or via receipt of data messages from the tunnel endpoints).

Figure 15A:
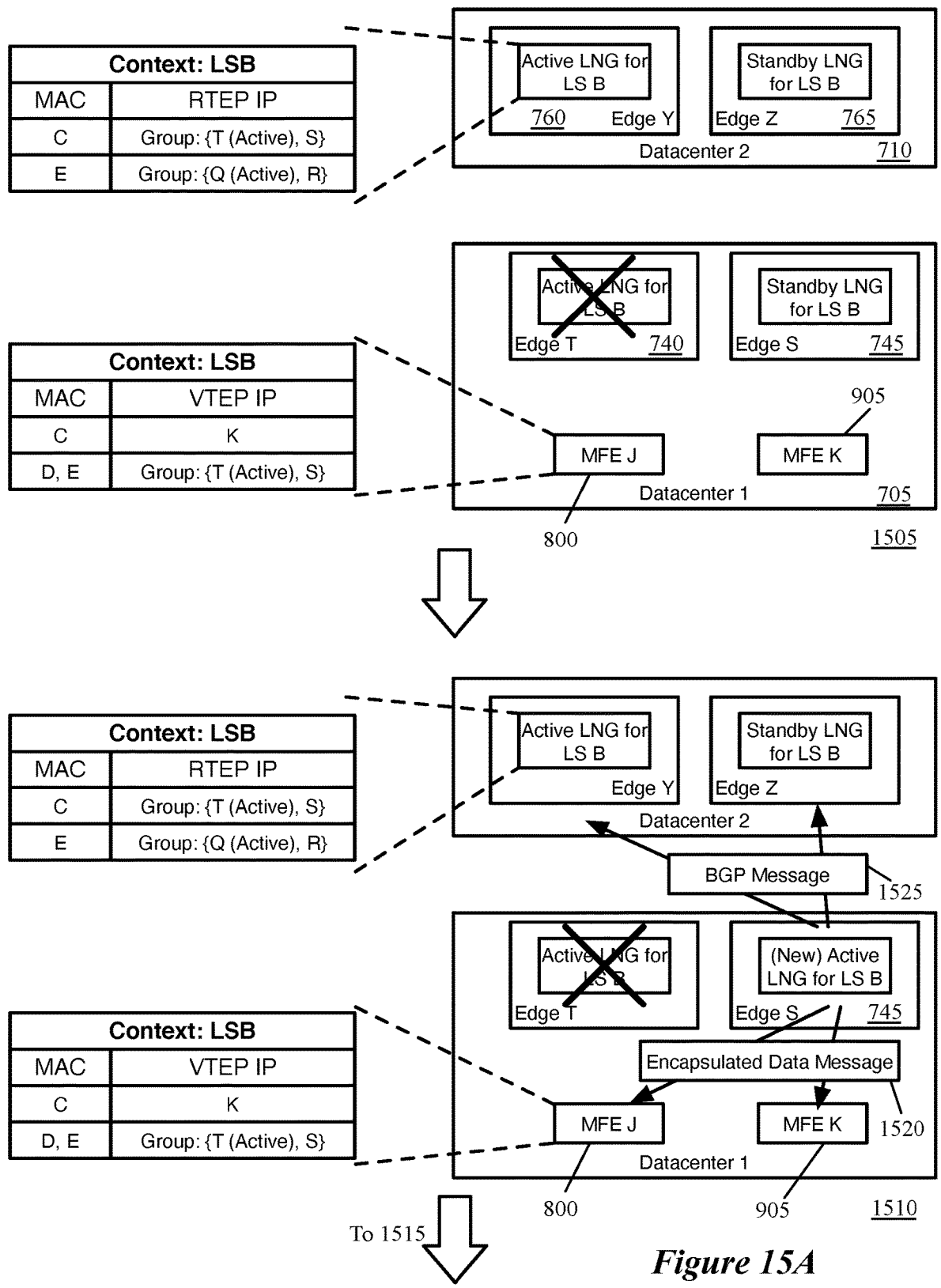
FIGS. 15A-B conceptually illustrate the failover of a logical network gateway according to some embodiments.
Figure 15B:
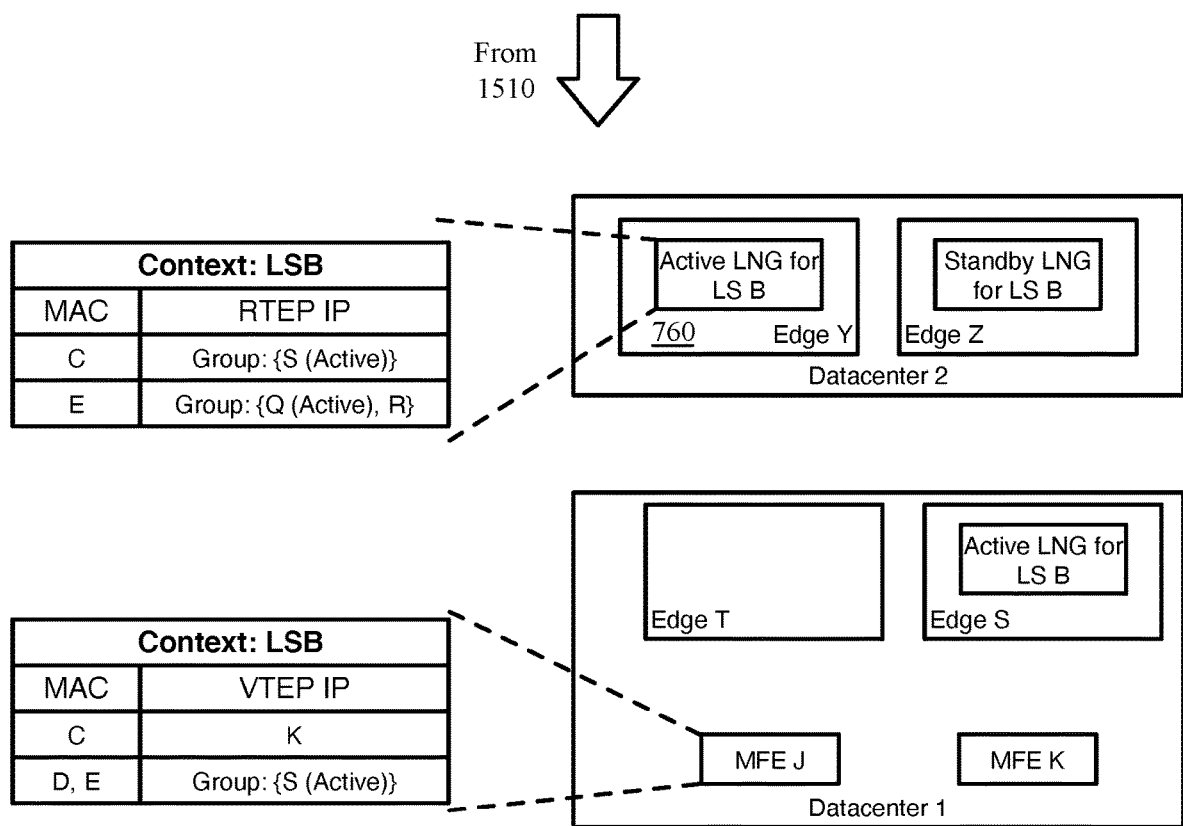

FIGS. 15A-B conceptually illustrate the failover of a logical network gateway according to some embodiments over three stages 1505-1515. Specifically, in this example, referring to FIG. 7, the active logical network gateway for the logical switch 725 in the first datacenter 705 fails, and is replaced by the standby logical network gateway for the logical switch 725 in that same datacenter.

The first stage 1505 illustrates that, prior to failover, in the first datacenter 705, the active logical network gateway for the logical switch 725 is implemented on edge device 740 and the standby logical network gateway for the logical switch 725 is implemented on edge device 745. The MFE 800 (as well as the MFE 905) stores a VTEP group record that maps the MAC addresses D and E (for VMs 4 and 5) to a VTEP group with IP addresses T (as the active address) and S. In the second datacenter 710, the active logical network gateway for the logical switch 725 is implemented on edge device 760 and the standby logical network gateway for the logical switch 725 is implemented on edge device 765. Each of these logical network gateways stores a RTEP group record that maps MAC address C (for VM3) to an RTEP group with IP addresses T (as the active address) and S. As mentioned, in some embodiments, these IP addresses for the RTEPs are different than the IP addresses for the VTEPs of the same edge devices.

In addition, at the first stage 1505, the active logical network gateway implemented on the edge device 740 fails. The active logical network gateway may fail for various reasons in different embodiments. For instance, if the entire edge device 740 or the datapath executing thereon crashes, then the logical network gateway will no longer be operational. In addition, in some embodiments a control mechanism on the edge device regularly monitors the connection to the inter-datacenter network (via the RTEP) and the connection to the MFEs in the local datacenter (via the VTEP). If either of these connections fails, then the edge device brings down the logical network gateway to induce failover.

In some embodiments, the standby logical network gateway (or the edge device 745 on which this logical network gateway is implemented) listens for failover of the active logical network gateway. In some embodiments, the edge devices that implement logical network gateways for a particular logical switch are connected via control protocol sessions, such as Border Gateway Protocol (BGP) or Bi-Directional Forwarding Detection (BFD). This control protocol is used to form an inter-site mesh in some such embodiments. In addition, the edge device on which the standby logical network gateway is implemented uses the control protocol to identify failure of the active logical network gateway in some embodiments.

In the second stage 1510, the edge device 745 has detected the failure of the previous active logical network gateway on edge device 740 and has taken over as the active logical network gateway for the logical switch 725 in the first datacenter 705. As shown, the edge device 745 sends an encapsulated data message 1520 (e.g., a Geneve message) to all of the MFEs in the datacenter that participate in the logical switch 725. In some embodiments, this includes not just MFEs executing on host computers on which DCNs connected to the logical switch 725 reside (e.g., the MFE 905), but any other MFEs that send data traffic to the logical network gateways for the logical switch 725 (e.g., the MFE 800, which is in the routing domain span of the logical switch 725). In some embodiments, this encapsulated data message 1520 includes the VNI for the logical switch 725 in the datacenter 705 and specifies that the source of the data message is the new active logical network gateway for the logical switch 725 associated with that VNI (e.g., using a special bit or set of bits in the encapsulation header).

As shown in the third stage 1515, this allows the MFEs to simply modify their list of VTEPs in the VTEP group record for the logical network gateways, without the need to create a new record and relearn all of the MAC addresses for the record. For instance, the VTEP group record stored by the MFE 800 now lists S as the active VTEP IP address for logical MAC addresses D and E. In some embodiments, once a new standby logical network gateway is instantiated, the CCP cluster (or the edge device on which the new logical network gateway is implemented) notifies the MFEs in the datacenter 705 to add the VTEP IP address for that edge device to their VTEP group record.

Also in the second stage 1510, the edge device 745 sends BGP messages 1525 to all of the logical network gateways at any other datacenters spanned by the logical switch 725. In some embodiments, this is a message using BGP protocol, but one which specifies that the sender is the new active logical network gateway within the datacenter 705 for the logical switch 725 (as opposed to being a typical BGP message). In some embodiments, the edge devices implementing logical network gateways for a logical switch form a BGP mesh, and the BGP messages 1525 are sent to all of the devices in this mesh.

As shown in the third stage 1515, this allows these other logical network gateways to simply modify the list of RTEPs in their RTEP group record, without the need to create a new record and relearn all of the MAC addresses for the record. For instance, the RTEP group record stored by the edge device 760 now lists S as the active RTEP IP address for logical MAC address C. In some embodiments, once a new standby logical network gateway is instantiated, the CCP clusters (or the edge device on which the new logical network gateway is implemented) notifies the other logical network gateways in their respective datacenters to add the RTEP IP address for that new edge device to their RTEP group records.

While the above description relates primarily to logical switches, the logical networks of some embodiments are defined to include T1 and/or T0 logical routers in addition to these logical switches. In some embodiments, logical switches (i.e., the logical switches to which DCNs connect) connect directly to T1 logical routers (though they can also connect directly to T0 logical routers as well), which can link different logical switches together as well as provide services to the logical switches connected to them.

Figure 16:
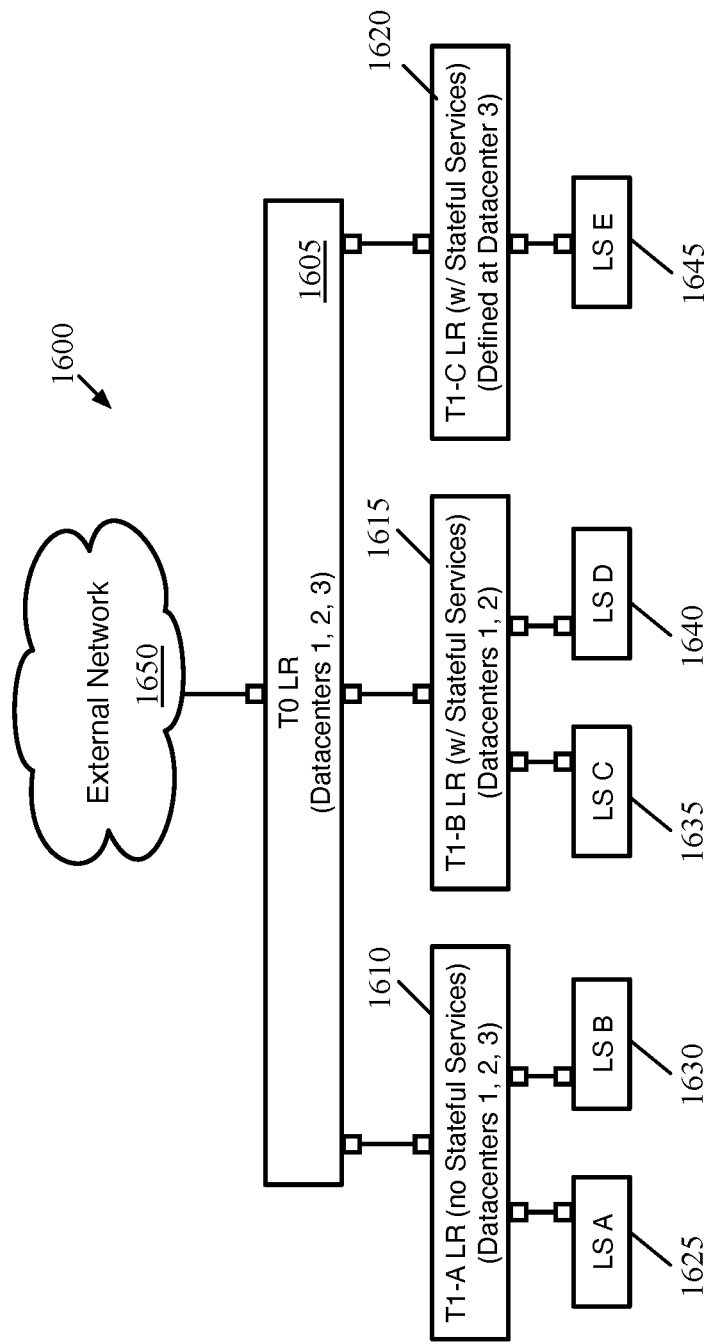
FIG. 16 conceptually illustrates an example of a logical network of some embodiments.

FIG. 16 conceptually illustrates an example of a logical network 1600 of some embodiments. The logical network includes a T0 logical router 1605 and three T1 logical routers 1610-1620 that connect via router links to the T0 logical router 1605. In addition, two logical switches 1625 and 1630 connect to the first T1 logical router 1610, two logical switches 1635 and 1640 connect to the second T1 logical router 1615, and one logical switch 1645 connects to the third T1 logical router 1620. The T0 logical router 1605 also provides a connection to external networks 1650.

In some embodiments, T1 logical routers may be entirely distributed. For instance, the logical router 1610 does not provide stateful services, but rather provides a connection between the logical switches 1625 and 1630 that avoids the use of a T0 logical router. That is, logical network endpoint DCNs attached to the logical switches 1625 and 1630 can send messages to each other without requiring any processing by the T0 logical router (or by any SRs). As such, the T1 logical router 1610 is defined to include a DR, but no SRs.

T1 logical routers can also include centralized SR components implemented on edge devices in some embodiments. These SR components perform stateful services for data messages sent to and from the DCNs connected to the logical switches that connect to the T1 logical router in some embodiments, in some embodiments. For instance, both logical routers 1615 and 1620 are configured to perform stateful services (e.g., NAT, load balancing, stateful firewall, etc.).

In addition, in some embodiments, T1 logical routers (and accordingly, the logical switches connected to them) may be defined entirely within a single datacenter or defined to span multiple datacenters. In some embodiments, constructs of the logical network that span multiple datacenters (e.g., T0 logical routers, T1 logical routers, logical switches, security groups, etc.) are defined by a network administrator through the global manager. However, a network administrator (e.g., the same admin or a different, local admin) can also define networks that are local to a specific datacenter through the global manager. These T1 logical routers can be connected to a datacenter-specific T0 logical router for handling data traffic with external networks, or can instead be connected to a T0 logical router of the datacenter-spanning logical network in some embodiments. As described below, when datacenter-specific T1 logical routers are connected to a T0 logical router that spans multiple datacenters, in some embodiments the SRs of the T0 logical router share routes advertised by the datacenter-specific T1 logical router.

When a globally-defined T1 logical router without SRs is connected to a T0 logical router (such as the logical router 1610), this logical router (and in turn the logical switches that connect to it) automatically inherits the span of the T0 logical router to which it connects. On the other hand, when a globally-defined T1 logical router is specified as providing stateful services at SRs, the network administrator can define the datacenters to which the T1 spans in some embodiments. For a T1 logical router with stateful services, the network administrator can define the T1 logical router to span to any of the datacenters spanned by the T0 logical router to which it connects; that is, the global manager does not allow the T1 logical router to be defined to span datacenters not spanned by the T0 logical router. For instance, the second logical router 1615 is defined to span to datacenters 1 and 2 (the T0 logical router 1605 spans three datacenters 1, 2, and 3), while the third logical router 1620 is defined to span to only datacenter 3. This logical router 1620 (and the logical switch 1645) could be defined through the global manager for the federated logical network or through the local manager for datacenter 3.

Some embodiments allow the T1 SRs to be deployed in active-active mode or active-standby mode, while other embodiments only allow active-standby mode (e.g., if the SR is providing stateful services such as a stateful firewall, stateful load balancing, etc.). The T1 SRs, in some embodiments, provide stateful services for traffic between (i) DCNs connected to logical switches that connect to the T1 logical router and (ii) endpoints outside of that T1 logical router, which could include endpoints external to the logical network and datacenter as well as logical network endpoints connected to other logical switches. For instance, data messages between VMs connected to logical switch 1635 and VMs connected to logical switch 1640 would not require stateful services (these data messages would be processed as described above by reference to FIGS. 9-11). On the other hand, data messages sent between VMs connected to logical switch 1635 and VMs connected to logical switch 1625 would be sent through the SRs for the logical router 1615 and therefore have stateful services applied. Data messages sent between VMs connected to logical switch 1635 and VMs connected to logical switch 1645 would be sent through the SRs for both logical routers 1615 and 1620.

In addition, for T1 logical routers that have SRs located in multiple datacenters, some embodiments allow (or require) the network administrator to select one of the datacenters as a primary site for the T1 logical router. In this case, all traffic requiring stateful services is routed to the primary site active SR. When a logical network endpoint DCN that is located at a secondary datacenter sends a data message to an endpoint external to the T1 logical routers, the source MFE for the data message performs first-hop logical processing, such that the DR routes the data message to the active SR within that secondary datacenter, and transmits the data message through the datacenter according to the transit logical switch for the datacenter between the T1 DR and T1 SR (e.g., using a VNI assigned to the transit logical switch by the local manager within that datacenter). As described above by reference to FIG. 3, in some embodiments the network managers define a transit logical switch within each datacenter to connect the DR for the logical router to the SRs within the datacenter for the logical router. As these transit logical switches each only span a single datacenter, there is no need to define logical network gateways for the transit logical switches.

Figure 17:
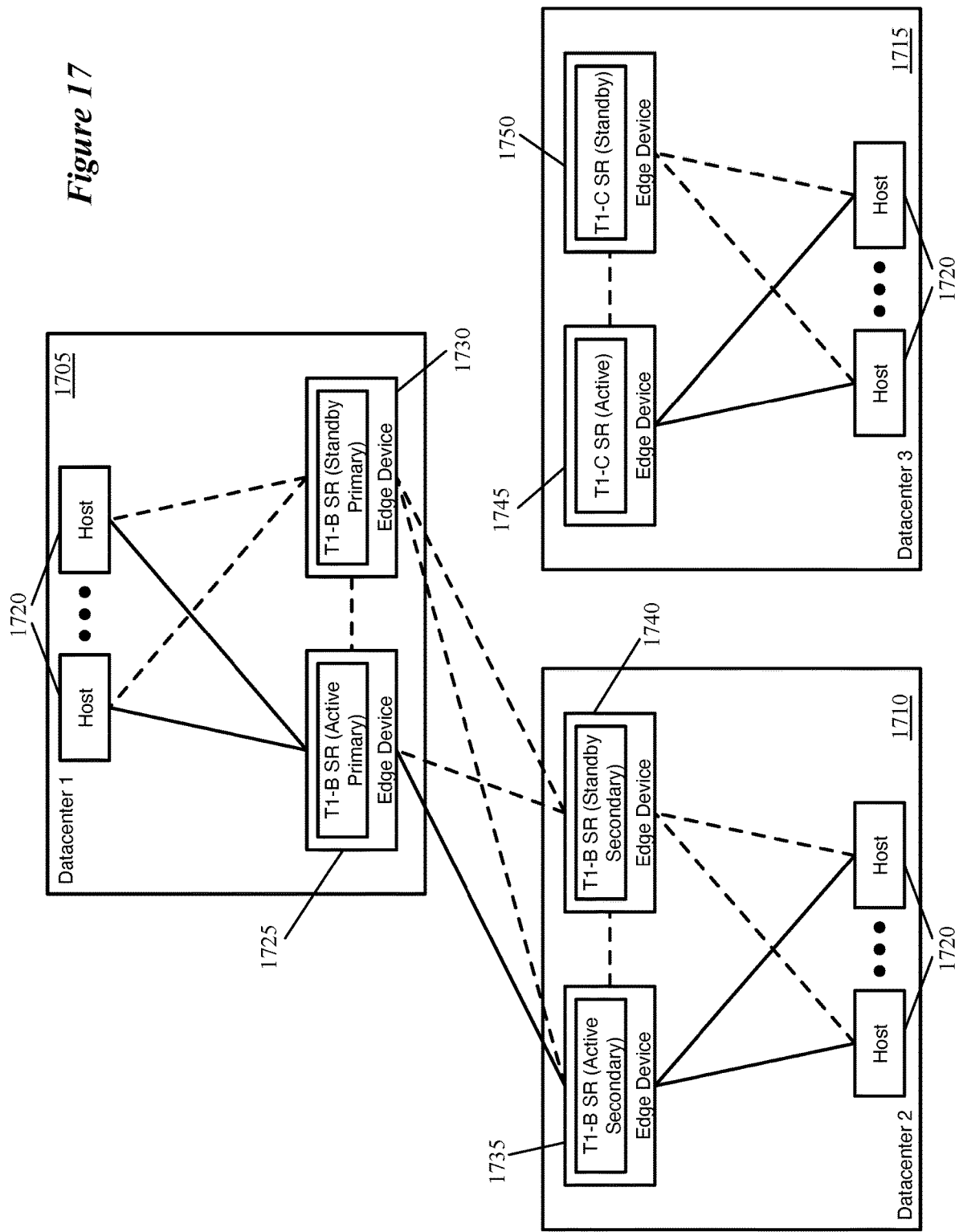
FIG. 17 conceptually illustrates the implementation of SRs for logical routers shown in FIG. 16.

FIG. 17 conceptually illustrates the implementation of the SRs for the logical routers 1615 and 1620 shown in FIG. 16 (there are no SRs for logical router 1610). As shown in this figure, each of the three datacenters 1705-1715 includes host computers 1720. For the logical router 1615 that spans datacenters 1705 and 1710, two edge devices are assigned to implement the SRs (e.g., as stages in their respective datapaths) in each datacenter. The first datacenter 1705 is assigned as the primary datacenter for the logical router 1615, and edge device 1725 implements the active primary SR while edge device 1730 implements the standby primary SR for the logical router 1615. The second datacenter 1710 is therefore a secondary datacenter for the logical router 1615, and edge device 1735 implements an active secondary SR while edge device 1740 implements a standby secondary SR for the logical router 1615. T1 logical routers that span more than two datacenters, in some embodiments, have one primary datacenter and multiple secondary datacenters.

The host computers 1720 in the first datacenter 1705 have information for sending to the edge devices 1725 and 1730 data messages routed to the T1 SRs, but as shown by the solid lines only actually send traffic to the active SR in the datacenter (barring failover). Similarly, the host computers 1720 in the second datacenter 1710 have information for sending to the edge devices 1735 and 1740 data messages routed to the T1 SRs, but as shown by the solid lines only actually send traffic to the active SR in the datacenter (barring failover). In addition, all of the edge devices 1725-1740 communicate (e.g., using a BGP mesh), but as shown by the solid line, data traffic is only sent between the active edge devices 1725 and 1735 (barring failover). Separately, in the third datacenter 1715, two edge devices 1745 and 1750 are assigned to implement the SRs for the logical router 1620. Because this logical router only spans the third datacenter 1715, there is no need to assign a primary datacenter. Here, the edge device 1745 implements the active SR while the edge device 1750 implements the standby SR for the logical router 1620. The host computers 1720 in the third datacenter 1715 have information for sending to the edge devices 1745 and 1750 data messages routed to the T1 SRs for this logical router 1620, but as shown by the solid lines only actually send traffic to the active SR in the datacenter (barring failover).

It should be noted that not every host computer 1720 in each of the datacenters communicates directly with the edge devices 1725, 1735, and 1745 implementing active T1 SR. For instance, if a particular host computer in the first or second datacenters 1705 and 1710 does not host any logical network endpoint DCNs connected to either of the logical switches 1635 or 1640, then that particular host computer will not send data messages directly to (or receive data messages directly from) the edge devices implementing the SR for logical router 1615 (assuming those edge devices are not implementing other SRs or logical network gateways). Similarly, host computers in the third datacenter 1620 that do not host any logical network endpoint DCNs connected to logical switch 1645 will not send data messages directly to (or receive data messages directly from) the edge devices implementing the SR for logical router 1620. In addition, as described below, host computers in any of the datacenters 1705-1715 that host logical network endpoint DCNs connected to logical switches 1625 and/or 1630 may send data messages directly to (and receive data messages directly from) edge devices implementing the SRs for T0 logical router 1605.

T0 logical routers, as mentioned, handle the connection of the logical network to external networks. In some embodiments, the T0 SRs exchange routing data (e.g., using a routing protocol such as Border Gateway Protocol (BGP) or Open Shortest Path First (OSPF)) with physical routers of the external network, in order to manage this connection and correctly route data messages to the external routers. This route exchange is described in further detail below.

Network administrators are able to connect the T1 logical routers to T0 logical routers in some embodiments. For a T1 logical router with a primary site, some embodiments define a link between the routers (e.g., with a transit logical switch in each datacenter between the T1 SRs in the datacenter and the T0 DR), but mark this link as down at all of the secondary datacenters (i.e., the link is only available at the primary datacenter). This results in the T0 logical router routing incoming data messages only to the T1 SR at the primary datacenter.

The T0 SRs can be configured in active-active or active-standby configurations. In either configuration, some embodiments automatically define (i) a backplane logical switch that stretches across all of the datacenters spanned by the T0 logical router to connect the SRs and (ii) separate transit logical switches in each of the datacenters connecting the T0 DR to the T0 SRs that are implemented in that datacenter.

When a T0 logical router is configured as active-standby, some embodiments automatically assign one active and one (or more) standby SRs for each datacenter spanned by the T0 logical router (e.g., as defined by the network administrator). As with the T1 logical router, one of the datacenters can be designated as the primary datacenter for the T0 logical router, in which case all logical network ingress/egress traffic (referred to as north-south traffic) is routed through the SR at that site. In this case, only the primary datacenter SR advertises itself to the external physical network as a next-hop for logical network addresses. In addition, the secondary T0 SRs route northbound traffic to the primary T0 SR.

So long as there are no stateful services configured for the T0 logical router, some embodiments also allow for there to be no designation of a primary datacenter. In this case, north-south traffic may flow through the active SR in any of the datacenters. In some embodiments, different northbound traffic may flow through the SRs at different datacenters, depending either on dynamic routes learned via routing protocol (e.g., by exchanging BGP messages with external routers) or on static routes configured by the network administrator to direct certain traffic through certain T0 SRs. In addition, even when a primary datacenter is designated for the T0 logical router, some embodiments allow for the network administrator to define exceptions so as to allow ingress/egress data traffic to flow through the SRs at secondary datacenters (e.g., to avoid having traffic to and from local DCNs be sent through other datacenters). In some embodiments, the network administrator defines these exceptions by defining static routes.

Figure 18:
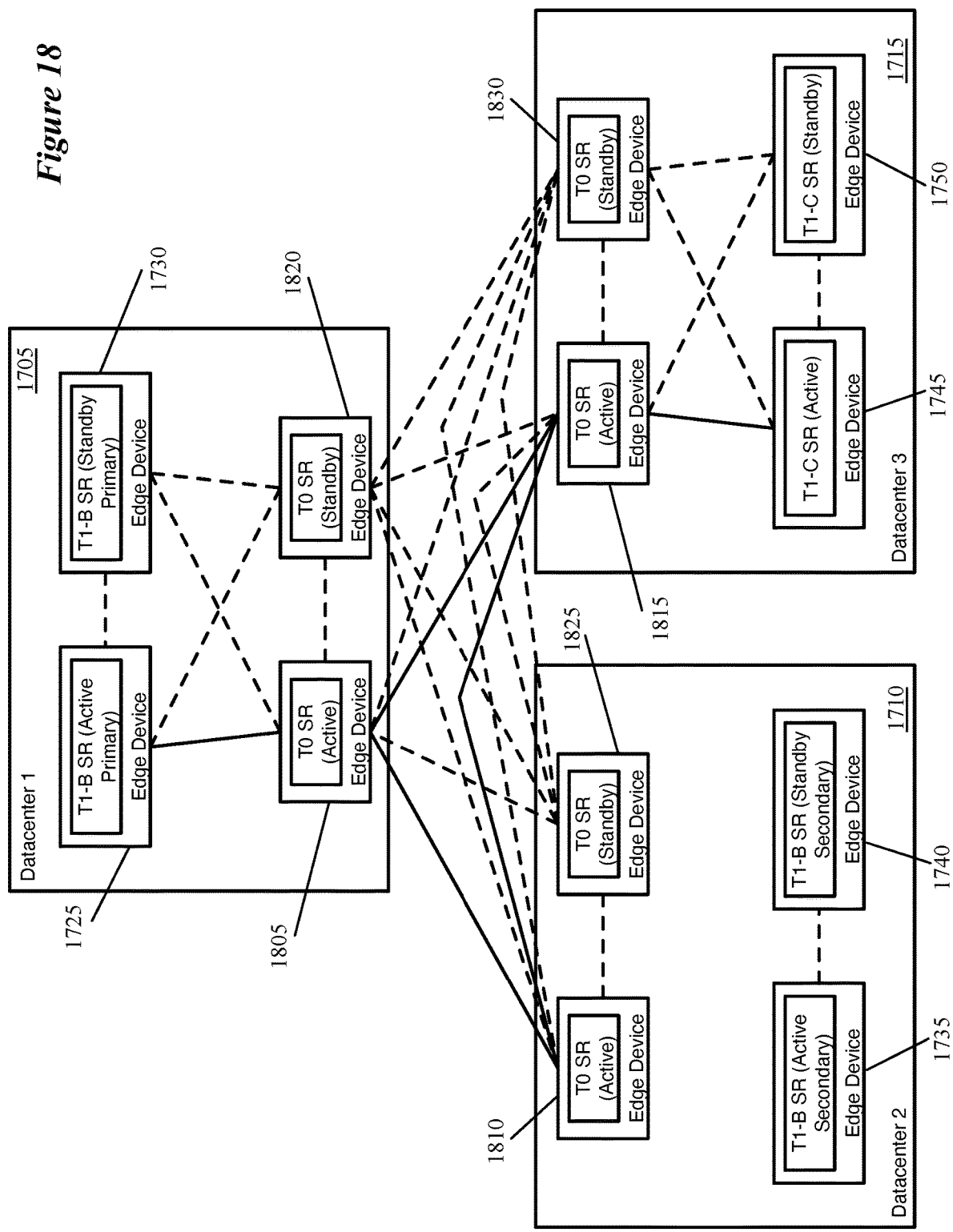
FIG. 18 conceptually illustrates the T1 SRs and T0 SRs implemented in the three datacenters for the logical routers shown in FIG. 16 with the T0 SRs implemented in active-standby configuration.

FIG. 18 conceptually illustrates the T1 SRs and T0 SRs implemented in the three datacenters 1705-1715 for the logical routers 1605, 1615, and 1620. The SRs for the T1 logical router 1615 implemented on edge devices 1725-1740 as well as the SRs for the single-datacenter T1 logical router 1620 implemented on edge devices 1745-1750 are described above by reference to FIG. 17.

In addition, one active SR and one standby SR for the T0 logical router 1605 are implemented on edge devices in each of the datacenters 1705-1715 (e.g., as assigned by the local managers in each of the datacenters). As shown, edge devices 1805-1815 implement active T0 SRs in each of the respective datacenters while edge devices 1820-1830 implement standby T0 SRs in each of the respective datacenters.

Solid lines are used to illustrate data traffic flow, while dashed lines are used to illustrate connections that are only used for data traffic in the case of failover. As shown, in the first datacenter 1705, the edge device 1725 implementing the active primary T1 SR and the edge device 1805 implementing the active T0 SR exchange data traffic with each other. However, because the router link between the secondary T1 SR and the T0 DR is marked as down, the edge device 1735 implementing the active secondary T1 SR and the edge device 1810 implementing the active T0 SR in the second datacenter 1710 do not exchange data traffic with each other. In addition, in some embodiments, these connections are not maintained unless the network administrator modifies the configuration for the T1 logical router 1615 to change the primary datacenter. Similar to the first datacenter 1705, in the third datacenter 1715 the edge device 1745 implementing the active SR for the T1 logical router 1620 and the edge device 1815 implementing the active T0 SR exchange data traffic with each other. In some embodiments, the data traffic between a T1 SR and a T0 SR in the same datacenter is sent between VTEPs of their respective edge devices using a VNI assigned to either the transit logical switch between the T0 SR and T0 DR or to the router link logical switch between the T0 DR and the T1 SR, depending on the direction and nature of the traffic.

Finally, the three edge devices 1805-1815 implementing the active T0 SRs exchange data traffic with each other through the inter-datacenter network (e.g., using the backplane logical switch connecting these SRs). In addition, all of the edge devices 1805-1830 maintain connections with each other (e.g., using an internal BGP (iBGP) mesh). It should be further noted that, as mentioned above, some of the host computers 1720 may send data traffic directly to (or receive data directly from) the edge devices 1805-1815 implementing the active T0 SRs, if those host computers host logical network endpoint DCNs connected to the logical switches 1625 and 1630, because data messages between those DCNs and external network endpoints will not require processing by any T1 SRs.

Figure 19:
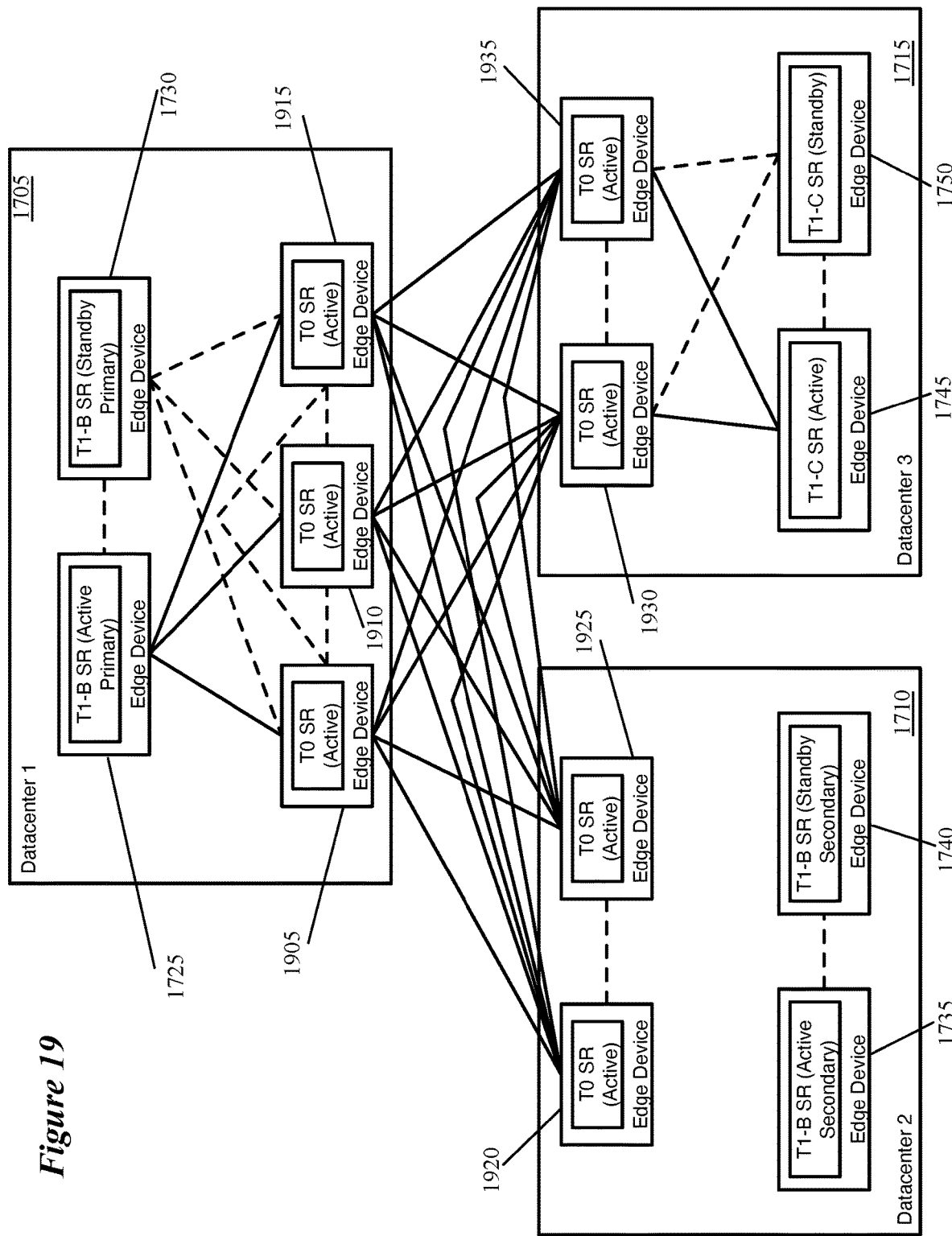
FIG. 19 conceptually illustrates the T1 SRs and T0 SRs implemented in the three datacenters for the logical routers shown in FIG. 16 with the T0 SRs implemented in active-active configuration.

Some embodiments, as mentioned, also allow for active-active configuration of the T0 SRs. In some such embodiments, the network administrator can define one or more active SRs (e.g., up to a threshold number) for each datacenter spanned by the T0 logical router. FIG. 19 conceptually illustrates the T1 SRs and T0 SRs implemented in the three datacenters 1705-1715 for the logical routers 1605, 1615, and 1620 with the T0 SRs implemented in active-active configuration. The SRs for the T1 logical router 1615 implemented on edge devices 1725-1740 as well as the SRs for the single-datacenter T1 logical router 1620 implemented on edge devices 1745-1750 are described above by reference to FIG. 17.

In addition, multiple active SRs for the T0 logical router 1605 are implemented on edge devices 1905-1935 in each of the datacenters 1705-1715 (e.g., as assigned by the local managers in each of the datacenters). In this example, three T0 SRs are defined in the first datacenter 1705, while two T0 SRs are defined in each of the second and third datacenters 1710 and 1715.

Solid lines are again used to illustrate data traffic flow, while dashed lines are used to illustrate connections that are only used for data traffic in the case of failover. As in the previous figure, because the router link between the secondary T1 SR and the T0 DR is marked as down, the edge device 1735 implementing the active secondary T1 SR and the edge device 1810 implementing the active T0 SR in the second datacenter 1710 do not exchange data traffic with each other. In the first datacenter 1705, the edge device 1725 implementing the active primary T1 SR exchanges data traffic with all three of the edge devices 1905-1915 implementing the T0 SRs. In some embodiments, when the datapath implementing the T1 SR on edge device 1725 processes a northbound data message, after routing the data message to the T0 DR, the processing pipeline stage for the T0 DR uses equal-cost multi-path (ECMP) routing to route the data message to one of the three active T0 SRs on edge devices 1905-1915. Similarly, in the third datacenter 1715, the edge device 1745 implementing the active SR for the T1 logical router 1620 exchanges data traffic with the edge devices 1930 and 1935 implementing the T0 SRs.

In addition, different embodiments either allow or disallow the configuration of a primary datacenter for the active-active configuration. If there is a primary datacenter configured, in some embodiments the T0 SRs at secondary datacenters use ECMP routing to route northbound data messages to the primary T0 SRs (through the inter-datacenter network). In this example, ECMP is similarly used when routing data traffic from a T0 SR at one datacenter to a T0 SR at another datacenter for any other reason (e.g., due to an egress route learned via BGP).

Figure 20:
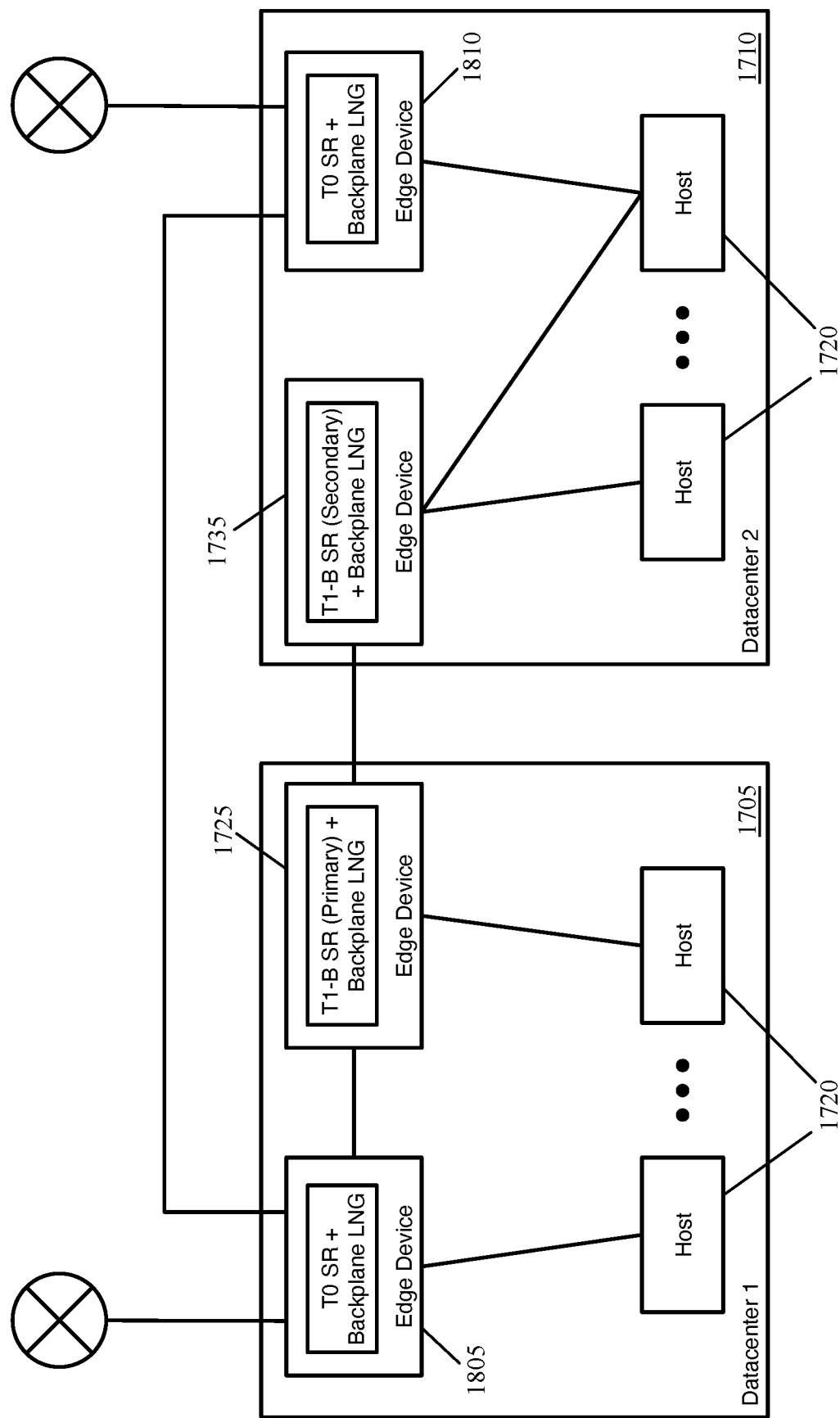
FIG. 20 conceptually illustrates a more detailed view of the edge devices hosting active SRs for a T0 logical router and a T1 logical router.

FIG. 20 conceptually illustrates a more detailed view of the edge devices hosting active SRs for the T0 logical router 1605 and the T1 logical router 1615 in datacenters 1705 and 1710, and will be used to describe processing of data messages through the logical and physical networks. As shown, some of the host computers 1720 in the first datacenter 1705 (i.e., host computers on which endpoint DCNs connected to logical switches 1635 and 1640 execute) connect to the edge device 1725 that implements the primary active SR for the T1 logical router 1615, and this edge device 1725 connects to the edge device 1805 that implements the active SR for the T0 logical router 1605. In addition, some host computers 1720 in the first datacenter 1705 (i.e., host computers on which endpoint DCNs connected to logical switches 1625 and 1630 execute) connect to the edge device 1805 that implements the active SR for the T0 logical router 1605.

In the second datacenter 1710, some of the host computers 1720 (i.e., host computers on which endpoint DCNs connected to logical switches 1635 and 1640 execute) connect to the edge device 1735 that implements the secondary active SR for the T1 logical router 1615. This edge device, because it hosts a secondary SR, does not connect to the edge device 1810 that implements the active SR for the T0 logical router 1605 in the datacenter (though if other SRs for another logical network were implemented on the edge devices, they could communicate over the physical datacenter network for that purpose). In addition, some host computers 1720 in the second datacenter 1710 (i.e., host computers on which endpoint DCNs connected to logical switches 1625 and 1630 execute) connect to the edge device 1810 that implements the active SR for the T0 logical router 1605 in this datacenter.

The figure also illustrates that the datapaths on each of the illustrated edge devices 1725, 1805, 1735, and 1810 executes the logical network gateway for the backplane logical switch connecting the relevant SRs. As described above, in some embodiments a backplane logical switch is automatically configured by the network managers to connect the SRs of a logical router. This backplane logical switch is stretched across all of the datacenters at which SRs are implemented for the logical router, and therefore logical network gateways are implemented at each of these datacenters for the backplane logical switch. In some embodiments, the network managers link the SRs of a logical router with the logical network gateways for the backplane logical switch connecting those SRs, so that they are always implemented on the same edge devices. That is, the active SR within a datacenter and the active logical network gateway for the corresponding backplane logical switch within that datacenter are assigned to the same edge device, as are the standby SR and standby logical network gateway. If either the SR or the logical network gateway need to failover (even if for a reason that would otherwise affect only one of the two), then both will failover together. Keeping the SR with the logical network gateway for the corresponding backplane logical switch avoids the need for extra physical hops when transmitting data messages between datacenters, as shown in the examples below.

In the following examples, data message processing is described for the case of active-standby SRs for both the T1 logical router 1615 and the T0 logical router 1605. If the SRs for the T0 logical router 1605 are implemented in active-active configuration, then data messages described as routed to the active T0 SR in a particular datacenter would be routed to one of the active T0 SRs in the particular datacenter using ECMP. It should also be noted that these data message processing examples are described on the assumption that no ARP is required, and that all of the logical MAC address to tunnel endpoint records are stored by the various MFEs and edge devices as required.

Figure 21:
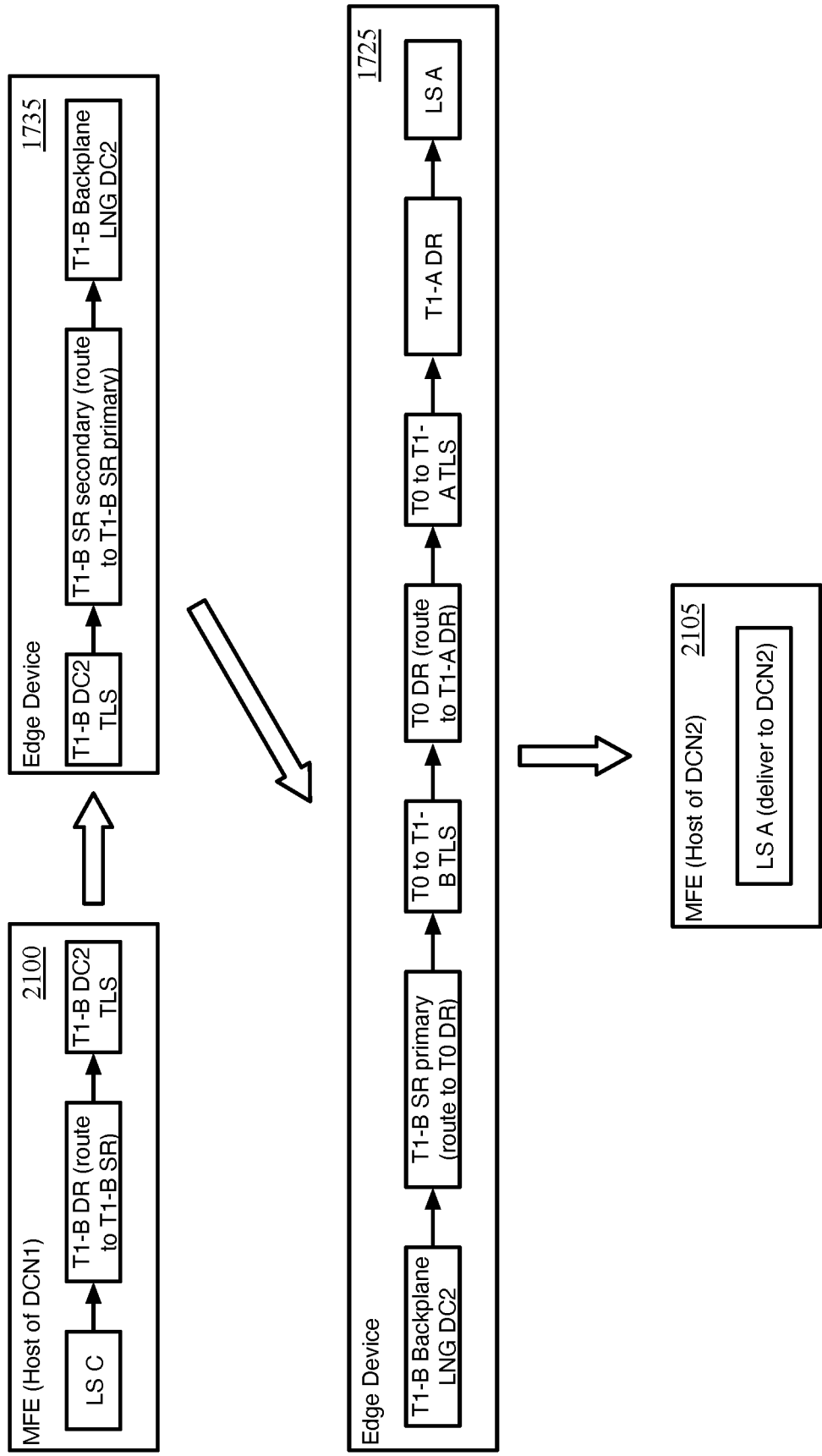
FIG. 21 conceptually illustrates the logical forwarding processing applied to an east-west data message sent from a first logical network endpoint DCN behind a first T1 logical router to a second logical network endpoint DCN behind a second T1 logical router.

FIG. 21 conceptually illustrates the logical forwarding processing (e.g., switching & routing) applied to an east-west data message sent from a first logical network endpoint DCN behind a first T1 logical router to a second logical network endpoint DCN behind a second T1 logical router. Specifically, in this example, the source DCN1 connects to the logical switch 1635 and resides on a host computer located in the second datacenter 1710, while the destination DCN2 connects to the logical switch 1625 and resides on a host computer located in the first datacenter 1705. The logical switch 1635 connects to the T1 logical router 1615 (which has stateful services, and therefore SRs) while the logical switch 1625 connects to the T1 logical router 1610 (which is entirely distributed).

As shown, the initial processing is performed by an MFE 2100 on the host computer where DCN1 operates. This MFE 2100 performs processing according to the logical switch 1635, which logically forwards the data message to the DR for the connected T1 logical router 1615 (based on the logical MAC address of the data message). The DR for this logical router 1615 is configured to route the data message to the SR for the same logical router within the same datacenter 1710 (e.g., according to a default route), via the transit logical switch used for connecting these two routing components. Thus, the MFE 2100 encapsulates the data message using the VNI for this transit logical switch and sends the data message through the datacenter network to the edge device 1735 that implements the secondary SR for the T1 logical router 1615.

The edge device 1735 receives the data message at one of its VTEPs and identifies the transit logical switch based on the VNI in the tunnel header. According to this transit logical switch, the datapath on the edge device 1735 executes the stage for the SR of the logical router 1615. Because this is the active SR within the secondary datacenter for the logical router 1615, the datapath stage routes the data message to the active SR for the logical router 1615 in the primary datacenter 1705 according to its routing table which, as described below, is configured by a combination of the network managers and routing protocol synchronization between the SRs. Based on this routing, the datapath executes the stage for logical network gateway for the backplane logical switch connecting the T1 SRs of the logical router 1615. The edge device 1735 therefore transmits the data message (using the VNI for the backplane logical switch) to the edge device 1725 implementing the active T1 SR in the primary datacenter.

Thus, the edge device implementing an active T1 SR at the primary datacenter for a particular logical router may receive outbound data messages from either the other edge devices implementing active T1 SRs for that logical router at secondary datacenters (via an RTEP) or from MFEs at host computers within the primary datacenter (via a VTEP). In this case, the edge device 1725 receives the data message via its RTEP from the edge device 1735, and uses the backplane logical switch VNI to execute the datapath stage for the backplane logical network gateway, which then calls the datapath to execute the stage(s) for the SR for the logical router 1615. The primary T1 SR performs stateful services (e.g., stateful firewall, load balancing, etc.) on this data message in addition to routing the data messages, depending on its configuration. In some embodiments, the primary T1 SR includes a default route to route data messages to the DR of the T0 logical router to which the T1 logical router is linked, which is used in this case to route the data message to the DR for the T0 logical router 1605.

Thus, the datapath executes a stage for the router link logical switch (also referred to here as a transit logical switch) between the T1 logical router 1615 and the T0 logical router 1605, then executes the stage for the T0 DR. Depending on whether the data message is directed to a logical network endpoint (e.g., connected to a logical switch behind a different T1 logical router) or an external endpoint (e.g., a remote machine connected to the Internet), the T0 DR will route the message to the other T1 logical router or to the T0 SR. In some embodiments, the T0 DR has a default route to the T0 SR in its same datacenter. However, in this case, the T0 DR also has a static route for the IP address of the underlying data message (e.g., based on the connection of the T1 logical router 1610 to the T0 logical router 1605) to route the data message to the DR of the logical router 1610 (which does not have any SRs). Accordingly, because the data message does not need to be sent to any additional edge devices (which would be the case if the T1 logical router 1615 also included SRs), the datapath executes stages for the router link transit logical switch between the T0 logical router 1605 and the T1 logical router 1610, the DR of the logical router 1610 (which routes the data message to its destination via the logical switch 1625), and for this logical switch 1625.

The stage for logical switch 1625 identifies the destination MAC address and encapsulates the data message with its VNI within the datacenter 1705 and the VTEP IP address for the host computer at which DCN2 resides. The edge device 1725 transmits this encapsulated data message to the MFE 2105, which delivers the data message to DCN2 according to the destination MAC address and the logical switch context.

In addition to the requirement that the primary SR for a T1 logical router process all data messages between endpoints connected to a logical switch that connects to that logical router and all endpoints external to that logical router, in some embodiments a T0 logical router may have specific egress points for certain external network addresses. As such, a northbound data message originating from a DCN located at a first datacenter might be transmitted (i) from the host computer to a first edge device implementing a secondary T1 SR at the first datacenter, (ii) from the first edge device to a second edge device implementing the primary T1 SR at a second datacenter, (iii) from the second edge device to a third edge device implementing the T0 SR at the second datacenter, and (iv) from the third edge device to a fourth edge device implementing the T0 SR at a third datacenter, from which the data message egresses to the physical network.

Figure 22:
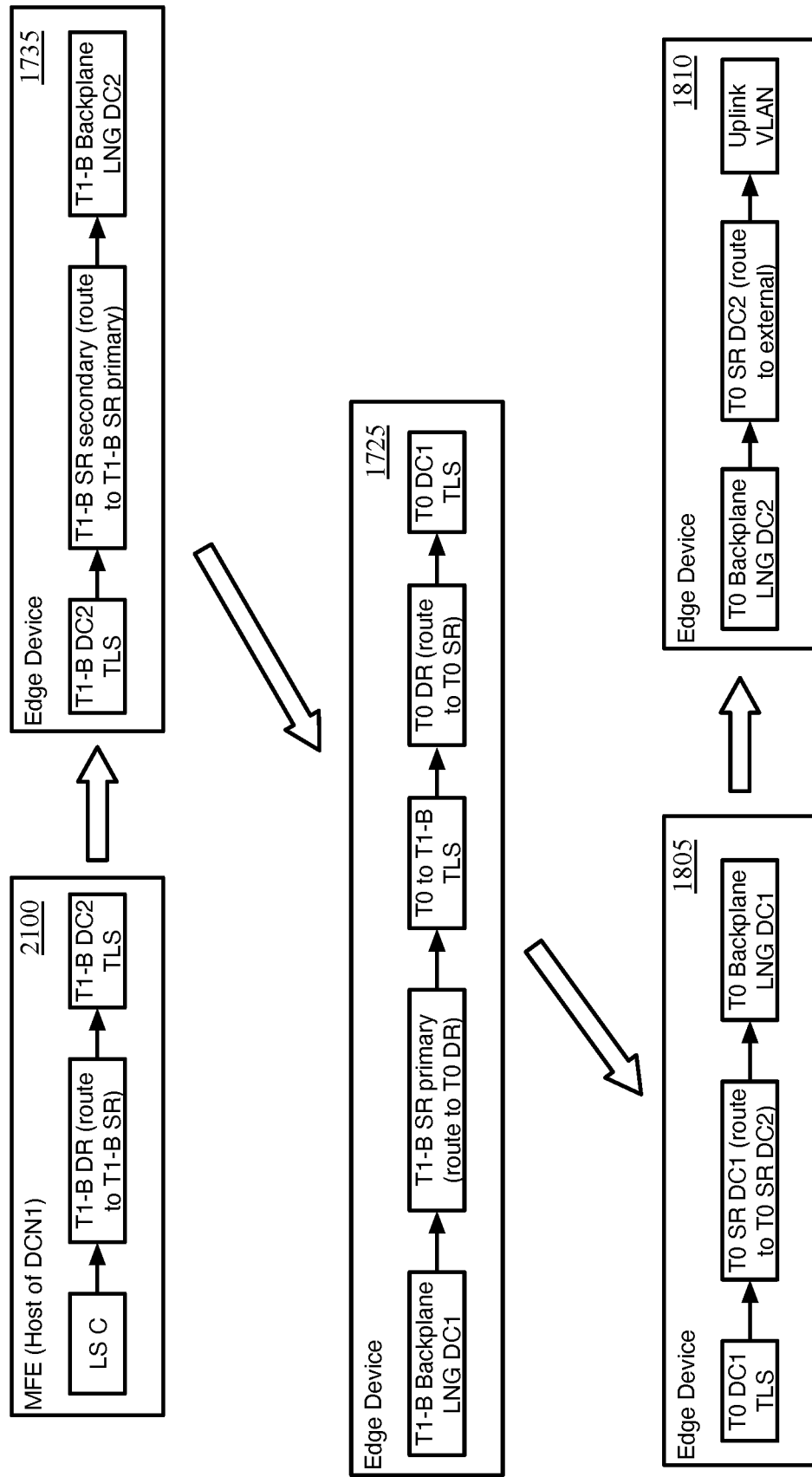
FIG. 22 conceptually illustrates the logical forwarding processing applied to a northbound data message sent from the logical network endpoint DCN1.

FIG. 22 conceptually illustrates the logical forwarding processing applied to such a northbound data message sent from the logical network endpoint DCN1. As shown in this figure, the processing at the source MFE 2100 and the edge device 1735 is the same as in FIG. 21—using default routes, the DR for the T1 logical router 1615 routes the data message to the SR in its datacenter 1710, which routes the data message to the primary SR for the T1 logical router 1615 in the datacenter 1705, and this data message is sent between datacenters according to the logical network gateway for the backplane logical switch connecting these SRs.

At the edge device 1725, the initial processing is also the same, with the primary T1 SR routing the data message to the T0 again according to its default route. The datapath stage for the T0 DR, in this case, routes the data message to the T0 SR in the same datacenter 1705 according to its default route, rather than a static route. As such, the datapath executes the stage for the transit logical switch between the T0 DR and T0 SR within the datacenter 1705 and transmits the data message between edge device VTEPs using the VNI for this transit logical switch.

Based on the logical switch context, the edge device 1805 executes the datapath stage for the T0 SR. In this example, the T0 SR in the first datacenter 1705 routes the data message to the T0 SR in the second datacenter 1710. This routing decision could be based on a default or static route configured by a network administrator (e.g., to send all egress traffic or egress traffic for specific IP addresses through the second datacenter 1710) or based on dynamic routing as described below (because an external router connected to the second datacenter 1710 advertised itself as a better route for the destination IP address of the data message). Based on this routing, the datapath executes the stage for logical network gateway for the backplane logical switch connecting the T0 SRs of the logical router 1605. The edge device 1805 therefore transmits the data message (using the VNI for the backplane logical switch) to the edge device 1810 implementing the active T0 SR in the second datacenter 1710.

This edge device 1810 receives the data message via its RTEP from the edge device 1805 and uses the backplane logical switch VNI to execute the datapath stage for the backplane logical network gateway, which then calls the datapath to execute the stage(s) for the SR for the T0 logical router 1605. This T0 SR routes the data message to an external router according to either a default route or a route for a more specific IP address prefix, and outputs the data message from the logical network via an uplink VLAN in some embodiments.

In general, southbound data messages do not necessarily follow the exact reverse path as did the corresponding northbound data message. If there is a primary datacenter defined for a T0 SR, then this SR will typically receive the southbound data messages from the external network (by virtue of advertising itself as the next hop for the relevant logical network addresses). If no T0 SR is designated as primary, then any active T0 SR at any of the datacenters may receive a southbound data message from the external network (though typically the T0 SR that transmitted corresponding northbound data messages will receive the southbound data messages).

The T0 SR in some embodiments, is configured to route the data message to the datacenter with the primary T1 SR, as this is the only datacenter for which a link between the T0 logical router and the T1 logical router is defined. Thus, the T0 SR routes the data message to the T0 SR at the primary datacenter for the T1 SR with which the data message is associated. In some embodiments, the routing table is merged for the T0 SR and T0 DR for southbound data messages, so that no additional stages need to be executed for the transit logical switch and T0 DR. In this case, at the primary datacenter for the T1 logical router, in some embodiments the merged T0 SR/DR stage routes the data message to the primary T1 SR, which may be implemented on a different edge device. The primary T1 SR performs any required stateful services on the data message, and proceeds with routing as described above.

In some embodiments, these southbound data messages are always received initially at the primary datacenter T1 SR after T0 processing. This is because, irrespective of in which datacenter the T0 SR receives an incoming data message for processing by the T1 SR, the T0 routing components are configured to route the data message to the primary datacenter T1 SR to have the stateful services applied. The primary datacenter T1 SR applies these services and then routes the data message to the T1 DR. The edge device in the primary datacenter that implements the T1 SR can then perform logical processing for the T1 DR and the logical switch to which the destination DCN connects. If the DCN is located in a remote datacenter, the data message is sent through the logical network gateways for this logical switch (i.e., not the backplane logical switch). Thus, the physical paths for ingress and egress traffic could be different, if the logical network gateways for the logical switch to which the DCN connects are implemented on different edge devices than the T1 SRs and backplane logical switch logical network gateways. Similarly, reverse east-west traffic that crosses multiple T1 logical routers (e.g., if DCN2 sent a return data message to DCN1 in the example of FIG. 21) may follow a different path due to first-hop processing.

Figure 23:
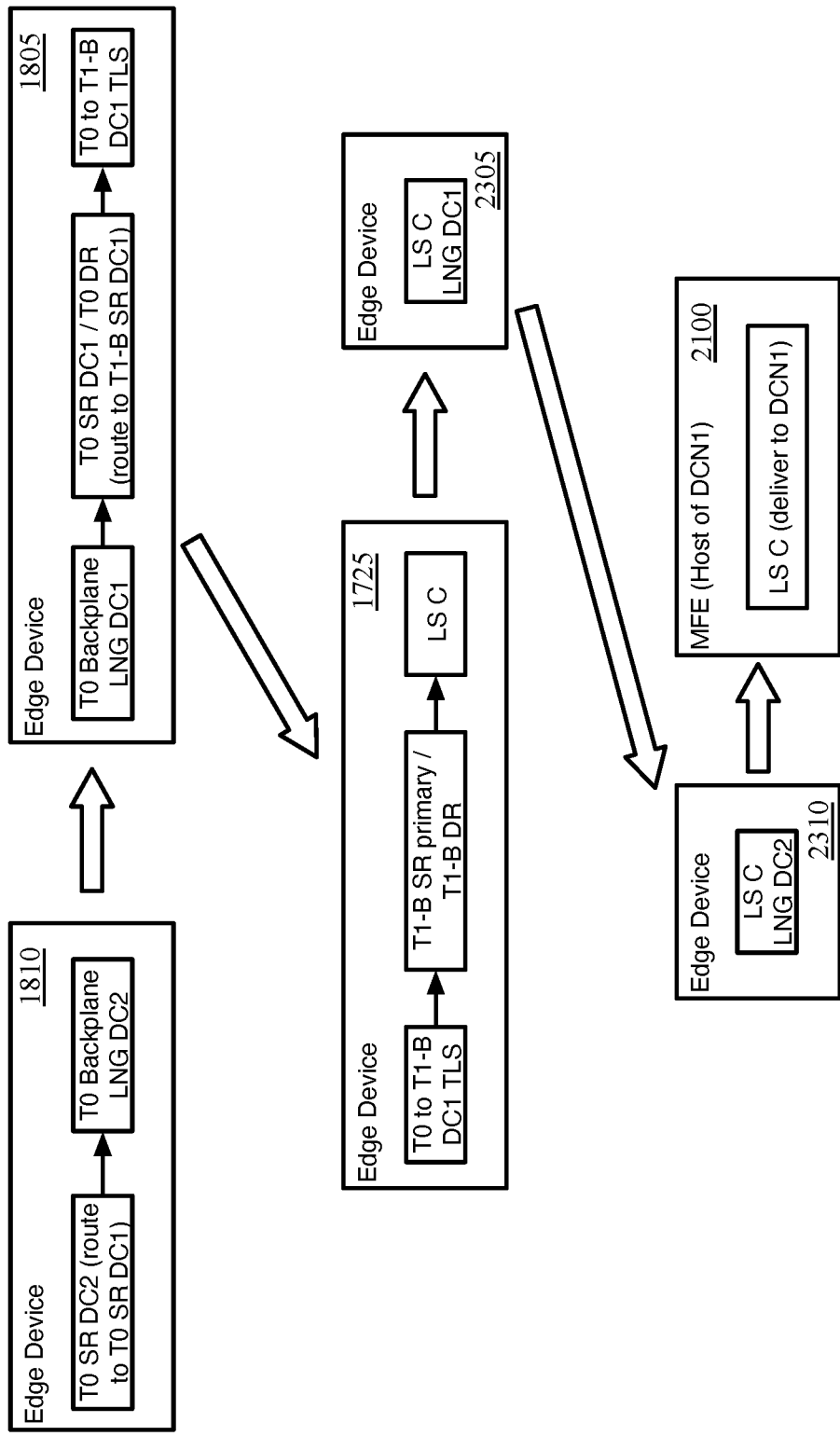
FIGS. 23 and 24 conceptually illustrate different examples of processing for southbound data messages.
Figure 24:
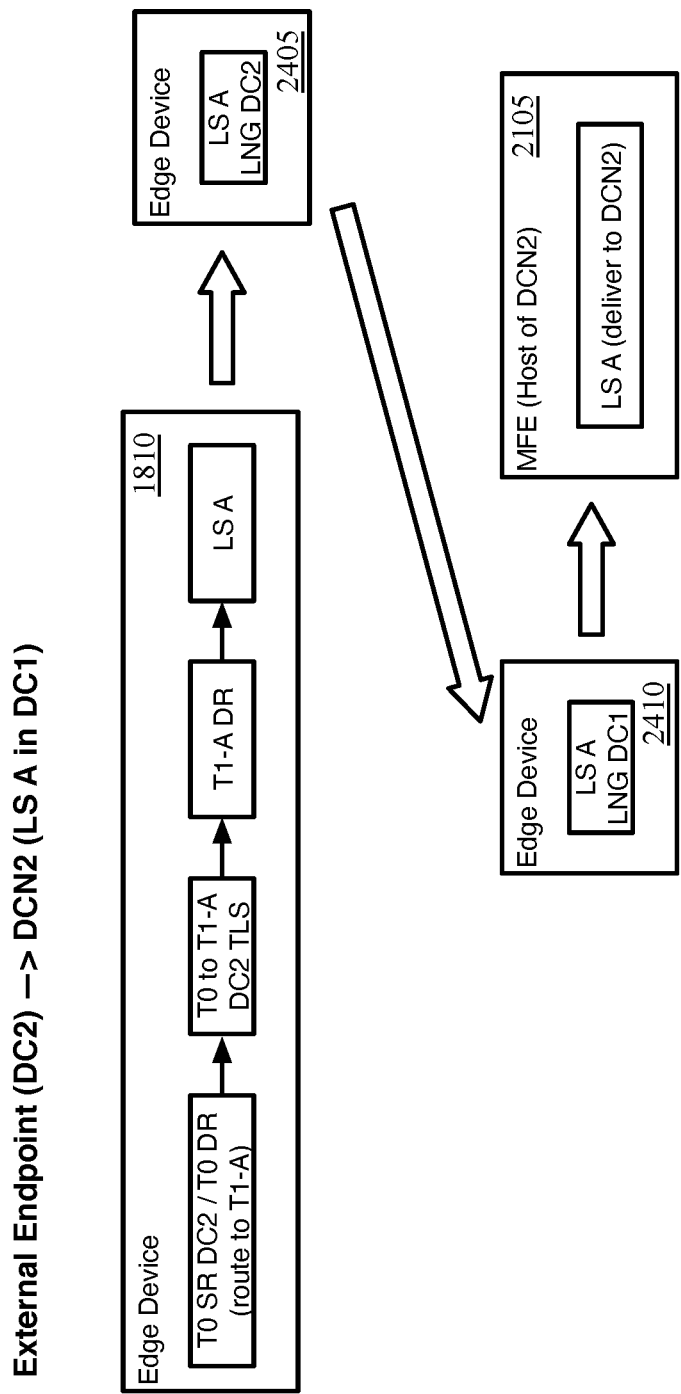

FIGS. 23 and 24 conceptually illustrate different examples of processing for southbound data messages. FIG.

23, specifically, illustrates the logical forwarding processing applied to a southbound data message sent from an external endpoint (that ingresses to the logical network at the second datacenter 1710) to DCN1 (which connects to the logical switch 1635 and also resides on a host computer located in the second datacenter 1710).

As shown in this figure, the southbound data message is received at the edge device 1810 that connects to the external network in the second datacenter 1710. Based on, e.g., being received via a particular uplink VLAN, the edge device datapath executes the stage for the T0 SR. This T0 SR routes the data message to the T0 SR in the first datacenter 1705. In some embodiments, because the first datacenter 1705 is the primary datacenter for the T1 logical router 1615, the SRs for the T0 logical router 1605 in other datacenters are configured to route data messages with IP addresses associated with that logical router 1615 to their peer T0 SRs in the first datacenter 1705. These IP addresses could be NAT IP addresses, load balancer virtual IP addresses (LB VIPs), IP addresses belonging to subnets associated with the logical switches 1635 and 1640, etc. Based on this routing, the datapath executes the stage for logical network gateway for the backplane logical switch connecting the SRs of the T0 logical router 1605. The edge device 1810 therefore transmits the data message (using the VNI for the backplane logical switch) to the edge device 1805 implementing the active T0 SR in the first datacenter 1705.

The edge device 1805 receives the data message via its RTEP from the edge device 1810 and uses the backplane logical switch VNI to execute the datapath stage for the backplane logical network gateway, which then calls the datapath to execute the stage(s) for the SR for the logical router 1605. As mentioned, in some embodiments the SR and DR routing tables are merged on the gateways (so as to avoid having to execute additional datapath stages for southbound data messages). Thus, the T0 SR stage uses this merged routing table to route the data message to the SR of the T1 logical router 1615 in the same datacenter 1705. This route is only configured in the routing table for the merged T0 SR/DR in the primary datacenter for the T1 logical router (and not in the other datacenters). Thus, the datapath executes a stage for the router link transit logical switch between the T0 logical router 1605 and the T1 logical router 1615, which encapsulates the data message using the VNI for this logical switch as well as the VTEPs of the edge device 1805 and the edge device 1725 on which the primary T1 SR is implemented. The edge device 1805 then transmits the encapsulated data message to the edge device 1725.

Based on the logical switch context, the edge device 1725 executes the datapath stage for the primary SR for the T1 logical router 1615. As with T0 logical router 1605, the primary SR and DR routing tables are also merged for the T1 logical router 1615, so that additional datapath stages are not required for southbound data messages. This stage performs any required stateful services (e.g., NAT, LB, firewall, etc.) and the merged routing table routes the data message to the logical switch 1635 based on the destination IP address (possibly after performing NAT). The stage for the logical switch 1635 identifies the destination MAC address that is connected to that logical switch, and the destination MAC address maps to a VTEP group record for the logical network gateway within the first datacenter 1705 (assuming that this is not also implemented on the edge device 1725). As shown, the edge device 1725 transmits an encapsulated data message (using the VNI for the logical switch 1635 in the datacenter 1705) to the edge device 2305 implementing the logical network gateway for the logical switch 1635 in the datacenter 1705.

This edge device 2305 executes the logical network gateway, which performs VNI translation as described above, and sends the data message through the inter-datacenter network to edge device 2310 that implements the logical network gateway for the logical switch 1635 in the second datacenter 1710 (using the intra-datacenter VNI for the logical switch 1635). This edge device 2310 also executes the logical network gateway for data messages received at the RTEP, which performs VNI translation and transmits the data message through the network of the second datacenter 1710 to the MFE 2100, which in turn delivers the data message to DCN1.

FIG. 24 conceptually illustrates the logical forwarding processing applied to a southbound data message sent from an external endpoint (that ingresses to the logical network at the second datacenter 1710) to DCN2 (which connects to the logical switch 1625 and resides on a host computer located in the first datacenter 1705). Because the logical switch 1625 is behind the T1 logical router 1610 that is entirely distributed, the data message processing is simpler than in the example of FIG. 23.

As shown, the southbound data message is received at the edge device 1810 that connects to the external network in the second datacenter 1710. Based on, e.g., being received via a particular uplink VLAN, the edge device executes the datapath stage for the T0 SR (which is merged with the T0 DR for routes that do not require sending the data message to another peer T0 SR. Because the T1 logical router 1610 is entirely distributed, all of the T0 SRs (i.e., in any of the datacenters) route to the T1 DR for this logical router any data messages having destination IP addresses associated with the logical router. Thus, the datapath executes the stage for the router link transit logical switch between the T0 logical router 1605 and the T1 logical router 1610, which in turn calls the stage for the DR of the T1 logical router 1610. This stage routes the data message to the logical switch 1625 based on the destination IP address. The stage for the logical switch 1625 identifies that the destination MAC address is connected to that logical switch, and the destination MAC address maps to a VTEP group record for the logical network gateway within the second datacenter 1710 (assuming that this is not also implemented on the edge device 1810). As shown, the edge device 1810 transmits an encapsulated data message (using the VNI for the logical switch 1625 in the datacenter 1710) to the edge device 2405 implementing the logical network gateway for the logical switch 1625 in the datacenter 1710.

This edge device 2405 executes the logical network gateway, which performs VNI translation as described above, and sends the data message through the inter-datacenter network to edge device 2410 that implements the logical network gateway for the logical switch 1625 in the first datacenter 1705 (using the intra-datacenter VNI for the logical switch 1625). This edge device 2410 also executes the logical network gateway for data messages received at the RTEP, which performs VNI translation and transmits the data message through the network of the first datacenter 1705 to the MFE 2105, which in turn delivers the data message to DCN2.

It should be noted that, as with the examples shown in FIGS. 22 and 23, the northbound and southbound paths for data messages to and from DCN2 (attached to the logical switch 1625) may also be different. In this case, a northbound message from DCN2 to an external endpoint reachable through the second datacenter 1710 would be sent directly from the MFE 2105 to the edge device 1805 implementing the SR for T0 logical router 1605 (after the MFE 2105 performed processing for the logical switch 1625, the DR of T1 logical router 1610, the DR of the T0 logical router 1605, and intervening transit or router link logical switches. The edge device 1805 would then transmit the northbound data message (using the VNI for the backplane logical switch of the T0 SR) to the edge device 1810 implementing the active T0 SR in the second datacenter 1710, which would in turn route the data message to the external network.

As mentioned, the routing tables for the various SRs and DRs are defined in part by the local managers in some embodiments. More specifically, the local managers define the routing configurations for the SRs and DRs (of both T1 and T0 logical routers), and push this routing configuration to the edge devices and host computers that implement these logical routing components. For logical networks in which all of the LFEs are defined at the global manager, the global manager pushes to the local managers the configuration information regarding all of the LFEs that span to their respective datacenters. These local managers use this information to generate the routing tables for the various logical routing components implemented within their datacenters.

Figure 25:
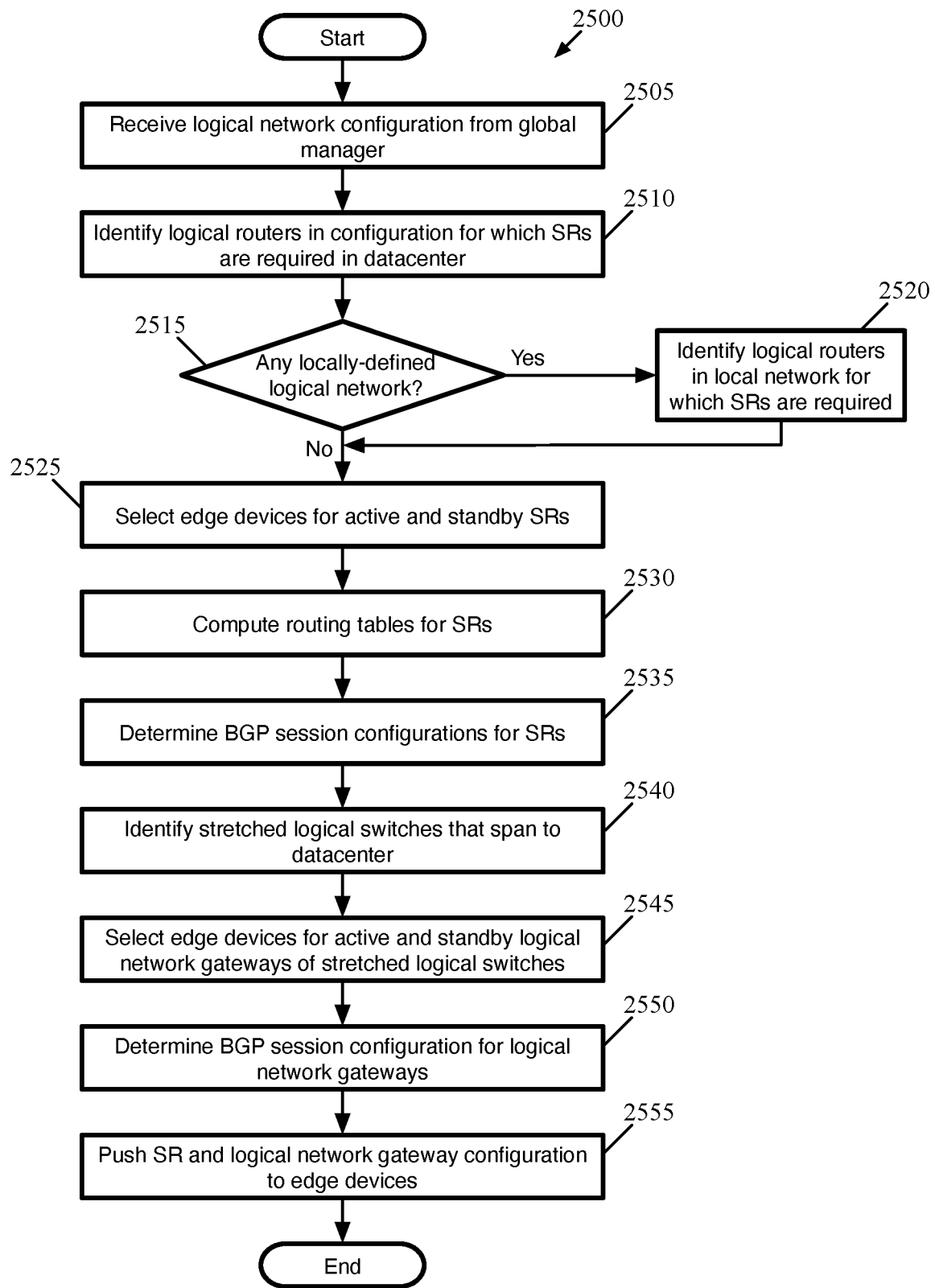
FIG. 25 conceptually illustrates a process of some embodiments for configuring the edge devices in a particular datacenter based on a logical network configuration.

FIG. 25 conceptually illustrates a process 2500 of some embodiments for configuring the edge devices in a particular datacenter based on a logical network configuration. In some embodiments, the process 2500 is performed by the local manager and/or management plane (when the management plane is separate from the local manager) in the particular datacenter. In addition, while the process 2500 describes various operations performed upon receiving an initial logical network configuration, it should be understood that some of the operations may be performed on their own upon receiving modifications to the logical network configuration that affect the edge devices in the datacenter.

As shown, the process 2500 begins by receiving (at 2505) a logical network configuration from the global manager. In some embodiments, as described in greater detail in U.S. patent application Ser. No. 16/906,944, filed Jun. 19, 2020, entitled "Parsing Logical Network Definition for Different Sites", now issued as U.S. Pat. No. 11,088,916, which is incorporated by reference above, when the global manager receives configuration data for the logical network, the global manager determines the span for each of the logical network entities and provides the configuration data for each of those entities to the local managers at the appropriate datacenters.

The process 2500 then identifies (at 2510) logical routers in the configuration for which SRs are required in the datacenter. In some embodiments, any T0 logical router that spans to the datacenter requires one or more SRs in the datacenter. In addition, any T1 logical router that spans to the datacenter and for which centralized components are defined also requires one or more SRs in the datacenter. In some embodiments, the SR is defined at least in part at the global manager (e.g., by the network administrator providing configuration data for the SR).

In addition, the process 2500 determines (at 2515) whether any locally-defined logical network elements have been defined. As described above, in some embodiments a network administrator can define network elements (e.g., logical routers, logical switches, security groups, etc.) specific to a particular datacenter via the local manager for that datacenter. If the administrator has defined local network elements, the process 2500 identifies (at 2520) logical routers in this local network for which one or more SRs are required. These could also include T1 and/or T0 logical routers. The T1 logical routers may be linked to T0 logical routers of the global network in some embodiments.

With the SRs identified, the process 2500 selects (at 2525) edge devices for the active and standby SRs. In some embodiments, the network administrator, when defining a logical router to span to a particular datacenter, does so by linking the logical router with a particular cluster of edge devices at the global manager. In this case, the global manager provides this information to the local manager. Similarly, for logical routers defined at the local manager, the network administrator can also link these with a logical manager. Each logical router with SRs is also configured to be either active-standby or active-active (and, if active-active, the configuration specifies the number of active SRs to configure in the datacenter). In addition to this information, some embodiments also use load balancing techniques (possibly in conjunction with usage data for the edge devices in a selected cluster) to select the edge devices for active and standby SRs from the specified edge clusters.

The process 2500 also computes (at 2530) routing tables for each of the SRs in the datacenter. These routing tables may vary in complexity depending on the type of logical router and whether the SR is a secondary SR or a primary SR. For instance, for a T1 logical router, each secondary SR is configured with a default route to the primary T1 SR by the local manager at the T1 SR. As the secondary SRs should not receive southbound data messages, in some embodiments this is the only route with which they are configured. Similarly, the primary SR is configured with a default route to the T0 DR in some embodiments. In addition, the primary SR is configured with routes for routing data traffic to the T1 DR. In some embodiments, a merged routing table for the primary SR and DR of the T1 logical router is configured to handle routing southbound data messages to the appropriate stretched logical switch at the primary T1 SR.

For a T0 logical router, the majority of the routes for routing logical network traffic (e.g., southbound traffic) are also configured for the T0 SRs by the local managers. To handle traffic to stretched T1 logical routers, the T0 SRs are configured with routes for logical network addresses handled by these T1 logical routers (e.g., network address translation (NAT) IP addresses, load balancer virtual IP addresses (LB VIPs), logical switch subnets, etc.). In some embodiments, the T0 SR routing table (merged with the T0 DR routing table) in the same datacenter as the primary SR for a T1 logical router is configured with routes to the primary T1 SR for these logical network addresses. In other datacenters, the T0 SR is configured to route data messages for these logical network addresses to the T0 SR in the primary datacenter for the T1 logical router.

As noted, a network administrator can also define LFEs that are specific to a datacenter in some embodiments and link those LFEs to the larger logical network through the local manager for the specific datacenter (e.g., by defining a T1 logical router and linking the T1 logical router to a T0 logical router of the larger logical network). In some such embodiments, configuration data regarding the T1 logical router will not be distributed to the other datacenters implementing the T0 logical router. In this case, in some embodiments, the local manager at the specific datacenter configures the T0 SR implemented in this datacenter with routes for the logical network addresses related to the T1 logical router. This T0 SR exchanges these routes with the T0 SRs at the other datacenters via a routing protocol application as described below, thereby attracting southbound traffic directed to these network addresses.

In addition, one or more of the T0 SRs will generally be connected to external networks (e.g., directly to an external router, or a top-of-rack (TOR) forwarding element that in turn connects to external networks) and exchange routes with these external networks. In some embodiments, the local manager configures the edge devices hosting the T0 SRs to advertise certain routes to the external network and to not advertise others, as described further below. If there is only a single egress datacenter for the T0 SR, then the T0 SR(s) in that datacenter will learn routes from the external network via a routing protocol and can then share these routes with the peer T0 SRs in the other datacenters.

When there are multiple datacenters available for egress, typically all of the T0 SRs will be configured with default routes that direct traffic to their respective external network connections. In addition, the T0 SRs will learn routes for different network addresses from their respective external connections and can share these routes with their peer T0 SRs in other datacenters so as to attract northbound traffic for which they are the optimal egress point.

The process 2500 also determines (at 2535) routing protocol (e.g., BGP) session configurations for the SRs. As described in more detail below, some embodiments define a mesh of internal BGP (iBGP) sessions between all of the SRs for a given logical router. This can include the active and standby SRs (so that the standby SRs can use this BGP session to notify the other SRs in case of failover). In addition, some SRs (e.g., T0 SRs) share routes over these iBGP sessions in order to attract traffic for datacenter-specific IP addresses, etc. Furthermore, some embodiments configure external BGP (eBGP) sessions for any T0 SRs that are specified to connect to external networks, thereby allowing the T0 SRs to (i) receive routes from external network routers (which can be shared via the iBGP) sessions and (ii) advertise routes to these external network routers in order to attract logical network traffic.

In addition to the SRs, the process 2500 also identifies (at 2540) any stretched logical switches that span to the datacenter. In some embodiments, these logical switches are identified in the logical network configuration received from the global manager. The stretched logical switches may include those to which logical network endpoint DCNs connect as well as backplane logical switches used to connect groups of peer SRs.

The process 2500 selects (at 2545) edge devices for the active and standby logical network gateways of these stretched logical switches. For backplane logical switches, as described above, the local manager links the logical network gateways with the SRs in some embodiments, so as to avoid unnecessary extra hops. For user-defined logical switches, in some embodiments the edge cluster from which to select for edge devices the logical network gateways will have been specified by the administrator, while in other embodiments the local manager selects an edge cluster and then selects specific edge devices from the cluster. In addition to this information, some embodiments also use load balancing techniques (possibly in conjunction with usage data for the edge devices in a selected cluster) to select the edge devices for active and standby logical network gateways from the chosen edge clusters.

In addition, the process 2500 determines (at 2550) routing protocol (e.g., BGP) session configurations for the logical network gateways. For backplane logical switches, some embodiments use the SR iBGP sessions to handle failover, so additional sessions are not needed. For the logical network gateways for user-defined logical switches, additional iBGP sessions are defined to handle failover. Because the logical network gateways are not routers, there is no need to share routes via these iBGP sessions.

Finally, the process 2500 pushes (at 2555) the SR and logical network gateway configuration data (including the BGP session configuration data) to the selected edge devices. The process 2500 then ends. In some embodiments, the local manager and/or management plane provides this data to the CCP cluster in the datacenter, which in turn provides the data to the correct edge devices. In other embodiments, for at least some of the configuration data (e.g., the BGP configuration information), the management plane provides the data directly to the edge devices.

As discussed, in some embodiments, in order to handle this route exchange (between T0 SR peers, between T1 SR peers (in certain cases), and between T0 SRs and their external network routers), the edge devices on which SRs are implemented execute a routing protocol application (e.g., a BGP or OSPF application). The routing protocol application establishes routing protocol sessions with the routing protocol applications on other edge devices implementing peer SRs as well as with any external network router(s). In some embodiments, each routing protocol session uses a different routing table (e.g., a virtual routing and forwarding table (VRF)) for each routing protocol session. For T1 SRs, some embodiments use the routing protocol session primarily to notify the other peer T1 SRs that a given T1 SR is the primary SR for the T1 logical router, and to handle failover. When failover occurs, for example, the new primary T1 SR sends out a routing protocol message indicating that it is the new primary T1 SR and default routes for the other T1 SR peers should be directed to its IP and MAC address rather than that of the previous active primary T1 SR.

Figure 26:
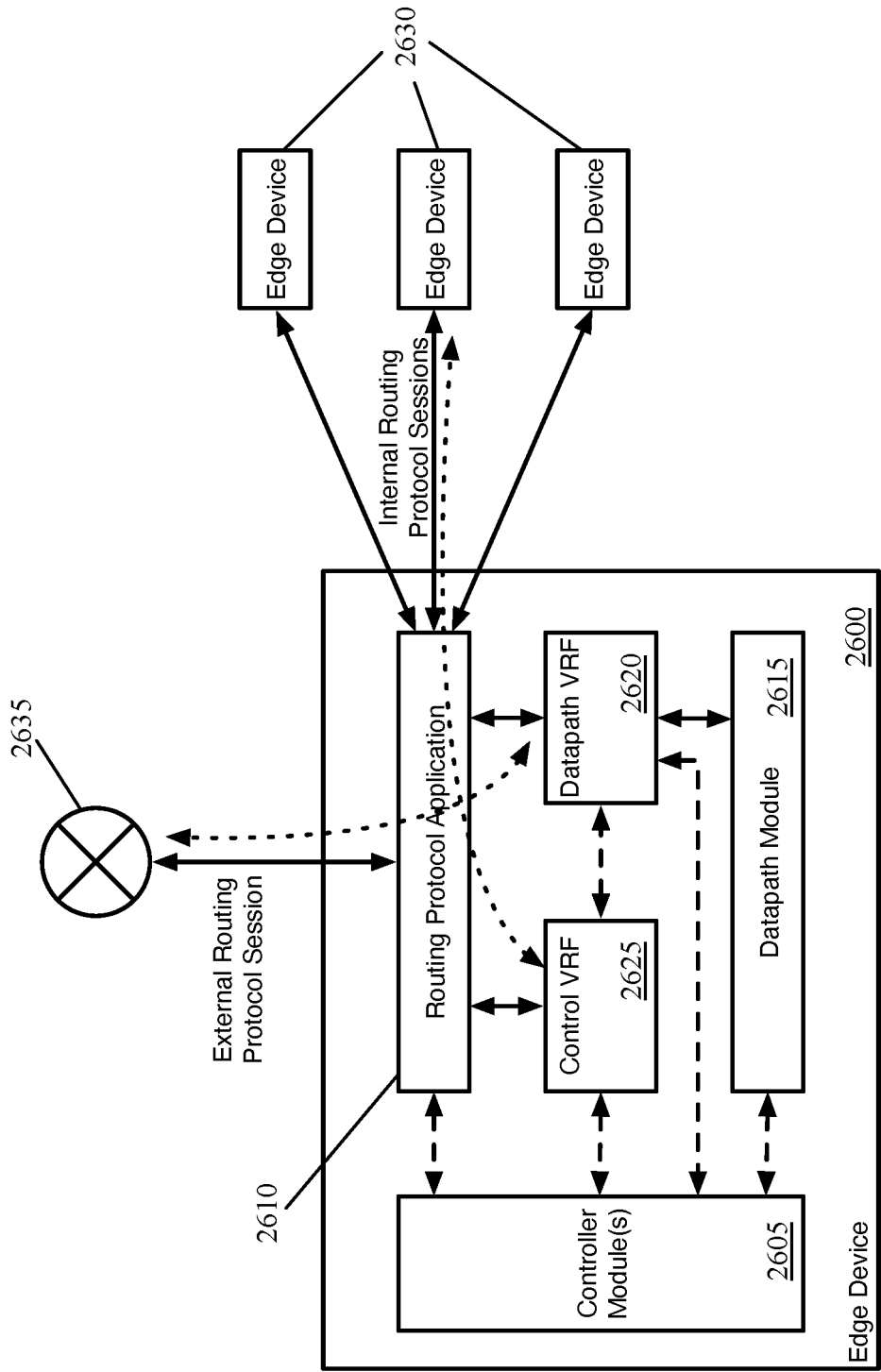
FIG. 26 conceptually illustrates the routing architecture of an edge device of some embodiments.

FIG. 26 conceptually illustrates the routing architecture of an edge device 2600 of some embodiments. As mentioned above, in some embodiments the edge device 2600 is a bare metal computing device, in which all of the illustrated components execute in the primary operating system. In other embodiments, these components execute within a virtual machine or other DCN that operates on the edge device. As shown the edge device includes a set of controller modules 2605, a routing protocol application 2610, and a datapath module 2615.

The datapath module 2615, as described above, executes the edge datapath stages. These stages, in some embodiments, can include logical network gateway stages for logical switches, T0 and/or T1 logical router stages (both DR and/or SR stages), transit logical switch stages, etc. In some embodiments, each logical router stage uses a datapath VRF 2620 that is configured with the routing table for that logical router stage. In other embodiments, the datapath VRF 2620 is used (potentially along with the control VRF 2625) by the controller module 2605 to generate a routing table for use by the datapath 2615 for a logical router stage (rather than the datapath module 2615 directly accessing the datapath VRF 2620).

The routing protocol application 2610 manages routing protocol sessions (e.g., using BGP or OSPF) with (i) other routing protocol applications at peer edge devices 2630 (i.e., other edge devices that implement peer SRs) and (ii) one or more external routers 2635. As mentioned, in some embodiments, each routing protocol session uses a specific VRF (though multiple routing protocol sessions may use the same VRF). Specifically, in some embodiments, the routing protocol application 2610 uses two different VRFs for route exchange for a given T0 SR.

First, each T0 SR has the datapath VRF 2620 that is used by the datapath module 2615 for processing data messages sent to the T0 SR (or is the primary source for the routing table used by the datapath module 2615 to implement the T0 SR). In some embodiments, the routing protocol application 2610 uses this datapath VRF 2620 for route exchange with the external network router(s) 2635. Routes for any prefixes identified for advertisement to the external networks are used by the datapath module 2615 to implement the T0 SR, and the routing protocol application 2610 advertises these routes to the external networks. In addition, when the routing protocol application receives routes from the external router(s) 2635 via routing protocol messages, the routing protocol application 2610 automatically adds these routes to the datapath VRF 2620 for use by the datapath module 2615 to implement the T0 SR.

In addition, in some embodiments, the routing protocol application 2610 is configured to import routes from the datapath VRF 2620 to a second VRF 2625 (referred to as the control VRF). The routing protocol application 2610 uses the control VRF 2625 for the routing protocol sessions with other edge devices 2630 that implement SRs for the same T0 logical router. Thus, any routes learned from the session with the external network router(s) 2635 at the edge device 2600 can be shared via the control VRF 2625 with all of the other edge devices 2630. When the routing protocol application 2610 receives a route from a peer edge device 2630 implementing the same T0 SR, in some embodiments the application 2610 also adds this route to the datapath VRF 2620 for implementing the T0 SR by the datapath module 2615 only so long as there is not already a better route in the datapath VRF for the same prefix (i.e., a route with a shorter administrative distance).

The controller modules 2605 are one or more modules responsible for receiving configuration data from the network management system (e.g., from the local manager, management plane, and/or CCP cluster in the datacenter in which the edge device 2600 operates) and configuring the routing protocol application 2610 and the datapath module 2615. For the datapath, in some embodiments, the controller modules 2605 actually configure various configuration databases, VRFs (e.g., the datapath VRF 2620), and/or routing tables that specify the configuration for the various stages executed by the datapath module 2615. The datapath module 2615 and its configuration according to some embodiments is described in greater detail in U.S. Pat. No. 10,084,726, which is incorporated herein by reference.

In some embodiments, the controller modules 2605 also configure the routing protocol application 2610 to (i) setup the routing protocol sessions with the edge devices 2630 and the external router(s) 2635 and (ii) manage the exchange of routes between the datapath VRF 2620 and the control VRF 2625. In other embodiments, the controller modules 2605 manage the exchange of routes between the datapath VRF 2620 and the control VRF 2625, and this is not part of the configuration for the routing protocol application 2610. In some embodiments, the configuration for the routing protocol sessions includes the IP addresses of the other edge devices 2630 (e.g., RTEP IP addresses or IP addresses for control interfaces) and the routers 2635. This configuration information may also indicate the active/standby as well as primary/secondary (if relevant) status of each of the T0 SRs with which an internal session is being setup.

As indicated above, the use of two VRFs allows for different VRFs for the route exchange sessions with the external router(s) and with peer edge devices. The use of the routing protocol application 2610 to move routes between these VRFs also allows for one edge device to learn a route from the external router for a given network address prefix and then attract traffic for that route from the other edge devices implementing the SRs for the same logical router. In addition, the use of the two different VRFs allows for segregation of route distribution control for internal connectivity (the control VRF) and external connectivity (the datapath VRF). In some embodiments, the control VRF is controlled by the network management system whereas the datapath VRF is controlled by the network administrator (in this case, only the datapath VRF is exposed to the user).

Figure 27A:
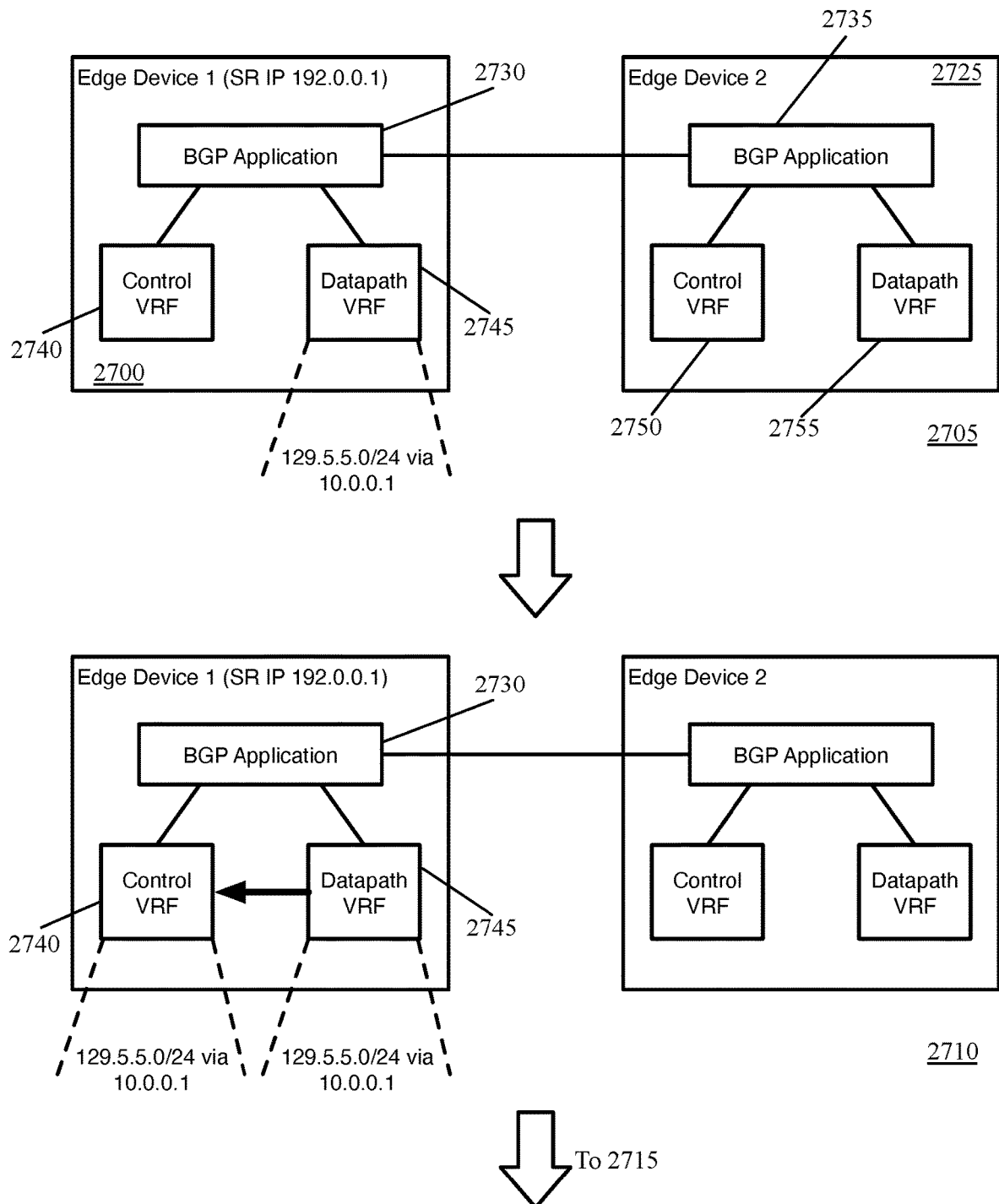
FIGS. 27A-B conceptually illustrate the exchange of routes between two edge devices.
Figure 27B:
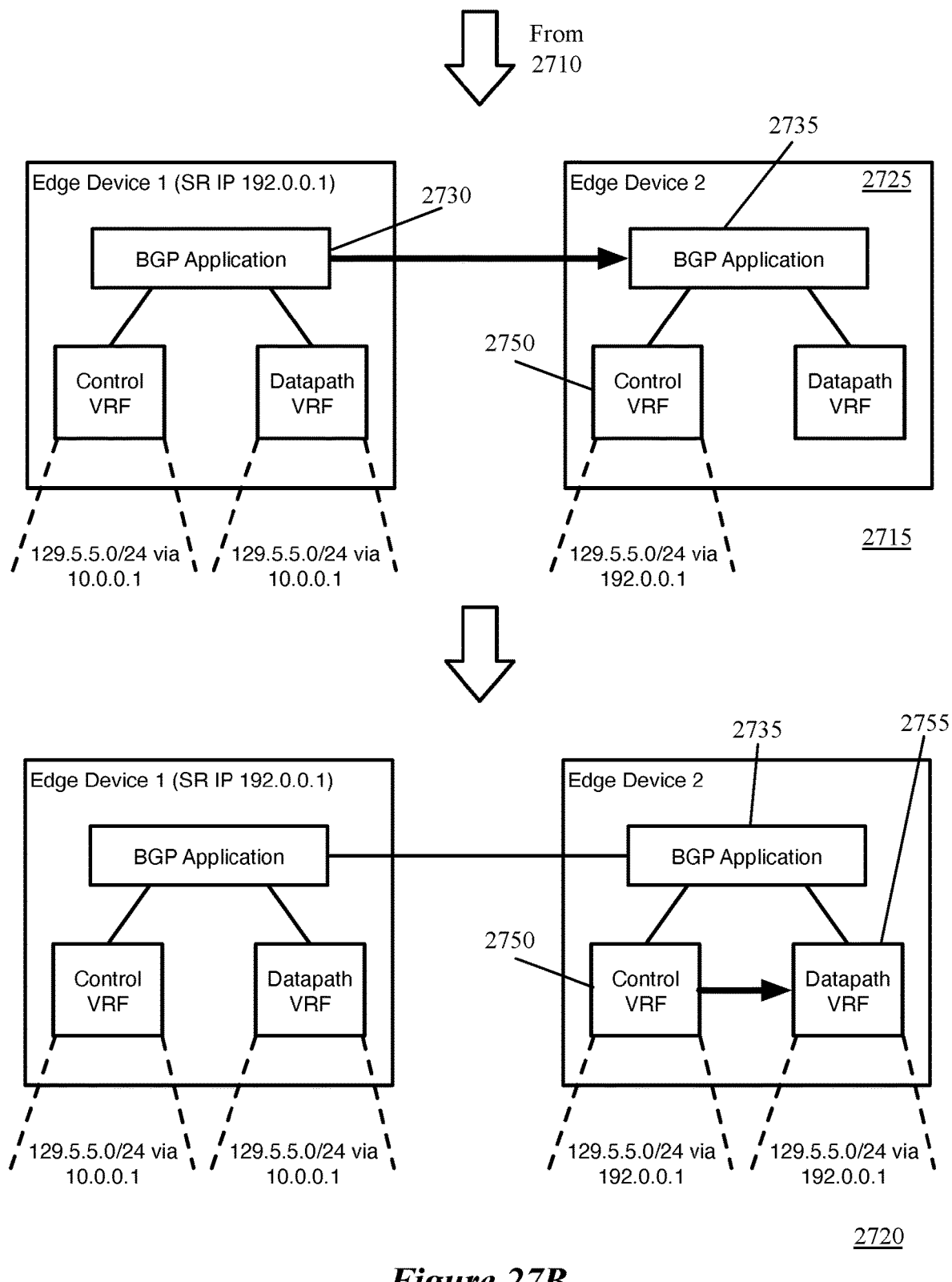

FIGS. 27A-B conceptually illustrate the exchange of routes between two edge devices 2700 and 2725 over four stages 2705-2720. These two edge devices 2700 and 2725 implement two T0 SR peers (i.e., SRs for the same T0 logical router). The BGP application 2730 on the first edge device 2700 manages an iBGP session with the BGP application 2735 on the second edge device 2725 as well as an eBGP session with an external router (not shown). The first edge device 2700 stores a control VRF 2740 for the iBGP session and a datapath VRF 2745 for the eBGP session (and for use by the datapath module (not shown) or for generating the routing table for the datapath module). Similarly, the second edge device 2725 stores a control VRF 2750 for the iBGP session and a datapath VRF 2755 for any eBGP sessions with external routers (and for use by its datapath module (also not shown) or for generating the routing table for its datapath module). As shown at the first stage 2705, the datapath VRF 2745 includes a route for the IP prefix 129.5.5.0/24 with a next hop address of 10.0.0.1. In this case, this is a route added to the datapath VRF 2745 by the BGP application 2730 based on receipt of the route from the external router via the eBGP session.

In the second stage 2710, the route for 129.5.5.0/24 is imported from the datapath VRF 2745 to the control VRF 2740 (e.g., by the BGP application 2730 or the control module (not shown) on the edge 2700). As described further below, in some embodiments any route in the datapath VRF is imported to the control VRF unless that route is specifically tagged (e.g., using a BGP community) to not be shared with edge devices implementing peer SRs.

Next, in the third stage 2715, the BGP application 2730 sends an iBGP message advertising a route for the prefix 129.5.5.0/24 to the BGP application 2735 on the edge device 2725. This message indicates that the next hop for the route is 192.0.0.1, an IP address associated with an interface of the SR. As shown at this stage, the BGP application 2735 adds this route to the control VRF 2750.

Finally, at the fourth stage 2720, the route is imported from the control VRF 2750 to the datapath VRF 2755 (e.g., by the BGP application 2735 or the control module (not shown) on the edge 2725). Based on this route, the datapath stage for the SR on the second edge device 2735 will route data messages for IP addresses in the subnet 129.5.5.0/24 to the SR implemented on the first edge device 2700. Some embodiments tag this route in the datapath VRF 2755 (e.g., using a BGP community) to not be exported, so that the BGP application 2735 will not advertise the prefix to any external routers.

Figure 28:
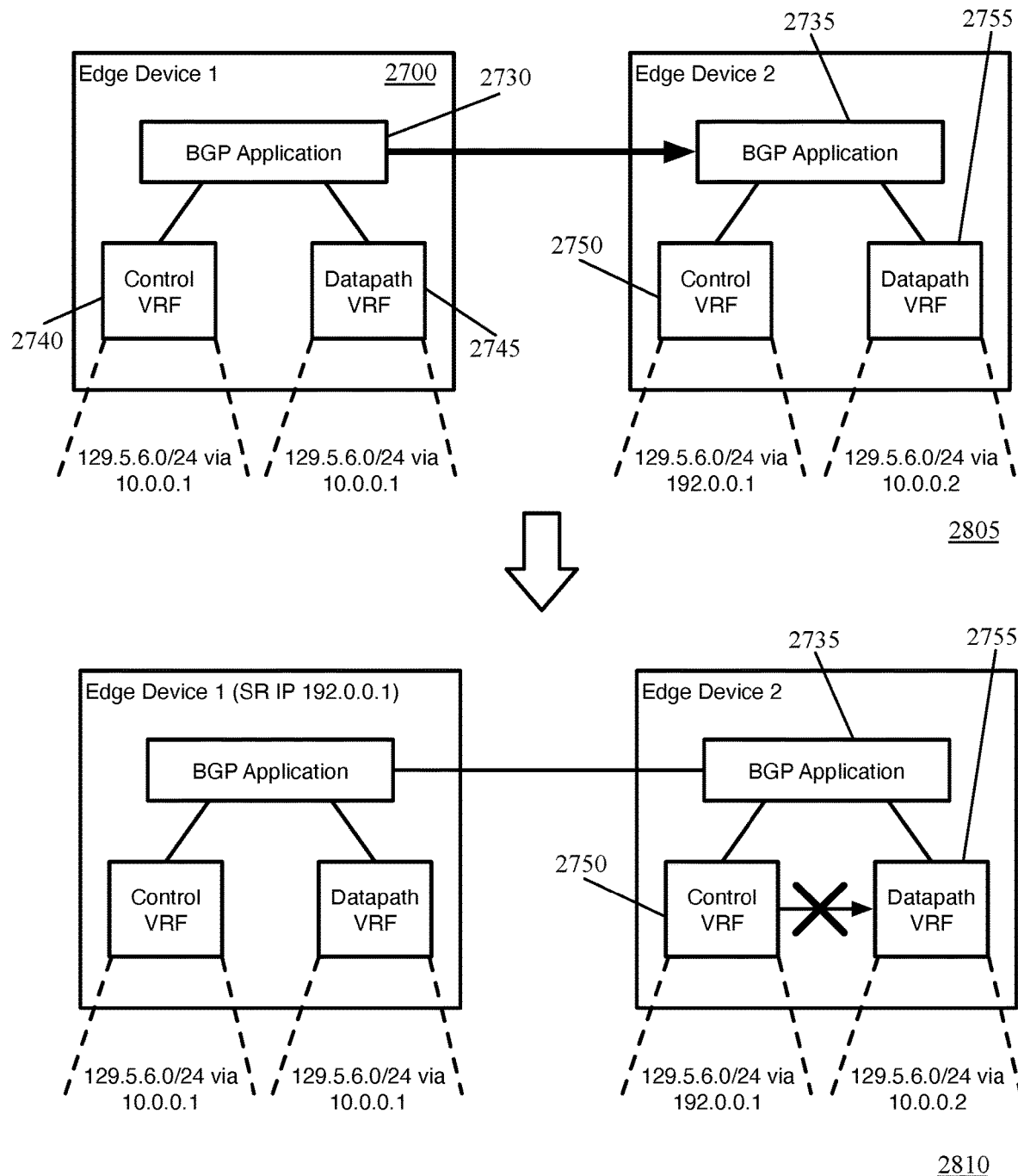
FIG. 28 conceptually illustrates a similar exchange of routes, except that in this case the datapath VRF in the second edge device already has a route for the prefix.

FIG. 28 conceptually illustrates a similar exchange of routes over two stages 2805-2810, except that in this case the datapath VRF 2755 in the second edge device 2725 already has a route for the prefix. The first stage 2805 is similar to the third stage 2715 of FIG. 27, with the BGP application 2730 on the first edge device 2700 sending an iBGP message advertising a route for the IP prefix 192.5.6.0/24 to the BGP application 2735 on the second edge device 2725. A route for this prefix (with a next hop of 10.0.0.1) is already stored in both the datapath VRF 2745 and control VRF 2740 on the first edge device 2700, and based on this iBGP message the BGP application 2735 adds the route for this prefix (having a next hop of IP address of 192.0.0.1 for the SR interface) to its control VRF 2750.

In addition, the datapath VRF 2755 on the second edge device already stores a route for the IP prefix 192.5.6.0/24, with a next hop address of 10.0.0.2 (e.g., corresponding to an external router to which the edge device 2725 connects). This route stored in the datapath VRF 2755 has a shorter administrative distance (i.e., higher priority) on the edge device 2725 than the newly received route to the other edge device 2700. In this case, as shown at the second stage 2810, the route is not imported from the control VRF 2750 to the datapath VRF 2755.

In some embodiments, the decision whether to import a route learned from the control VRF 2750 to the datapath VRF 2755 (and, in turn, whether to use such a route in the forwarding table for the SR implemented by the datapath of the edge device) depends on the configuration for the SR. For a T0 SR that does not designate primary or secondary datacenters (e.g., a T0 SR in active-active configuration or active-standby configuration without preference between datacenters), some embodiments prefer static routes or routes learned via eBGP (i.e., routes already existing in the datapath VRF) to routes learned from peer SRs via iBGP (i.e., routes added to the control VRF). In addition, this same preference is used for logical routers with multiple T0 SRs implemented in a single datacenter (i.e., that are not stretched between datacenters).

However, if the T0 logical router is stretched across multiple datacenters and one of the datacenters is designated as the primary datacenter for ingress/egress, some embodiments factor in this configuration when determining whether to add a route from the control VRF to the datapath VRF (and thus use the route from the control VRF for the T0 SR routing table). Specifically, at a secondary T0 SR, some such embodiments will prefer routes learned via iBGP from the primary T0 SR (i.e., a route in the control VRF) to routes learned via eBGP from an external router. That is, even in an primary/secondary configuration, some embodiments allow the secondary T0 SRs to have connections to external routers and use these connections for network addresses unless the primary T0 SR advertises itself as a next hop for those addresses. Some embodiments use BGP community tags and/or weight to ensure that routes learned via eBGP from the primary T0 SR are preferred over routes learned from external routers.

It should be noted that while the above description regarding use of both a datapath VRF and a control VRF refers to a T0 SR that is stretched across multiple federated datacenters, in some embodiments the concepts also apply to logical routers generically. That is, any logical router that has centralized routing components which share routes with each other as well as with an external network or other logical routers may use a similar setup with both datapath and control VRFs. In addition, the use of both a datapath VRF and a control VRF applies in some embodiments to logical routers (e.g., T0 logical routers) of logical networks that are confined to a single datacenter. SRs of such logical routers may still have asymmetric connections to external networks (e.g., due to the connection setup, connection failures, etc.) and therefore need to exchange routes with each other.

In addition, the description provided by reference to FIGS. 26-28 relates to a situation in which only one T0 SR is implemented on each edge device. For edge devices on which multiple SRs are implemented (e.g., multiple T0 SRs), different embodiments may use a single control VRF or multiple control VRFs. Using multiple control VRFs allows for the routes for each SR to be kept separate, and only provided to other peer SRs via an exclusive routing protocol session. However, in a network with numerous SRs implemented on the same edge device and each SR peering with other SRs in multiple other datacenters, this solution may not scale well because numerous VRFs and numerous routing protocol sessions are required on each edge device.

Thus, some embodiments use a single control VRF on each edge device, with different datapath VRFs for each SR. When routes are imported from a datapath VRF to the control VRF, these embodiments add a tag or set of tags to the routes that identifies the T0 SR. For instance, some embodiments use multiprotocol BGP (MP-BGP) for the routing protocol and use the associated route distinguishers and route targets as tags. Specifically, the tags both (i) ensure that all network addresses are unique (as different logical networks could have overlapping network address spaces) and (ii) ensure that each route is exported to the correct edge devices and imported into the correct datapath VRFs.

Figure 29:
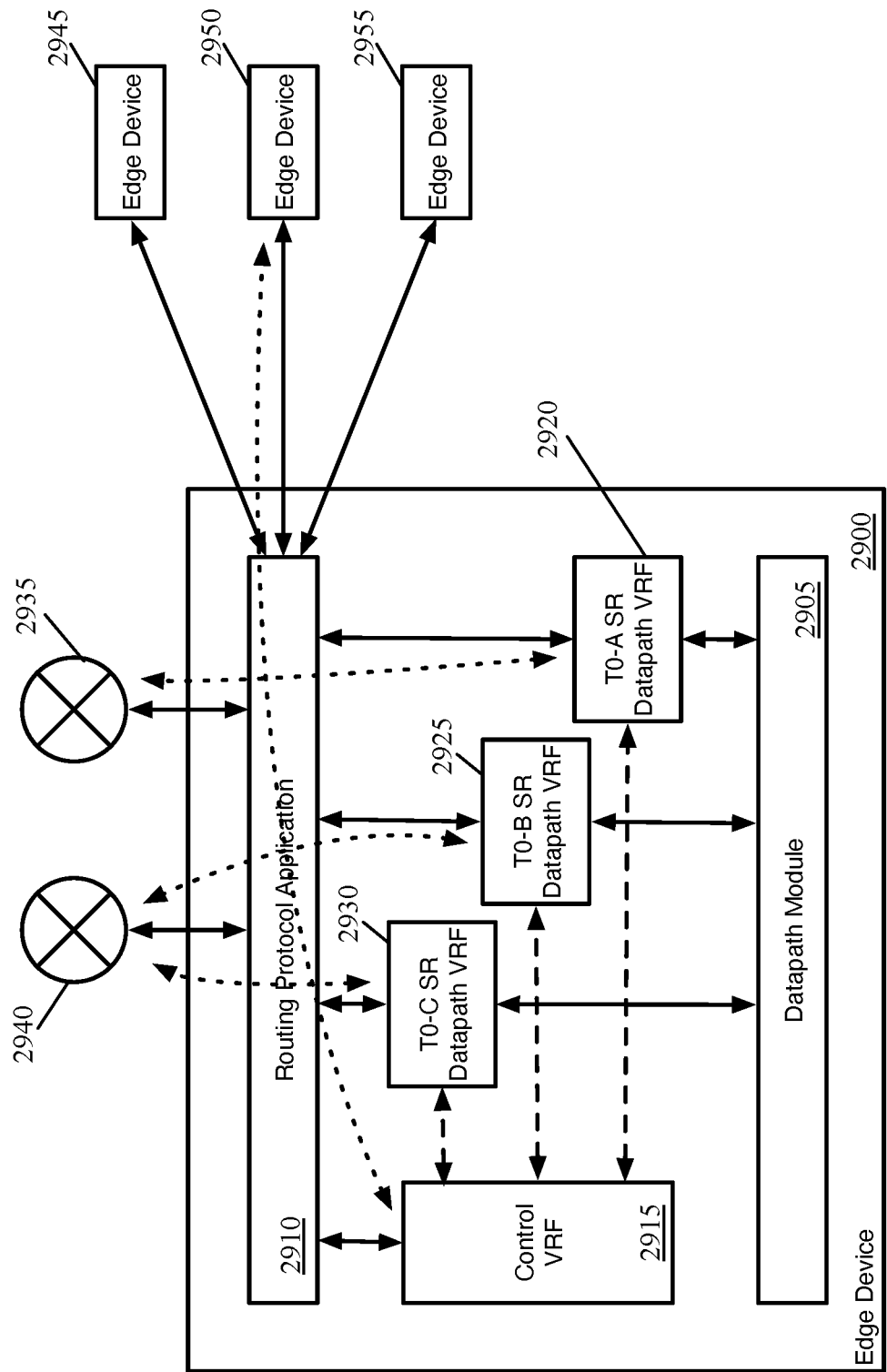
FIG. 29 conceptually illustrates the routing architecture of an edge device of some embodiments.

FIG. 29 conceptually illustrates the routing architecture of an edge device 2900 of some embodiments. As with the edge device 2600 described above, in some embodiments the edge device 2900 is a bare metal computing device, in which all of the illustrated components execute in the primary operating system. In other embodiments, these components execute within a virtual machine or other DCN that operates on the edge device. As shown, the edge device 2900 includes a datapath module 2905 and a routing protocol application 2910. For the sake of simplicity, the controller modules that configure the routing protocol application 2910 and datapath module 2905, and provide the initial routes for the various VRFs, are not shown in this figure.

As shown, the edge device 2900 now stores one control VRF 2915 as well as three datapath VRFs 2920-2930, for three different T0 SRs (i.e., SRs for three different logical routers). All three of these VRFs 2920-2930 are used by the datapath module 2905, such that when the datapath executes a stage for a particular router, the datapath uses the corresponding VRF to route the data message. The routing protocol application 2910 manages three separate routing protocol sessions with external routers using the three different datapath VRFs—the datapath VRF 2920 for the T0 SR-A is used for a routing session with a first external router 2935, while the datapath VRFs 2925 and 2930 for T0 SR-B and T0 SR-C are used for routing sessions with a second external router 2940. These external routers have different next hop IP addresses in some embodiments.

The routing protocol application 2910 uses the control VRF 2915 for routing protocol sessions with multiple other edge devices 2945-2955. These edge devices 2945 implement SRs for different combinations of the three T0 logical routers A, B, and C, and thus all have routing protocol sessions configured with the routing protocol application 2910 on the edge device 2900. In addition, the routing protocol application 2910 imports routes from all three of these datapath VRFs 2920-2930 to the control VRF 2915. In some embodiments, the routing protocol application runs multiprotocol BGP (MP-BGP), which allows the use of tags on routes to (i) differentiate routes for the same IP prefix and (ii) indicate whether to export the routes to specific other routers (in this case, other edge devices 2945-2955) or import the routes to specific VRFs (in this case, the datapath VRFs 2920-2930). Specifically, MP-BGP uses route distinguishers to differentiate routes for the same IP prefix that are imported to the control VRF 2915 from different datapath VRFs. In addition, the MP-BGP application uses route targets to determine whether to (i) provide a particular route in the control VRF 2915 to another edge device and (ii) import a particular route from the control VRF 2915 to a particular datapath VRF.

Figure 30A:
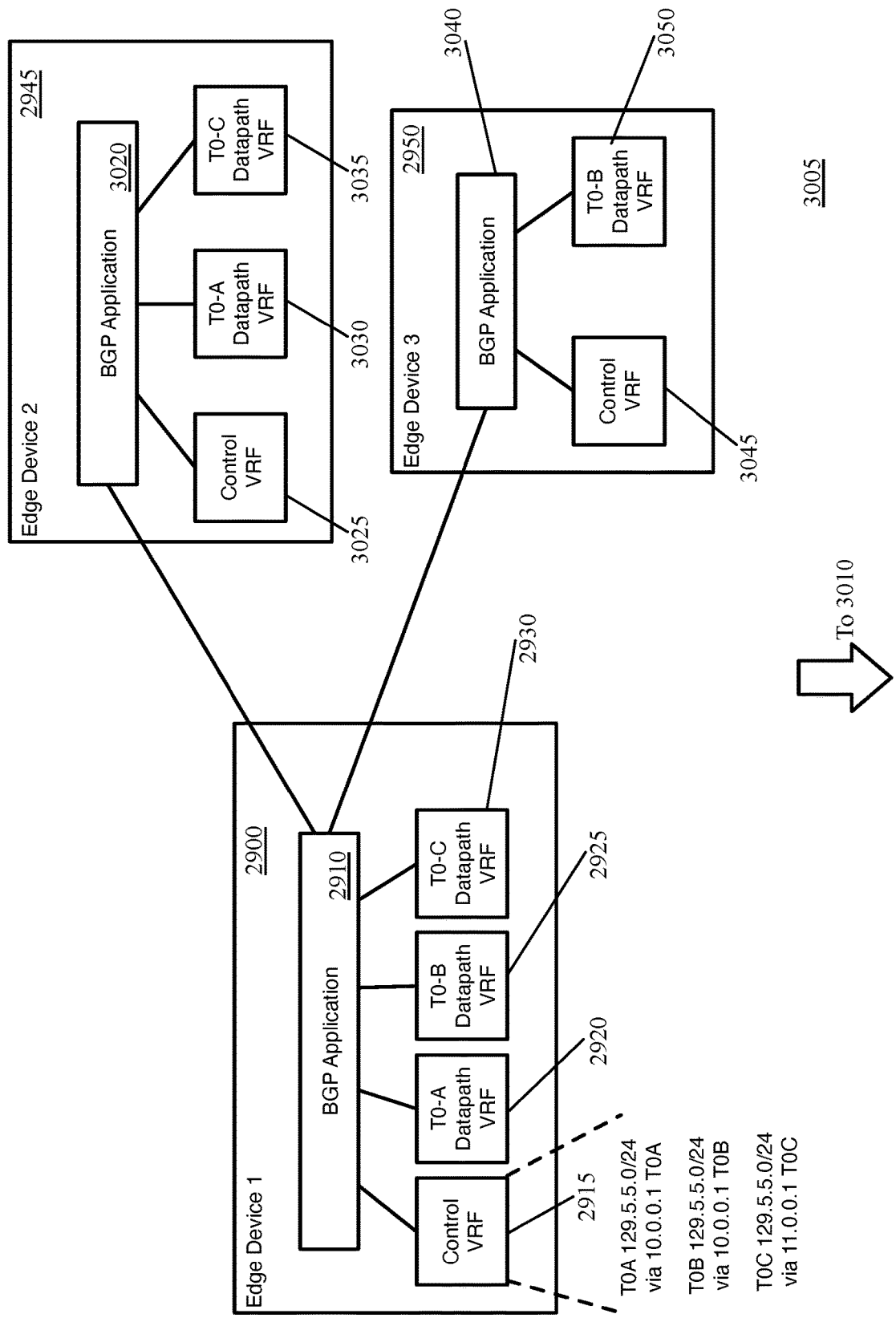
FIGS. 30A-C conceptually illustrate the exchange of routes from the edge device of FIG. 29 to two other edge devices.
Figure 30B:
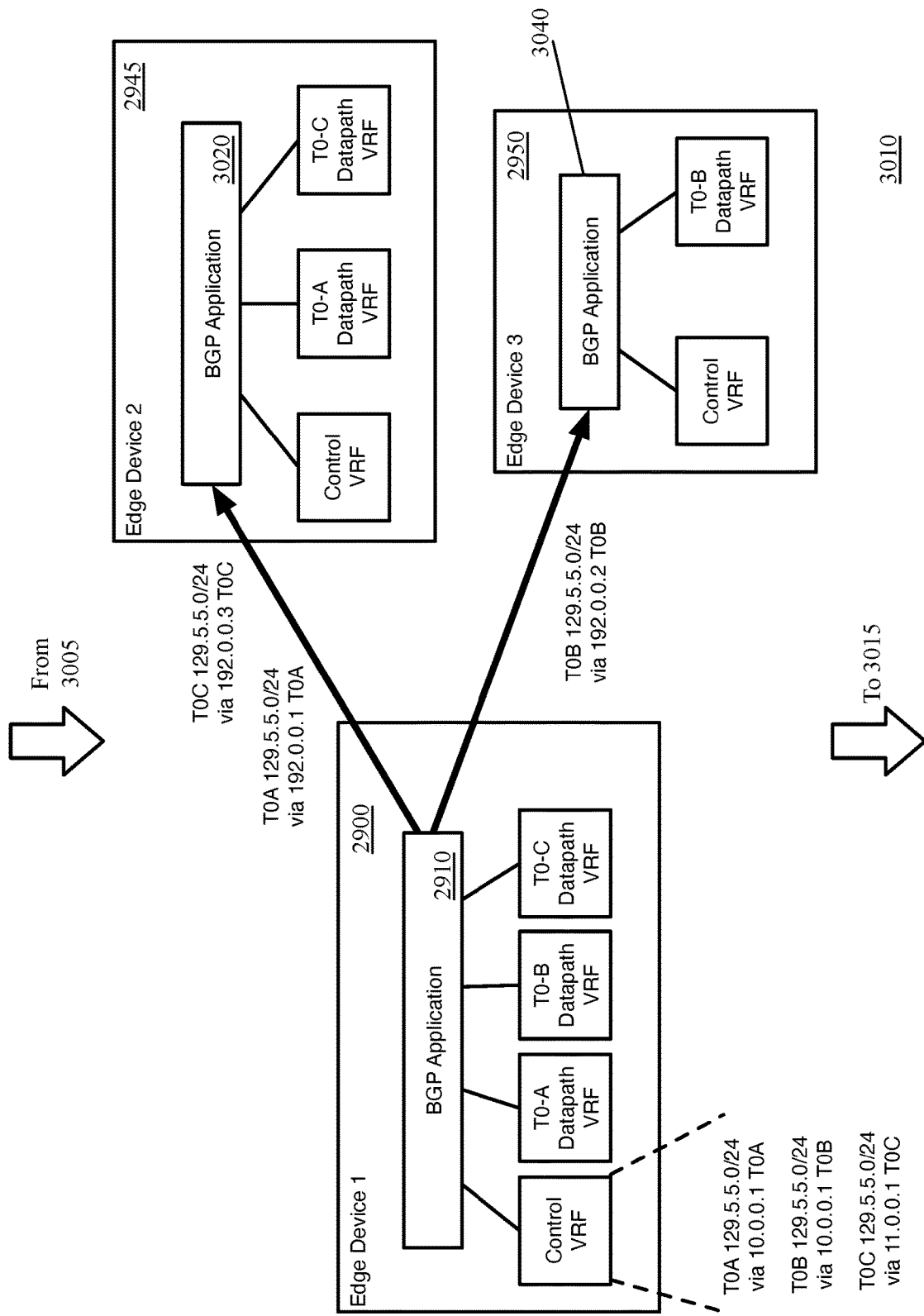
Figure 30C:
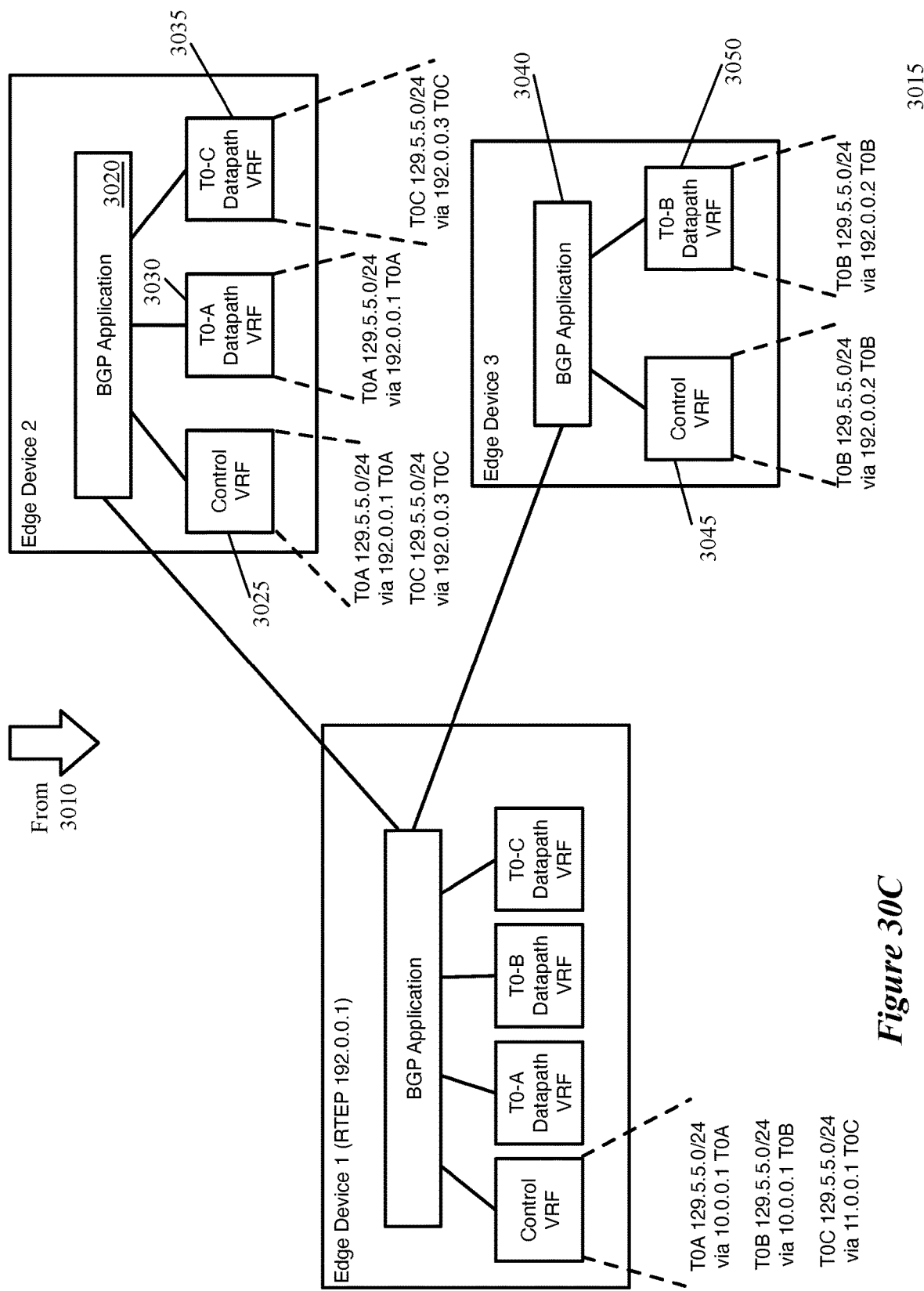

FIGS. 30A-C conceptually illustrate the exchange of routes from the edge device 2900 to two of the other edge devices 2945 and 2950 over three stages 3005-3015. As described by reference to FIG. 29, the first edge device 2900 implements T0 SRs for logical routers A, B, and C. As shown here, the second edge device 2945 (i) executes a BGP application 3020 and (ii) implements T0 SRs for logical routers A and C (and therefore stores a control VRF 3025 and two datapath VRFs 3030 and 3035). The third edge device 2950 (i) executes a BGP application 3040 and (ii) implements a T0 SR for logical router B (and therefore stores a control VRF 3045 and a datapath VRF 3050).

As shown at the first stage, the control VRF 2915 includes three separate routes for the IP prefix 129.5.5.0/24, which are all tagged with route distinguishers and route targets (in this example, as is often the case, the route distinguishers and route targets are the same values). The route distinguisher T0A is used to identify routes from the T0A datapath VRF 2920, the route distinguisher T0B is used to identify routes from the T0B datapath VRF 2925, and the route distinguisher T0C is used to identify routes from the T0C datapath VRF 2930. In addition, the route target T0A is used to identify routes that should be exported to peer T0 SRs for logical router A, the route target T0B is used to identify routes that should be exported to peer T0 SRs for logical router B, and the route target T0C is used to identify routes that should be exported to peer T0 SRs for logical router C. The BGP application 2910 is configured, in some embodiments, to only send routes with the route target T0A via routing protocol sessions with other edge devices that implement T0 SRs for the logical router A.

The second stage 3010 illustrates that the BGP application 2910 on the first edge device 2900 sends iBGP messages to both the BGP application 3020 on the second edge device 2945 and the BGP application 3040 on the third edge device 2950. The BGP message to the second edge device 2945 advertises routes for the two prefixes tagged with route targets of T0A and T0C. As shown in the figure, the route tagged with the T0A route target specifies a next hop IP address of 192.0.0.1 (an IP address associated with an interface of SR-A) while the route tagged with the T0C route target specifies a next hop IP address of 192.0.0.3 (an IP address associated with an interface of SR-C). The BGP message to the third edge device 2950 advertises a route for the prefix tagged with the route target T0B, which specifies a next hop IP address of 192.0.0.2 (an IP address associated with an interface of SR-B). The route targets enable the BGP application 3040 to only send routes to the other edge devices for SRs that are implemented on those edge devices.

The third stage 3015 illustrates that the BGP applications 3020 and 3040 on the edge devices 2945 and 2950 (i) add these routes to their respective control VRFs 3025 and 3045 based on receiving the routes via iBGP sessions from the edge device 2900 and (ii) import the routes from the respective control VRFs to the appropriate datapath VRFs according to the route targets. As shown, the control VRF 3025 on the edge device 2945 now includes both of the routes for T0-A and T0-C, the datapath VRF 3030 for T0-A includes the route with the corresponding route target (but not the route for T0-C), and the datapath VRF 3035 for T0-C includes the route with the corresponding route target (but not the route for T0-A). The control VRF 3045 and the datapath VRF 3050 both include the route with the route target T0B.

In addition to tags used to differentiate routes associated with different logical routers, some embodiments use additional tags on the routes to convey user intent and determine whether or not to advertise routes in the datapath VRF to external networks. For instance, some embodiments use BGP communities to tag routes. As described above, routes in the datapath VRF for a given SR may be (i) configured by the local manager and/or management plane, (ii) learned via route exchange with the external network router(s), and/or (iii) added from the control VRF after route exchange with other SR peers.

For example, the local manager and/or management plane will configure the initial routing table for an SR. For a T0 SR, this will typically include a default route (to send otherwise unknown traffic to either a peer T0 SR or an external router), any administrator-configured static routes, and routes for directing traffic to various T1 logical routers that connect to the T0 logical router. These routes may include at least routes for NAT IP addresses, LB VIPs, public IP subnets associated with logical switches. In addition, routes for private IP subnets may be configured in some embodiments. If a T1 logical router does not span to a particular datacenter in which a T0 SR is being configured, the T0 SR may nevertheless be configured with routes for IP addresses associated with that logical router. However, if a T1 logical router is defined at a local manager of one datacenter and connected to a T0 logical router that spans to other datacenters, in some embodiments the T0 SRs at those other datacenters will not initially be configured with routes for addresses associated with that T1 logical router.

Figure 31:
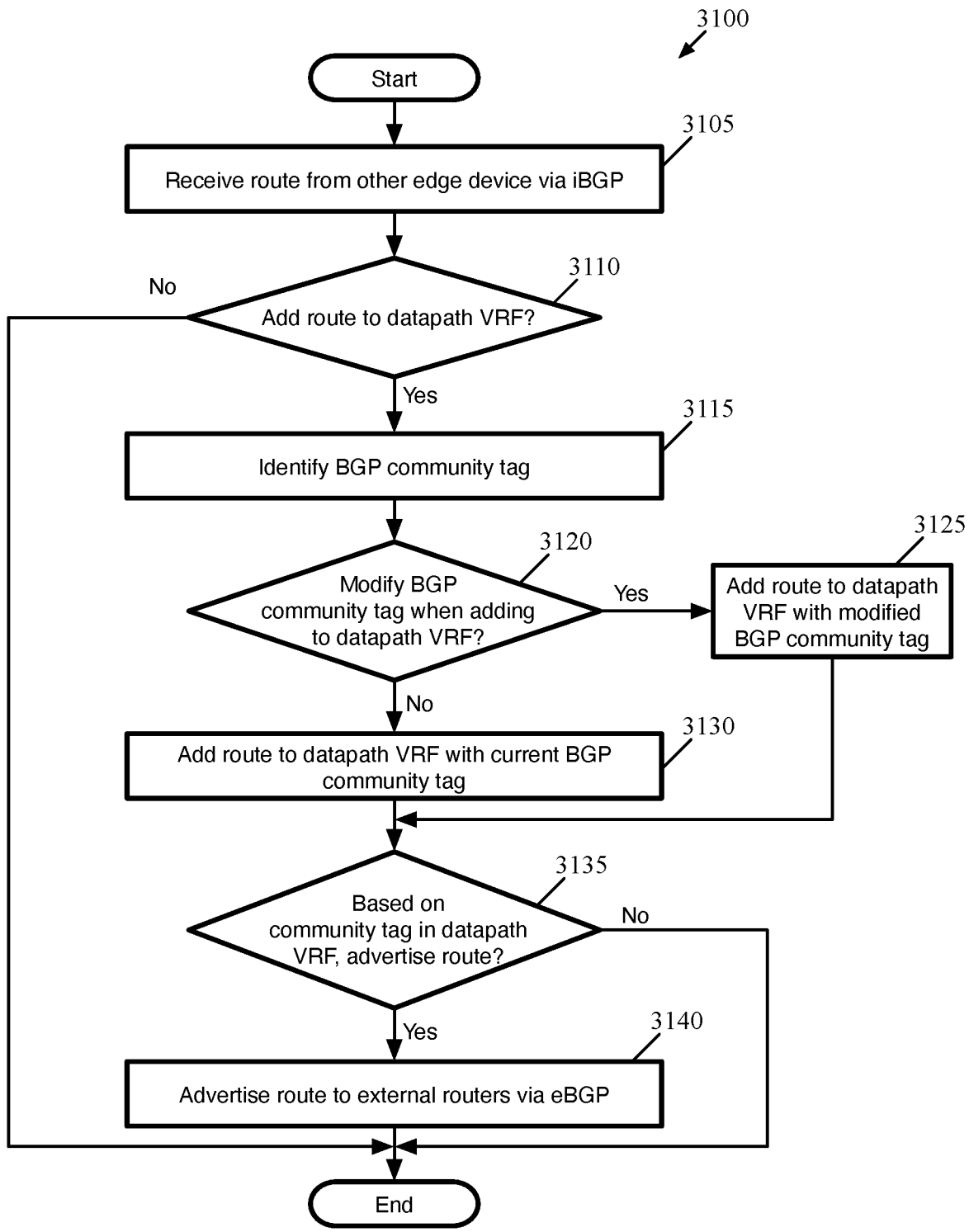
FIG. 31 conceptually illustrates a process of some embodiments for determining whether and how to add a route to a datapath VRF according to some embodiments.

FIG. 31 conceptually illustrates a process 3100 of some embodiments for determining whether and how to add a route to a datapath VRF according to some embodiments. In some embodiments, the process 3100 is performed by a routing protocol application executing on an edge device (e.g., a BGP application) on which at least one SR (e.g., a T0 SR) executes. This routing protocol application manages a control VRF for routing protocol sessions with peer edge devices (e.g., in other datacenters) and a datapath VRF for use by the datapath module when implementing the SR as well as for routing protocol sessions with at least one external router.

As shown, the process 3100 begins by receiving (at 3105) a route from another edge device (e.g., via iBGP). For example, this could be a route that the peer edge device learned via route exchange with an external network router or could be a route for logical network addresses associated with a datacenter-specific logical router that the administrator at the other datacenter configured through the local manager.

The process 3100 determines (at 3110) whether to add the route to the datapath VRF. As described above, if the datapath VRF for a particular SR already has a route for a particular IP address prefix with an equal or higher priority to the received route, then the routing protocol application does not add the newly received route to the datapath VRF. In some embodiments, the order of route preference for prefixes learned from multiple sources is (i) user-configured routes (e.g., static routes), (ii) at a secondary SR, routes learned from a primary peer SR, (iii) routes learned (directly) from external routers, (iv) routes learned from a peer SR in the same datacenter (e.g., in active-active configuration), and (v) routes learned from a peer SR in another datacenter (e.g., in active-active configuration). In addition, while the process 3100 only references a single datapath VRF, it should be understood that if multiple datapath VRFs are in use on the edge device, then the routing protocol application only adds the route to the datapath VRF for the appropriate SR (e.g., using the route target tag appended to the route). If the route is not added to the datapath VRF, the process 3100 ends.

Next, the process 3100 identifies (at 3115) a BGP community tag (or other, similar, tag, used to convey how the prefix should be treated for BGP purposes) appended to the route as received from the peer SR. BGP community tags may be used, in different embodiments, to specify whether to advertise a route at all, whether to advertise a route only to certain peers (e.g., only iBGP peers), or for other administrator-defined purposes. In addition, some routes may not have a community tag at all. In some embodiments, the tag may be used by the sending edge device to more granularly identify the source of routes (e.g., routes learned from eBGP route exchange with external routers, local datacenter-specific routes such as LB VIPs, NAT IPs, public IP subnets, etc.).

The process 3100 then determines (at 3120) whether to modify the BGP community tag when adding the route to the datapath VRF. In some embodiments, whether to modify the BGP community tag is based on rules defined by the network administrator and configured at the routing application. For instance, it may be desirable for certain prefixes to be exchanged from one peer to another, but not advertised by the receiving peer. As an example, routes that a first T0 SR learns from route exchange with an external router will be imported into the control VRF and thus shared with a second T0 SR in a different datacenter. However, while these routes may be added to the datapath VRF for the second T0 SR, they should not necessarily be advertised out to external networks by the second T0 SR, because the T0 SRs should not become a conduit for routing traffic between the external network at one datacenter and the external network at another datacenter (i.e., traffic unrelated to the logical network). Thus, depending on the configuration, some embodiments modify the BGP community tag when adding these routes to the datapath VRF. Some embodiments use the NO_EXPORT tag when exchanging these routes between T0 SRs, which allows for the route to be advertised to iBGP peers, but not to eBGP peers. Specifically, some embodiments automatically add the NO_EXPORT tag to routes added to the datapath VRF at an edge device based on route exchange with eBGP peers.

When the process 3100 determines that the BGP community tag should be modified, the process adds (at 3125) the route to the datapath VRF with the modified community tag. This could involve modifying a route from NO_EXPORT to NO_ADVERTISE (e.g., so that a route received from a T0 SR peer is not advertised to either external router peers or other T0 SRs), or any custom modification. On the other hand, when the BGP community tag does not require modification, the process 3100 adds (at 3130) the route to the datapath VRF with the current BGP community tag (e.g., as received from the peer T0 SR).

Finally, the process 3100 determines (at 3135) whether to advertise the route to external routers based on the community tag on the route in the datapath VRF. As mentioned, some embodiments may use the NO_EXPORT, NO_ADVERTISE, and/or administrator-defined community tags in order to prevent the routes from being advertised (e.g., routes for networks external to another datacenter, routes for private subnets, etc.). The process 3100 advertises (at 3140) the route to the external routers via eBGP if the BGP community tag for the route does not indicate that the route should not be advertised.

Figure 32:
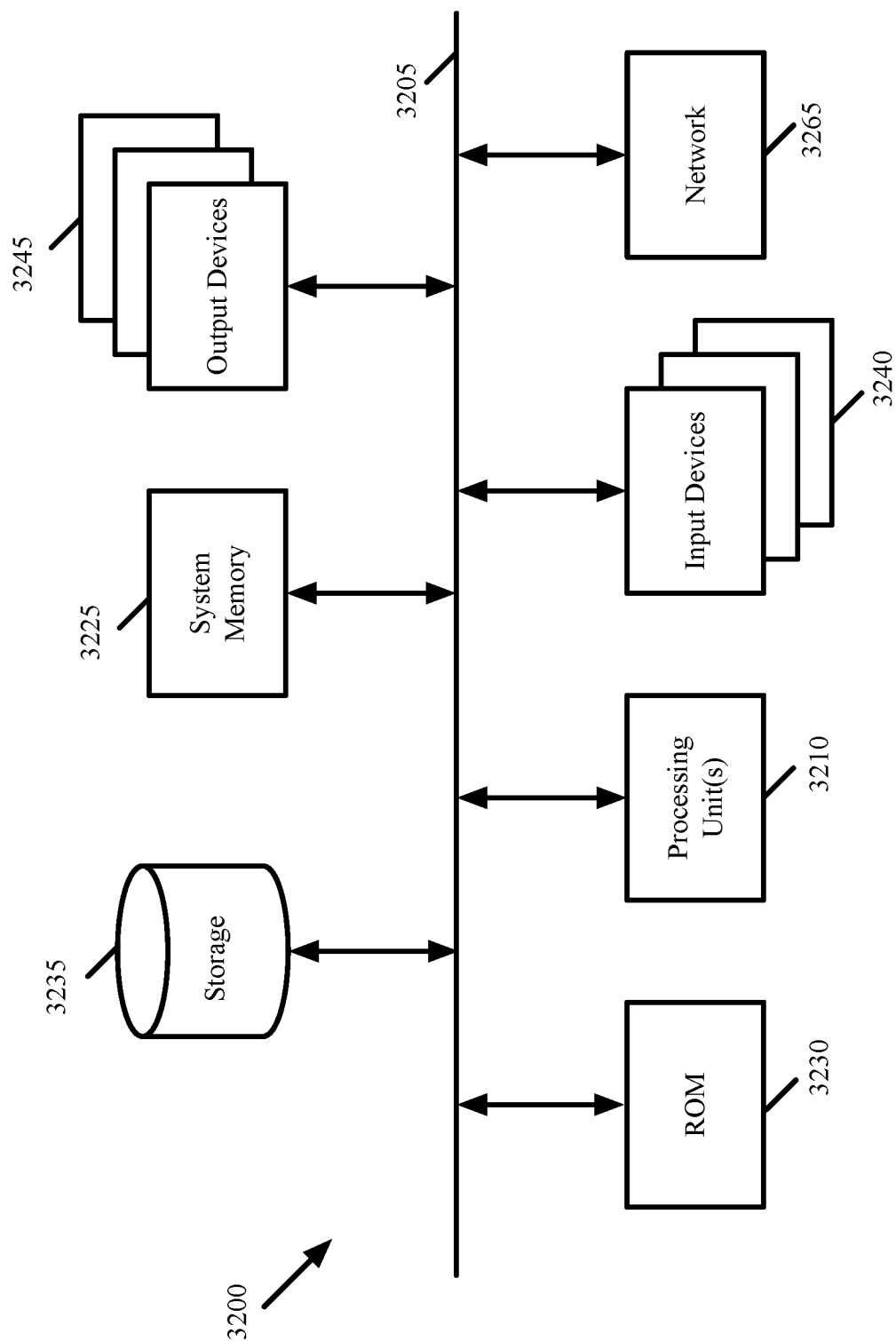
FIG. 32 conceptually illustrates an electronic system with which some embodiments of the invention are implemented.

FIG. 32 conceptually illustrates an electronic system 3200 with which some embodiments of the invention are implemented. The electronic system 3200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3200 includes a bus 3205, processing unit(s) 3210, a system memory 3225, a read-only memory 3230, a permanent storage device 3235, input devices 3240, and output devices 3245.

The bus 3205 collectively represents all system, peripheral, and chipset buses that communicatively connect the numerous internal devices of the electronic system 3200. For instance, the bus 3205 communicatively connects the processing unit(s) 3210 with the read-only memory 3230, the system memory 3225, and the permanent storage device 3235.

From these various memory units, the processing unit(s) 3210 retrieve instructions to execute and data to process in order to execute the processes of the invention. The processing unit(s) may be a single processor or a multi-core processor in different embodiments.

The read-only-memory (ROM) 3230 stores static data and instructions that are needed by the processing unit(s) 3210 and other modules of the electronic system. The permanent storage device 3235, on the other hand, is a read-and-write memory device. This device is a non-volatile memory unit that stores instructions and data even when the electronic system 3200 is off. Some embodiments of the invention use a mass-storage device (such as a magnetic or optical disk and its corresponding disk drive) as the permanent storage device 3235.

Other embodiments use a removable storage device (such as a floppy disk, flash drive, etc.) as the permanent storage device. Like the permanent storage device 3235, the system memory 3225 is a read-and-write memory device. However, unlike storage device 3235, the system memory is a volatile read-and-write memory, such a random-access memory. The system memory stores some of the instructions and data that the processor needs at runtime. In some embodiments, the invention's processes are stored in the system memory 3225, the permanent storage device 3235, and/or the read-only memory 3230. From these various memory units, the processing unit(s) 3210 retrieve instructions to execute and data to process in order to execute the processes of some embodiments.

The bus 3205 also connects to the input and output devices 3240 and 3245. The input devices enable the user to communicate information and select commands to the electronic system. The input devices 3240 include alphanumeric keyboards and pointing devices (also called "cursor control devices"). The output devices 3245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 32, bus 3205 also couples electronic system 3200 to a network 3265 through a network adapter (not shown). In this manner, the computer can be a part of a network of computers (such as a local area network ("LAN"), a wide area network ("WAN"), or an Intranet, or a network of networks, such as the Internet. Any or all components of electronic system 3200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 6, 13, 14, 25, and 31) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a managed forwarding element executing on a host computer in a first datacenter to implement a logical network spanning the first datacenter and a set of additional datacenters, a method comprising:
    storing a set of records that each map one or more logical network addresses for data compute nodes (DCNs) belonging to the logical network and operating in the first datacenter to a different tunnel endpoint address;
    storing an additional record that maps logical network addresses for DCNs connected to a particular logical forwarding element (LFE) of the logical network and operating in the set of additional datacenters to a group of tunnel endpoint addresses corresponding to logical network gateways that handle data traffic for the particular LFE between the first datacenter and the set of additional datacenters; and
    upon receiving a data message with a destination logical network address corresponding to one of the DCNs connected to the particular LFE and operating in one of the additional datacenters of the set of additional datacenters, using the additional record to identify a tunnel endpoint address for encapsulating the data message.

2. The method of claim 1, wherein the logical network gateways comprise one logical network gateway designated as active and one or more logical network gateways designated as standby, wherein the additional record specifies which of the tunnel endpoint addresses corresponds to the active logical network gateway for the particular LFE.

3. The method of claim 2, wherein using the additional record to identify the tunnel endpoint address for encapsulating the data message comprises selecting the tunnel endpoint address corresponding to the active logical network gateway for the particular LFE.

4. The method of claim 1, wherein the logical network gateways are all designated as active, wherein using the additional record to identify the tunnel endpoint address for encapsulating the data message comprises selecting one of the tunnel endpoint addresses from the group of tunnel endpoint addresses.

5. The method of claim 4, wherein selecting the tunnel endpoint address from the group of tunnel endpoint addresses comprises performing a load balancing operation to select the tunnel endpoint address.

6. The method of claim 1 further comprising receiving, from a network controller, a set of tunnel endpoint addresses for host computers located in the first datacenter that implement the particular LFE, wherein the set of records comprises records for each of the tunnel endpoint addresses of the set of tunnel endpoint addresses.

7. The method of claim 1, wherein the logical network addresses are logical network MAC addresses and the tunnel endpoint addresses are physical network IP addresses.

8. The method of claim 1 further comprising:
receiving a notification to remove a particular one of the tunnel endpoint addresses from the group of tunnel endpoint addresses; and
removing the tunnel endpoint address from the group of tunnel endpoint addresses while retaining the additional record mapping the logical network addresses for DCNs connected to the particular LFE and operating in the set of additional datacenters to the group of tunnel endpoint addresses.

9. The method of claim 8, wherein retaining the additional record avoids a need to re-learn the mapping of the logical network addresses for DCNs connected to the particular LFE and operating in the set of additional datacenters to the tunnel endpoint addresses corresponding to the logical network gateways that handle data traffic for the particular LFE between the first datacenter and the set of additional datacenters.

10. The method of claim 8, wherein the particular tunnel endpoint address corresponds to a particular one of the logical network gateways, wherein the notification is received in response to a computing device on which the particular logical network gateway executes losing connectivity to the managed forwarding element.

11. The method of claim 1, wherein the additional record is a first additional record, the particular LFE is a first LFE, and the group of tunnel endpoint addresses is a first group of tunnel endpoint addresses, wherein the method further comprises storing a second additional record that maps logical network addresses for DCNs connected to a second LFE of the logical network and operating in the set of additional datacenters to a second group of tunnel endpoint addresses corresponding to logical network gateways that handle data traffic for the particular LFE between the first datacenter and the set of additional datacenters.

12. The method of claim 11, wherein the DCNs belonging to the logical network and operating in the first datacenter comprise DCNs connected to the first and second LFEs.

13. The method of claim 11, wherein the host computer hosts a DCN connected to one of the first and second LFEs.

14. The non-transitory machine-readable medium of claim 1, wherein the MFE further comprises a set of instructions for receiving, from a network controller, a set of tunnel endpoint addresses for host computers located in the first datacenter that implement the particular LFE, wherein the set of records comprises records for each of the tunnel endpoint addresses of the set of tunnel endpoint addresses.

15. The non-transitory machine-readable medium of claim 1, wherein the MFE further comprises sets of instructions for:
receiving a notification to remove a particular one of the tunnel endpoint addresses from the group of tunnel endpoint addresses; and
removing the tunnel endpoint address from the group of tunnel endpoint addresses while retaining the additional record mapping the logical network addresses for DCNs connected to the particular LFE and operating in the set of additional datacenters to the group of tunnel endpoint addresses.

16. The non-transitory machine-readable medium of claim 15, wherein the particular tunnel endpoint address corresponds to a particular one of the logical network gateways, wherein the notification is received in response to a computing device on which the particular logical network gateway executes losing connectivity to the managed forwarding element.

17. A non-transitory machine-readable medium storing a managed forwarding element (MFE) which when executed by at least one processing unit of a host computer in a first datacenter implements a logical network spanning the first datacenter and a set of additional datacenters, the MFE comprising:
storing a set of records that each map one or more logical network addresses for data compute nodes (DCNs) belonging to the logical network and operating in the first datacenter to a different tunnel endpoint address;
storing an additional record that maps logical network addresses for DCNs connected to a particular logical forwarding element (LFE) of the logical network and operating in the set of additional datacenters to a group of tunnel endpoint addresses corresponding to logical network gateways that handle data traffic for the particular LFE between the first datacenter and the set of additional datacenters; and
upon receiving a data message with a destination logical network address corresponding to one of the DCNs connected to the particular LFE and operating in one of the additional datacenters of the set of additional datacenters, using the additional record to identify a tunnel endpoint address for encapsulating the data message.

18. The non-transitory machine-readable medium of claim 17, wherein:
the logical network gateways comprise one logical network gateway designated as active and one or more logical network gateways designated as standby;
the additional record specifies which of the tunnel endpoint addresses corresponds to the active logical network gateway for the particular LFE; and
the set of instructions for using the additional record to identify the tunnel endpoint address for encapsulating the data message comprises a set of instructions for selecting the tunnel endpoint address corresponding to the active logical network gateway for the particular LFE.

19. The non-transitory machine-readable medium of claim 17, wherein the logical network gateways are all designated as active, wherein the set of instructions for using the additional record to identify the tunnel endpoint address for encapsulating the data message comprises a set of instructions for selecting one of the tunnel endpoint addresses from the group of tunnel endpoint addresses.

20. The non-transitory machine-readable medium of claim 19, wherein the set of instructions for selecting the tunnel endpoint address from the group of tunnel endpoint addresses comprises a set of instructions for performing a load balancing operation to select the tunnel endpoint address.

21. The non-transitory machine-readable medium of claim 17, wherein the additional record is a first additional record, the particular LFE is a first LFE, and the group of tunnel endpoint addresses is a first group of tunnel endpoint addresses, wherein the MFE further comprises a set of instructions for storing a second additional record that maps logical network addresses for DCNs connected to a second LFE of the logical network and operating in the set of additional datacenters to a second group of tunnel endpoint addresses corresponding to logical network gateways that handle data traffic for the particular LFE between the first datacenter and the set of additional datacenters.

22. The non-transitory machine-readable medium of claim 21, wherein the DCNs belonging to the logical network and operating in the first datacenter comprise DCNs connected to the first and second LFEs.

\* \* \* \* \*